US006850092B2

(12) United States Patent
Chelcea et al.

(10) Patent No.: US 6,850,092 B2
(45) Date of Patent: Feb. 1, 2005

(54) LOW LATENCY FIFO CIRCUITS FOR MIXED ASYNCHRONOUS AND SYNCHRONOUS SYSTEMS

(75) Inventors: Tiberiu Chelcea, New York, NY (US); Steven M. Nowick, Leonia, NJ (US)

(73) Assignee: The Trustees of Columbia University, New York, NY (US)

( * ) Notice: Subject to any disclaimer, the term of this patent is extended or adjusted under 35 U.S.C. 154(b) by 0 days.

(21) Appl. No.: 09/877,442

(22) Filed: Jun. 8, 2001

(65) Prior Publication Data

US 2002/0167337 A1 Nov. 14, 2002

Related U.S. Application Data

(60) Provisional application No. 60/210,642, filed on Jun. 9, 2000, and provisional application No. 60/210,644, filed on Jun. 9, 2000.

(51) Int. Cl.[7] .......................... H03K 19/00; G06F 13/14
(52) U.S. Cl. .......................... 326/93; 326/96; 365/119; 365/120; 710/53; 710/56; 710/57; 711/105; 711/167; 327/141; 327/144
(58) Field of Search ....................... 326/93–98; 327/141, 327/144; 365/119–121; 370/236; 710/53, 56, 57; 711/105, 167; 712/25

(56) References Cited

U.S. PATENT DOCUMENTS

| | | | | |
|---|---|---|---|---|
| 5,598,113 A | | 1/1997 | Jex et al. ....................... 326/94 |
| 5,781,802 A | * | 7/1998 | Cassetti ....................... 710/57 |
| 6,072,741 A | * | 6/2000 | Taylor .......................... 365/219 |
| 6,141,324 A | * | 10/2000 | Abbott et al. ................. 370/236 |
| 6,209,071 B1 | * | 3/2001 | Barth et al. ................... 711/167 |
| 6,252,441 B1 | * | 6/2001 | Lee et al. ..................... 327/141 |
| 6,356,117 B1 | * | 3/2002 | Sutherland et al. ........... 326/93 |
| 6,502,180 B1 | * | 12/2002 | Martin et al. ................. 712/25 |

OTHER PUBLICATIONS

D.M. Chapiro, "Globally–Asynchronous Locally–Synchronous Systems," PhD Thesis, Stanford University, Oct. 1984.

C. L. Seitz, "System Timing", Introduction to VLSI Systems, Ch. 7, Addison–Wesley Pub. Co., 1980.

Alain Martin, "The Design of a Self–timed Circuit for Distributed Mutual Exclusion," *Proceedings of the 1985 Chapel Hill Conference on VLSI*, pp. 245–260, Computer Science Press, 1985.

T.A. Chu, "Synthesis of Self–Timed VLSI Circuits from Graph–Theoretic Specifications", *Ph.D. Thesis, MIT Laboratory for Computer Science*, No. MIT/LCS/TR–393, Jun. 1987.

I.E. Sutherland, "Micropipelines," Communications of the ACM, 32(6), pp. 720–738, Jun. 1989.

A. V. Yakovlev, "Concurrency Models for Designing Interface Logic in Distributed Systems", *Technical Report 285, Univ. of Newcastle upon Tyre*, Nov. 1989.

(List continued on next page.)

*Primary Examiner*—Michael Tokar
*Assistant Examiner*—Vibol Tan
(74) *Attorney, Agent, or Firm*—Baker Botts LLP

(57) ABSTRACT

A FIFO design interfaces a sender subsystem and a receiver subsystem operating on different time domains. The sender subsystem and the receiver subsystem may be synchronous or asynchronous. The FIFO circuit includes a put interface configured to operate in accordance with the sender time domain and get interface configured to operate in accordance with the receiver time domain. The FIFO circuit includes an array of cells having a register and state controller indicative of the state of the cell. Each cell also has a put component part configured to operate according to the sender time domain including a put token passing circuit and put controller circuit. Each cell has get component part configured to operate according to the receiver time domain including a get token passing circuit and a get controller circuit. A mixed-clock relay station design interfaces a sender subsystem and a receiver subsystem working at different time domains, and where the latency between sender and receiver is large.

42 Claims, 36 Drawing Sheets

OTHER PUBLICATIONS

Alain Martin, "Programming in VLSI: From Communicating Processes to Delay–Insensitive Circuits," *Developments in Concurrency and Communication*, UT Year of Programming Series, pp. 1–64, Addison–Wesley, 1990.

Jo C. Ebergen, "Arbiters: An Exercise in Specifying and Decomposing Asynchronously Communicating Components," *Science of Computer Programming* 18(1992), p. 223–245.

D. Dill, S.M. Nowick, R. Sproull, "Specification and Automatic Verification of Self–Timed Queues," *Formal Methods in System Design* 1:29–60(1992).

M. Kishinevsky, A. Kondratyev, A. Taubin, V. Varshavsky "Concurrent Hardware: The Theory and Practice of Self–Timed Design", Willey and Sons, 1993.

J. Seizovic, "Pipeline Synchronization," IEEE ASYNC '94 Symp., pp. 87–96.

Kees van Berkel and Martin Rem, "VLSI Programming of Asynchronous Circuits for Low Power," *Asynchronous Digital Circuit Design, Workshops in Computing*, pp. 152–210, Springer–Verlag, 1995.

A. V. Yakovlev, A.M. Koelmans, L. Lavagno, "High–Level Modeling and Design of Asynchronous Interface Logic", *IEEE Design and Test of Computers*, Spring 1995.

J.T. Yantchev et al., "Low–Latency Asynchronous FIFO Buffers", Asynchronous Design Methodoloies, pp. 24–31, May 1995.

M.R. Greenstreet, "implementing a STARI Chip," ICCD '95, pp. 38–43.

Erik Brunvand, "Low latency self–timed flow–through FIFOs," *Advanced Research in VLSI*, pp. 76–90, IEEE Computer Society Press, 1995.

Chris J. Myers, "Computer Aided Synthesis and Verification of Gate–Level Timed Circuits", *Ph.D. Thesis, Stanford University*, Oct., 1995.

Steven M. Nowick, "Automatic Synthesis of Burst–Mode Asynchronous Controllers," Ph.D. Thesis, CSL–TR–95–686, Stanford University, Department of Computer Science, Dec. 1995.

K.Y. Yun, R.P. Donohue, "Pausible Clocking: A First Step Toward Heterogeneous Systems," ICCD '96, pp. 118–123.M.R. Greenstreet, "Implementing a STARI Chip," ICCD '95, pp. 38–43.

Ad Peeters, "Single–Rail Handshake Circuits," Ph.D. Thesis, Eindhoven Technical University, 1996.

L.S. Nielsen, J. Sparsø, "A Low–power Asynchronous Data–path for a FIR Filter Bank," *Proc. of Async '96*. IEEE Computer Society Press, Mar. 1996.

R. Kol. R. Ginosar, "A doubly–latched asynchronous pipeline," *Proc. of ICCD '96*, p. 706–711, Oct. 1996.

J. Cortadella and M. Kishinevsky and A. Kondratyev and L. Lavagno and A. Yakovlev, "Petrify: a tool fo manipulating concurrent specifications and synthesis of asynchronous controllers," *IEICE Transactions on Information and Systems*, vol. E80–D, No. 3, pp. 315–325, Mar. 1997.

D. S. Bormann, P.Y.K. Cheung, "Asynchronous Wrapper for Heterogeneous System," Proc. ICCD'97, pp. 307–314.

R. Negulescu, "A Technique for Finding and Verifying Speed–Dependences in Gate Circuits", *Proc. International Workshop on Timing Issues in the Specification and Synthesis of Digital Systems* (TAU), Dec. 1997.

K.K. Yi, "The Design of a Self–Timed Low Power FIFO Using a Word–Slice Structure", *M. Phil Thesis, Univ. of Manchester*, Sep. 1998.

R. Kol, R. Ginosaur, "Adaptive Synchronization for Multi Synchronous Systems," ICCD '98. pp. 188–198.

Charles E. Molnar, I.W. Jones, W.S. Coates, J.K. Lexau, S.M. Fairbanks, I.E. Sutherland, "Two FiFO Ring Performance Experiments" *Proceedings of the IEEE*, 87(2), pp. 297–307, Feb. 1999.

L. Carloni, K. McMillan, A. Saldanha, A. Sangiovanni–Vincetelli, "A Methodology fir Correct–by–Construction Latency Insensitive Design", ICCAS'99.

R.M. Fuhrer, "Sequential Optimization of Asynchronous and Synchronous Finite–State Machines: Algorithms and Tools," Ph.D. Thesis, Columbia University, May 1999.

R.M. Fuhrer, S.M. Nowick, M. Theobald, N.K. Jha, B. Lin, L. Plana, "MINIMALIST: An environment fo Synthesis, Verification and Testability of Burst–Mode Asynchronous Machines," CUCS–020–99, Columbia University, Computer Science Department, 1999.

Sjogren et al., "Interfacing Synchronous and Asynchronous Modules Within a High–Speed Pipeline", IEEE vol. 8, No. 5, pp. 573–583, Oct. 2000.

International Application PCT/US01/13226, "Circuits and Methods for High–Capacity Asynchronous Pipeline Processing," Montek Singh and Steven Nowick. Specification, drawings & claims, No Date.

International Application PCT/US01/13777, "A Low–Latency FIFO Circuit for Mixed Clock Systems," Tiberiu Chelcea and Steven Nowick. Specification, drawings & claims No Date.

International Application PCT/US01/18667, "Low Latency FIFO Circuits for Mixed Asynchronous and Synchronous Systems," Tiberiu Chelcea and Steven Nowick, filed Jun. 8, 2001, Specification, drawings & claims.

* cited by examiner

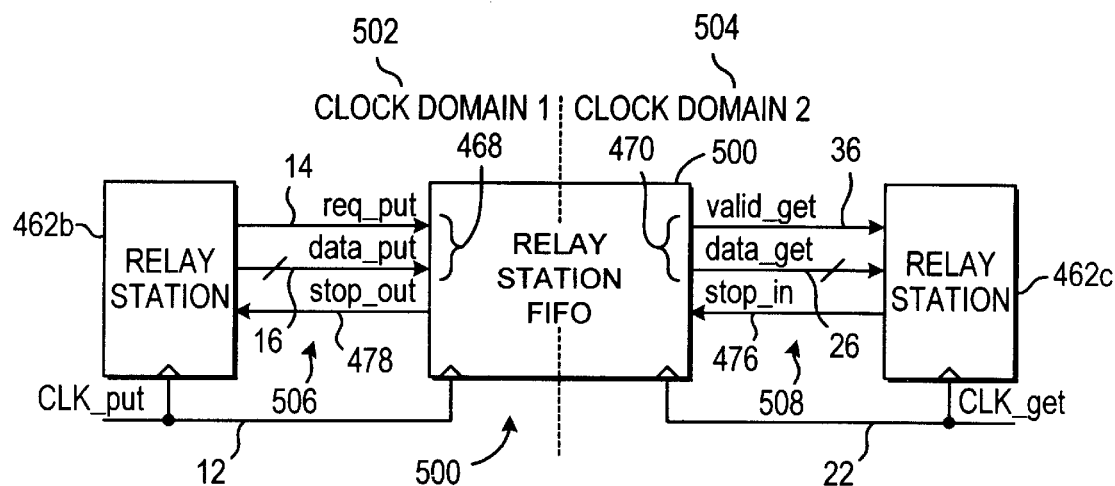
FIG. 39
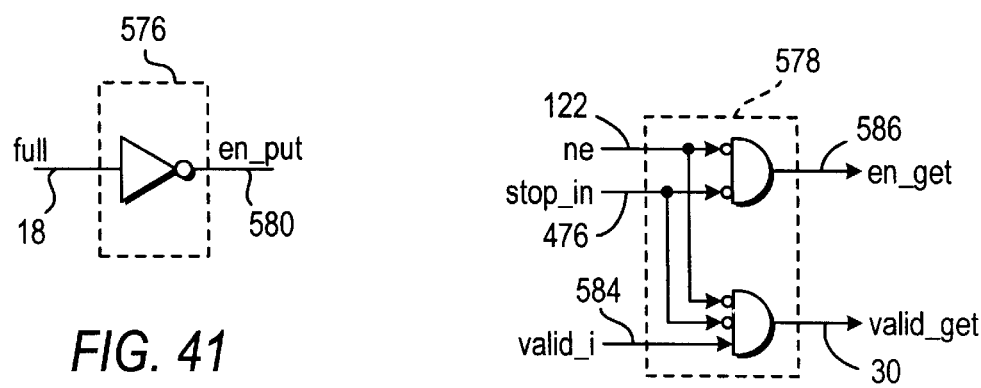
FIG. 41
FIG. 42

LOW LATENCY FIFO CIRCUITS FOR MIXED ASYNCHRONOUS AND SYNCHRONOUS SYSTEMS

CROSS-REFERENCE TO RELATED APPLICATION

This application claims priority to U.S. Provisional Patent Application entitled "Low-Latency FIFO For Mixed-Clock Systems," Ser. No. 60/210,642, which was filed on Jun. 9, 2000, and U.S. Provisional Patent Application entitled "Low-Latency Asynchronous FIFO's Using Token Rings," Ser. No. 60/210,644, filed Jun. 9, 2000, both of which are incorporated by reference in their entirety herein.

STATEMENT OF GOVERNMENT RIGHT

The present invention was made in part with support from United States National Science Foundation (NSF), grant no. CCR-97-34803. Accordingly, the United States Government may have certain rights to this invention.

BACKGROUND OF THE INVENTION

1. Field of the Invention

This invention relates to FIFO circuits, and more particularly to low latency FIFO designs that interface subsystems working at different speeds and that may be synchronous or asynchronous, and between subsystems with very long interconnection delays.

2. Background of Related Art

A trend in VLSI is increasingly towards a "system-on-a-chip" involving many clock domains. A challenging problem is to robustly interface these domains. There have been few adequate solutions, especially ones providing reliable low-latency communication.

There are two fundamental challenges in designing systems-on-a-chip. A first challenge concerns systems operating under different timing assumptions. These timing assumptions include different clock speeds, as well as both synchronous and asynchronous environments. A second challenge concerns designs having long delays in communication between systems.

A number of FIFO circuits and components have been developed to handle timing discrepancies between subsystems. Some designs are limited to handling single-clock systems. These approaches have been proposed to handle clock skew, drift and jitter (R. Kol et al., "Adaptive Synchronization for Multi-Synchronous System," *IEEE International Conference on Computer Design (ICCD'98)*, pp. 188–189, October 1998; and M. Greenstreet, "Implementing a STARI Chip," *Proceedings IEEE International Conference on Computer Design (ICCD)*, pp. 38–43, 1995). To handle long interconnect delays, "latency—insensitive protocols" have been proposed (See, e.g., relay stations as disclosed in L. Carloni et al., "A Methodology for Correct-by-Construction Latency Insensitive Design," ICCAD, 1999, which is incorporated by reference in its entirety herein); however their solution was limited to a single clock domain.

Several designs have also been proposed to handle mixed-timing domains. One category of design approaches attempts to synchronize data items and/or control signals with the receiver, without interfering with its clock. In particular, Seizovic robustly interfaces asynchronous with synchronous environments through a "synchronization FIFO". (J. Seizovic, "Pipeline Synchronization," *Proceedings International Symposium on Advanced Research in Asynchronous Circuits and Systems*, pp. 87–96, November 1994). However, the latency of this design is proportional with the number of FIFO stages, whose implementation include expensive synchronizers. Furthermore, his design requires the sender to produce data items at a constant rate.

Other designs achieve robust interfacing of mixed-clock systems by temporarily modifying the receiver's clock. Synchronization failures are avoided by pausing or stretching the receiver's local clock. Each communicating synchronous system is wrapped with asynchronous logic, which is responsible for communicating with the other systems and for adjusting the clocks. This approach changes the local systems' clocks, and may introduce latency penalties in restarting them.

Jerry Jex et al. U.S. Pat. No. 5,598,113 describes a mixed-clock FIFO circuit. However, the FIFO circuit described in '113 has a significantly greater area overhead in implementing the synchronization. For example, this design has two synchronizers for every cell.

Accordingly, there exists a need in the art for a FIFO circuit having low latency and high throughput and capable of operation in mixed synchronous/asynchronous environments.

SUMMARY OF THE INVENTION

An object of the present invention is to provide a FIFO circuit having low latency and high throughput.

Another object of the invention is to provide a FIFO circuit useful in mixed synchronous/asynchronous environments.

A further object of the present invention is to provide a FIFO circuit which may be used as a relay station in connection with long delays and mixed synchronous/asynchronous environments.

A still further object of the present invention is to provide FIFO circuit components which are configured for use in particular protocol of operation, i.e., synchronous or asynchronous, and which are capable of being used in connection with other components regardless of the protocol of operation of the other components.

These and other objects of the invention which will become apparent with respect to the disclosure herein, are accomplished by a FIFO circuit which interfaces the transmission of data items between a sender subsystem operating under a first protocol of operation and a receiver subsystem operating under a second protocol of operation.

A put interface is configured to operate according to the first protocol of operation and comprises a put data bus to transmit a data item from the sender subsystem and a put data request input to receive a put request from the sender subsystem to enqueue the data item from the put data bus. A get interface is configured to operate according to the second time domain and comprises a get data bus to transmit the data item to the receiver subsystem and a get data request input to receive a get request from the receiver subsystem to dequeue the data item to the get data bus.

An array of cells is provided. Each cell has a register configured to receive the data item from the put data bus and to transmit the data item to the get data bus, a state indicator providing an indication of the state of the cell, a put component configured to operate according to the first protocol of operation and a get component configured to operate according to the second protocol of operation.

The put component receives the put token from a first adjacent cell, latches the data item received from the put data bus to the register based on the put request, the put token, and the state of the cell, and passes the put token to a second adjacent cell. The get component receives the get token from the first adjacent cell, dequeues the data item from the register to the get data bus based on the get request, the get token, and the state of the cell, and passes the get token to the second adjacent cell.

In accordance with the invention, the objects as described above have been met, and the need in the art for a FIFO circuit having low latency and high throughput and capable of operation in mixed synchronous/asynchronous environments has been substantially satisfied. Further features of the invention, its nature and various advantages will be more apparent from the accompanying drawings and the following detailed description of illustrative embodiments.

BRIEF DESCRIPTION OF THE DRAWINGS

FIG. 39 is a schematic block diagram illustrating a FIFO circuit relay station in accordance with the invention.

FIG. 41 is detailed schematic view of a portion of the FIFO circuit relay station illustrated in FIG. 40 in accordance with the invention.

FIG. 42 is detailed schematic view of another portion of the FIFO circuit relay station illustrated in FIG. 40 in accordance with the invention.

DETAILED DESCRIPTION OF THE EXEMPLARY EMBODIMENTS

The FIFO circuits in accordance with the invention mediate between two subsystems: a sender subsystem which produces data items and a receiver subsystem which consumes data items. The FIFO circuits are implemented as a circular buffer of identical cells, in which each cell communicates with the two subsystems on common data buses. The input and output behavior of a cell is dictated by the flow of two tokens around the ring: one for enqueuing data and one for dequeuing data. Data items are not moved around the ring once they are enqueued, thus providing the opportunity for low-latency: once a data item is enqueued, it is shortly thereafter available to be dequeued.

Each FIFO circuit is partitioned into modular components which may be used with other modular components in a number of different systems, as will be described below. A set of interfaces, or portions of the FIFO circuit, can be combined together to obtain complete FIFO circuits which meet the desired timing assumptions on both the sender's and receiver's end, as will be described herein. As used herein, "time domain" shall refer to whether the subsystem is synchronous or asynchronous.

Figure 1:
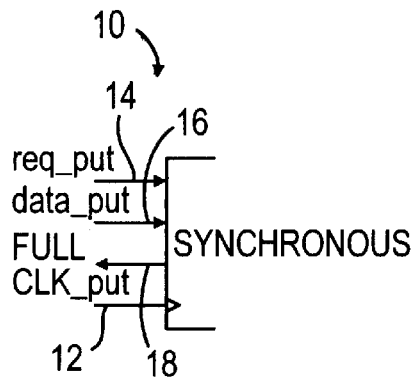
FIG. 1 is a schematic view of a synchronous put interface in accordance with the invention.
Figure 3:
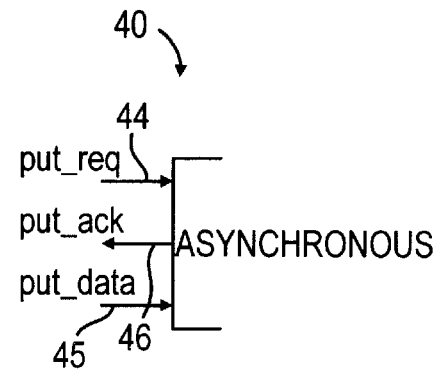
FIG. 3 is a schematic view of an asynchronous put interface in accordance with the invention.
Figure 2:
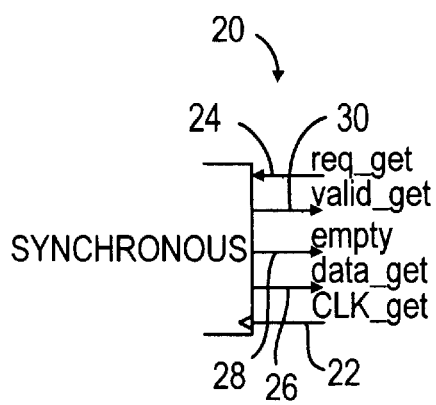
FIG. 2 is a schematic view of a synchronous get interface in accordance with the invention.
Figure 4:
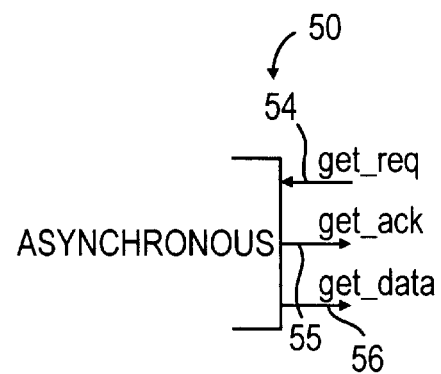
FIG. 4 is a schematic view of an asynchronous get interface in accordance with the invention.

In accordance with the invention, each FIFO circuit has two interfaces, or portions of the FIFO circuit which are designed to cooperate with the environment. First, the put interface is the portion of the FIFO circuit which communicates with the sender subsystem. A synchronous put interface is illustrated in FIG. 1, and an asynchronous put interface is illustrated in FIG. 3. Second, the get interface is the portion of the FIFO circuit which communicates with the receiver subsystem. FIG. 2 illustrates a synchronous get interface, and FIG. 4 illustrates an asynchronous get interface. A FIFO circuit which interfaces with the environment, whether both the sender and receiver subsystems are synchronous, synchronous and asynchronous, or asynchronous and synchronous, respectively, may be assembled by attaching a put interface and a get interface which properly correspond to the conditions presented.

FIGS. 1–2 illustrate two synchronous interfaces in accordance with the invention. The synchronous put interface 10, illustrated in FIG. 1, is controlled by sender clock signal 12 (CLK_put). There are two inputs to the synchronous put interface 10, a put request signal 14 ($req_{13}$ put), which communicates requests by the sender to enqueue data and a sender data bus 16 (data_put), which is the bus for data items. The global full signal 18 (full) is only asserted when the FIFO circuit is full, otherwise it is de-asserted.

FIG. 2 illustrates the synchronous get interface 20, which is controlled by receiver clock signal 22 (CLK_get). A single control input from the receiver to dequeue a data item is get request signal 24 (req_get). Data is placed on the receiver data bus 26 (data_get). A global empty signal 28 (empty) is asserted only when the FIFO circuit is empty. The valid data signal 30 (valid_get) indicates that the data item is valid.

The asynchronous interfaces, illustrated in FIGS. 3–4, are not synchronized to a clock signal. FIG. 3 illustrates an asynchronous put interface 40 has two inputs which are substantially similar to the inputs of synchronous put interface 10 (FIG. 1). First, a put request signal 44 (put_req) is provided, which communicates requests by the sender to enqueue data, and second, a sender data bus 46 (put_data) is provided for the output of data items. In contrast to synchronous put interface 10, this interface does not have a global full signal; instead, the asynchronous put interface 40 provides a put acknowledgement signal 45 (put_ack) when the put operation is completed.

The asynchronous get interface 50, illustrated in FIG. 4, has a get request signal 54 (get_req) and an output data bus 58 (get_data). Unlike the synchronous counterpart, this interface does not have a data validity signal or a global empty signal. The asynchronous get interface 50 provides a get acknowledgement signal 55 (get_ack), which indicates that the get operation is completed.

The modular interfaces 10, 20, 40, and 50 of FIGS. 1, 2, 3, and 4, respectively, may be attached in accordance with the invention to create FIFO circuits which may transmit data between different environments. For example, a FIFO circuit which interfaces between a synchronous sender subsystem and a synchronous receiver subsystem may be formed by using the synchronous put interface 10 and the synchronous get interface 20, in order to form a FIFO circuit referred to herein as a "synch-synch" FIFO circuit, as will be described with respect to exemplary embodiment FIFO circuit 100. Similarly, a FIFO circuit that interfaces between an asynchronous sender subsystem and a synchronous receiver subsystem would incorporate asynchronous put interface 40 along with synchronous get interface 20, which may be referred to as an "asynch-synch" FIFO, and will be described in greater detail with respect to exemplary embodiment FIFO circuit 200. Likewise, to interface between a synchronous sender subsystem and an asynchronous receiver subsystem, which may be referred to as a "synch-asynch" FIFO, may utilize synchronous put interface 10 and asynchronous get interface 50, as described herein with respect to exemplary embodiment FIFO circuit 300.

Figure 6:
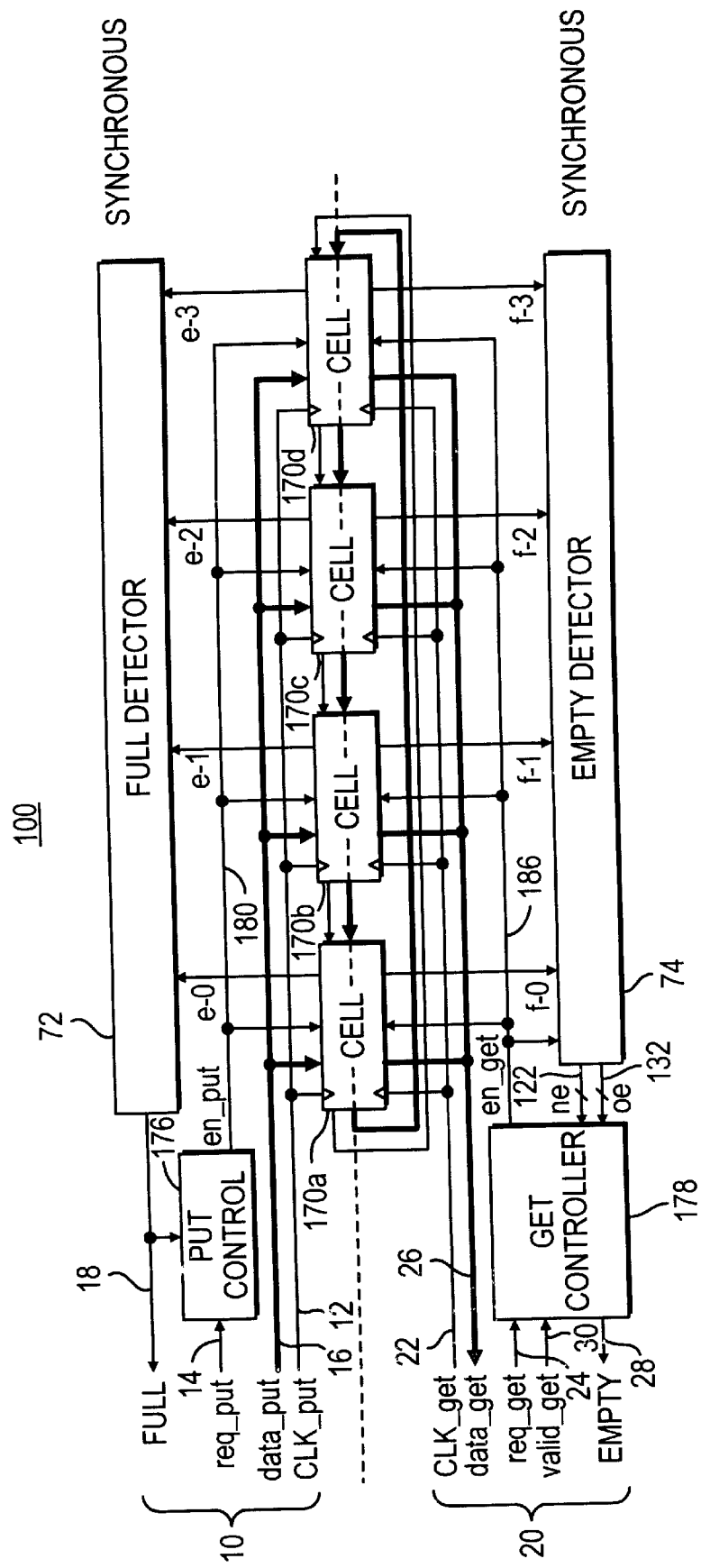
FIG. 6 is a more detail schematic block diagram of the FIFO circuit illustrated in FIG. 5.
Figure 8:
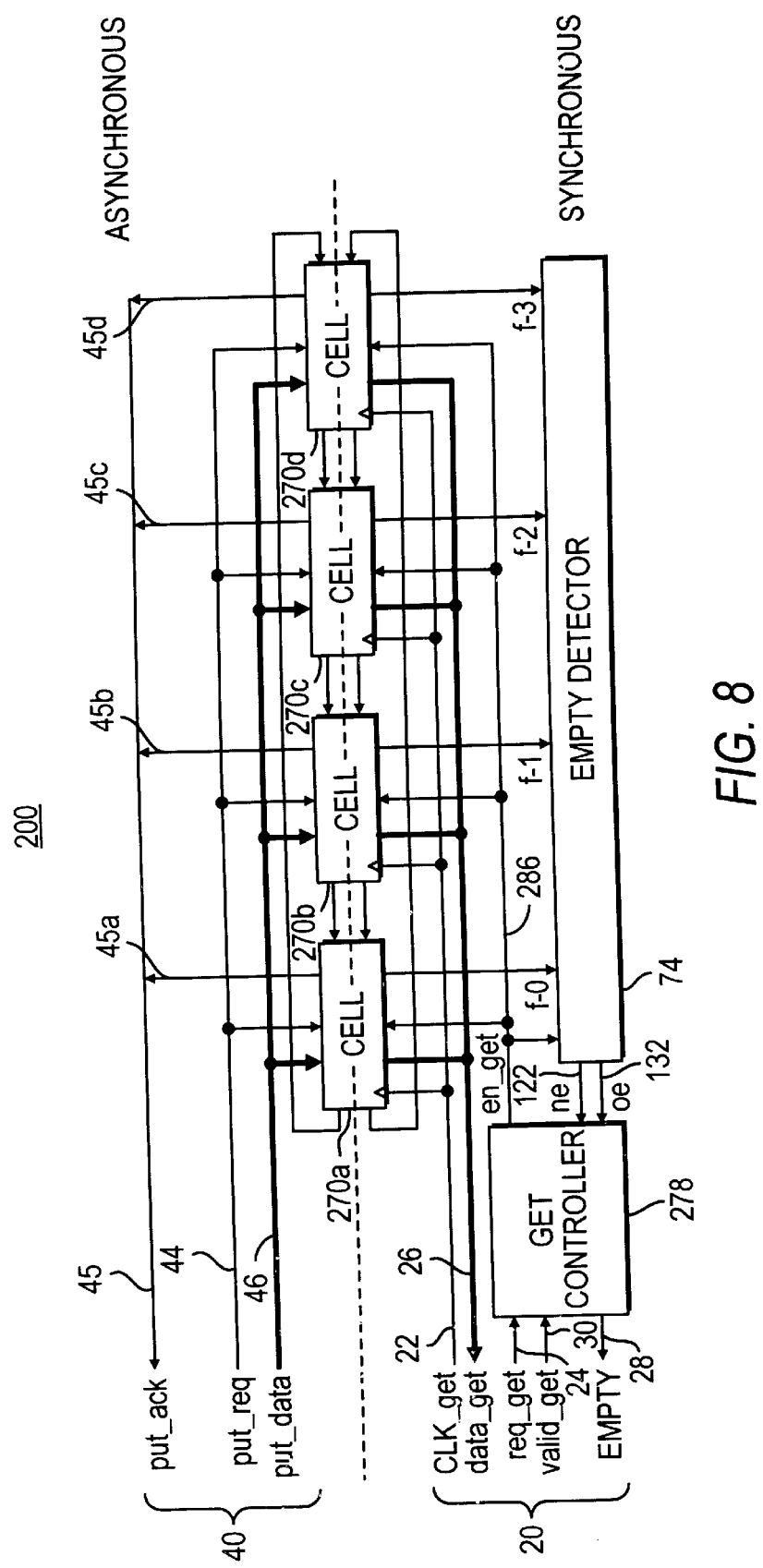
FIG. 8 is a more detail schematic block diagram of the FIFO circuit illustrated in FIG. 7.
Figure 10:
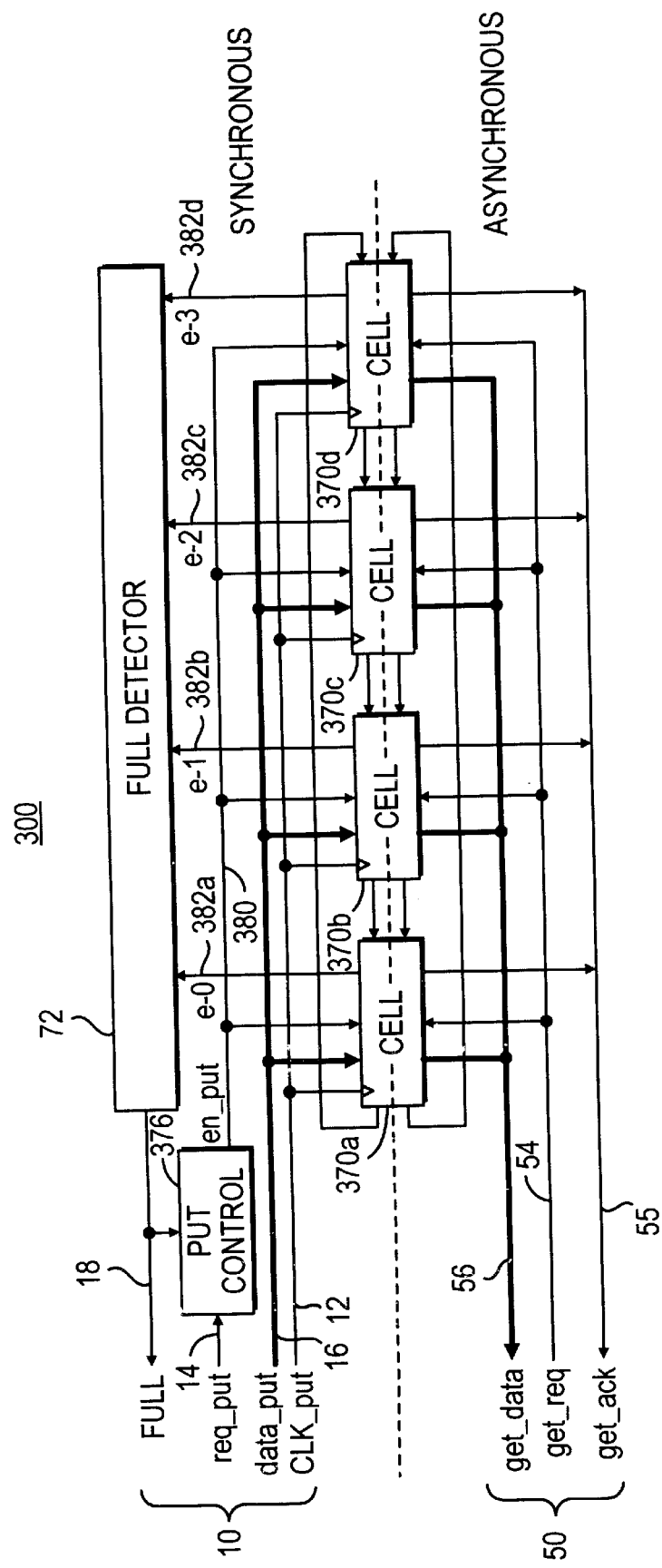
FIG. 10 is a more detail schematic block diagram of the FIFO circuit illustrated in FIG. 9.

FIFO circuits 100, 200, and 300 of FIGS. 6, 8, and 10, respectively, are substantially similar, with the differences noted herein. For example, each FIFO circuit 100, 200, and 300 has a circular array of identical cells which communicate with the put and get interfaces on common data buses. The control logic for each operation is distributed among the cells, and allows concurrency between the two interfaces. Data is immobile in the array of cells. Consequently, once a data item is enqueued, it is not moved, and is simply dequeued in place.

At any time, there are two tokens in the FIFO circuits 100, 200, and 300, i.e., a put token and a get token. The input and output behavior of the FIFO circuits 100, 200 and 300 is controlled by these tokens. The put token is used to allow the enqueuing of data items, and the get token is used to allow the dequeuing of data items. A cell having the put token may be considered the "tail" of the queue, and the cell having the get token may be considered the "head" of the queue. In normal operation, the put token is typically ahead of the get token. Once a cell has used a token for a data operation, the token is passed to the next cell after the respective operation is completed. The token movement is controlled both by interface requests as well as by the state of the FIFO circuit, i.e., empty or full, as will be described in greater detail below.

There are several advantages that are common to the architectures of FIFO circuits 100, 200, and 300. Since data is not passed between the cells from input to output, the FIFO circuits have a potential for low latency. Consequently, as soon as a data item is enqueued, it is also available for dequeuing. Secondly, the FIFO circuits offer the potential for low power: data items are immobile while in the FIFO circuit. Finally, these architectures are highly scalable; the capacity of the FIFO circuit and the width of the data item can be changed with very few design modifications.

Figure 5:
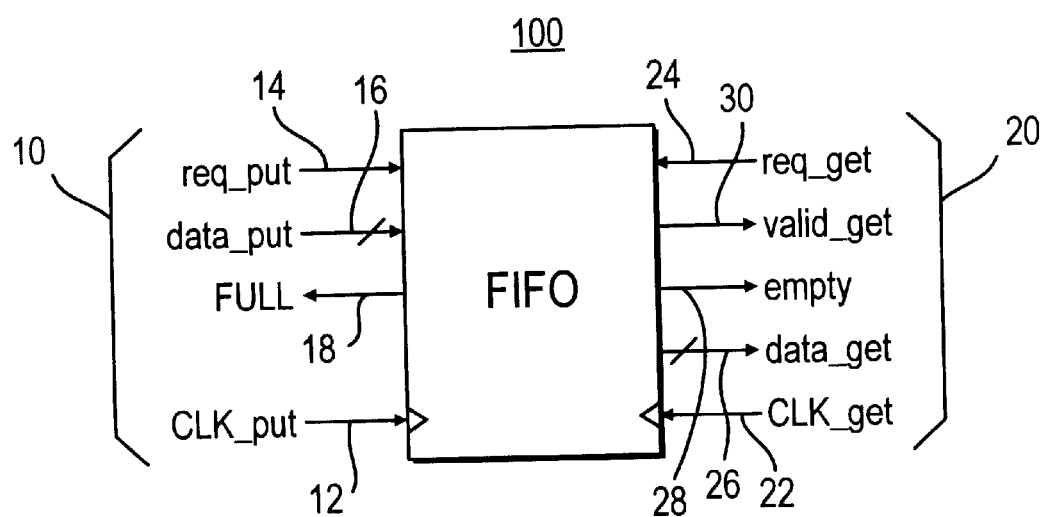
FIG. 5 is a schematic block diagram of an exemplary FIFO circuit in accordance with a first embodiment of the invention.

The FIFO circuit 100 in accordance with a first exemplary embodiment is illustrated in FIGS. 5 and 6. The FIFO circuit 100 may be used when the sender subsystem is synchronous and the receiver subsystem is also synchronous. Consequently, the modular synchronous put interface 10 is used in connection with the modular synchronous get interface 20, as illustrated in FIG. 5. The sender subsystem operates on the sender clock signal 12 (CLK_put), and the receiver subsystem operates on the receiver clock signal 22 (CLK_get).

As illustrated in FIG. 6, FIFO circuit 100 is constructed with a circular array of identical cells 170a, 170b, 170c, and 170d, and communicates with the two external interfaces, i.e., the synchronous put interface 10 on sender data bus 16 (data_put) and the synchronous get interface 20 on receiver data bus 26 (data_get).

The synchronous interfaces 10 and 20 have two additional types of components: (1) detectors, which determine the current state of the FIFO circuit 100, i.e., empty or full, and (2) external controllers, which conditionally pass requests for data operations to the cell array. As is known in the art, a data operation on a synchronous interface is completed within a clock cycle; therefore, the environment does not need an explicit acknowledgement signal. However, if the FIFO circuit 100 becomes full (or empty), the environment may need to be stopped from communicating on the put (or get) interface. Detectors and controllers operate in the FIFO circuit 100 to detect the exception cases, and stall the respective interface if it is not safe to perform the data operation. As illustrated in FIG. 6, the full detector 72 and empty detector 74 observe the state of all cells 170a, 170b, 170c, and 170d and compute the global state of the FIFO circuit 100, i.e., full or empty. The output of the full detector 72 may passed to the put interface 10, while the output of the empty detector 72 may be passed to the get interface 20. The put controller 176 and get controller 178 filter data operation requests to the FIFO circuit 100. Thus, the put controller 176 usually passes put requests from the sender subsystem, but disables them when the FIFO circuit is full. Similarly, the get controller 178 normally forwards get requests from the receiver subsystem, but blocks them when the FIFO circuit 100 is empty. The detectors 72 and 74, the external controllers 176 and 178, and the definitions of "empty" and "full" will be described in greater detail below.

Figure 7:
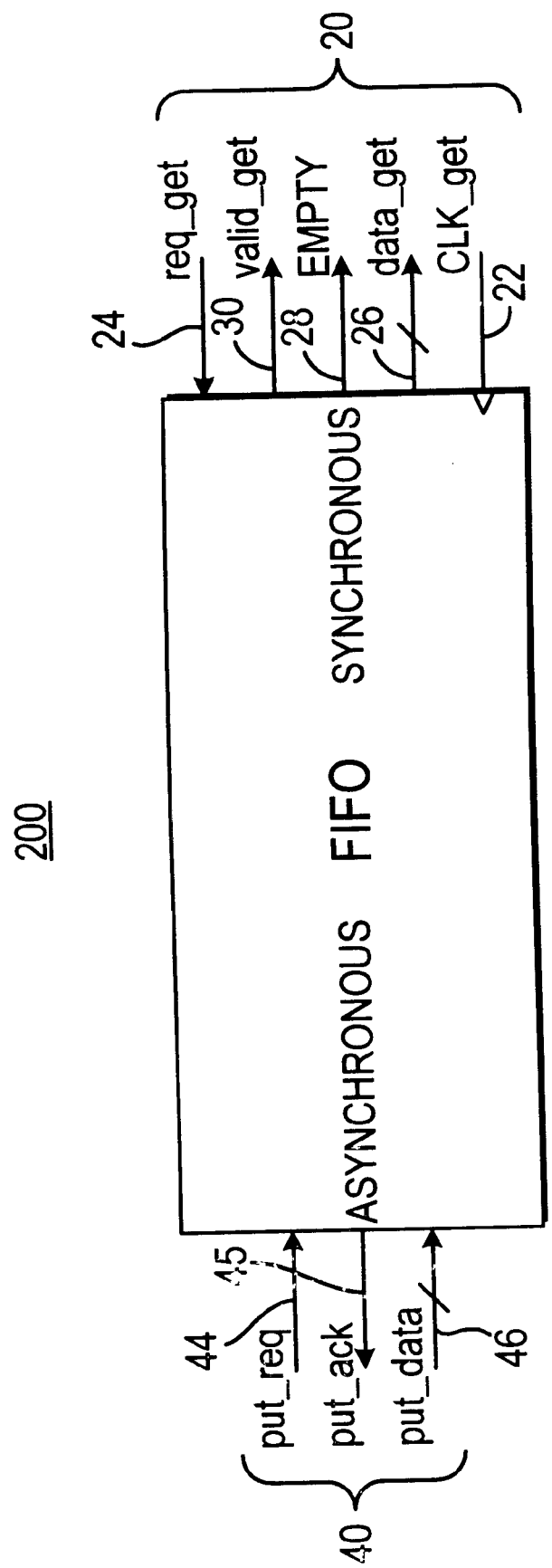
FIG. 7 is a schematic block diagram of an exemplary FIFO circuit in accordance with a second embodiment of the invention.

The FIFO circuit 200 in accordance with a second exemplary embodiment is illustrated in FIGS. 7 and 8. The FIFO circuit 200 may be used when the sender subsystem is asynchronous and the receiver subsystem is synchronous. Consequently, the modular asynchronous put interface 40 is used in connection with the modular synchronous get interface 20, as illustrated in FIG. 7. The sender subsystem operates asynchronously, while the receiver subsystem operates on the receiver clock signal 22 (CLK_get).

As illustrated in FIG. 8, FIFO circuit 200 is constructed with a circular array of identical cells 270a, 270b, 270c, and 270d, and communicates with the two external interfaces, the asynchronous put interface 40 and the synchronous get interface 20 on common data buses: a sender data bus 46 (data_put) and receiver data bus 16 (get_data).

The synchronous get interface 20, as described above with respect to FIG. 6, includes an empty detector 74 and a get controller 278. The get controller 278 typically passes get requests from the receiver subsystem, but disables such requests when the FIFO circuit 200 is empty. In contrast to synchronous interfaces, asynchronous interfaces, such as asynchronous put interface 40, do not include full or empty detectors or external controllers. Since an asynchronous interface does not operate on a clock signal, it does not need to raise an exception, such as "full" or "empty," to temporarily stall data operation. Therefore, when a FIFO circuit having an asynchronous interface becomes full (or empty), the put (or get) acknowledgement can be withheld indefinitely until it is safe to perform the data operation. In the case of FIFO circuit 200, the put acknowledgement signal 45 (put_ack) is withheld when the FIFO circuit 200 is full, and transmitted when it is safe to perform the put operation.

Figure 9:
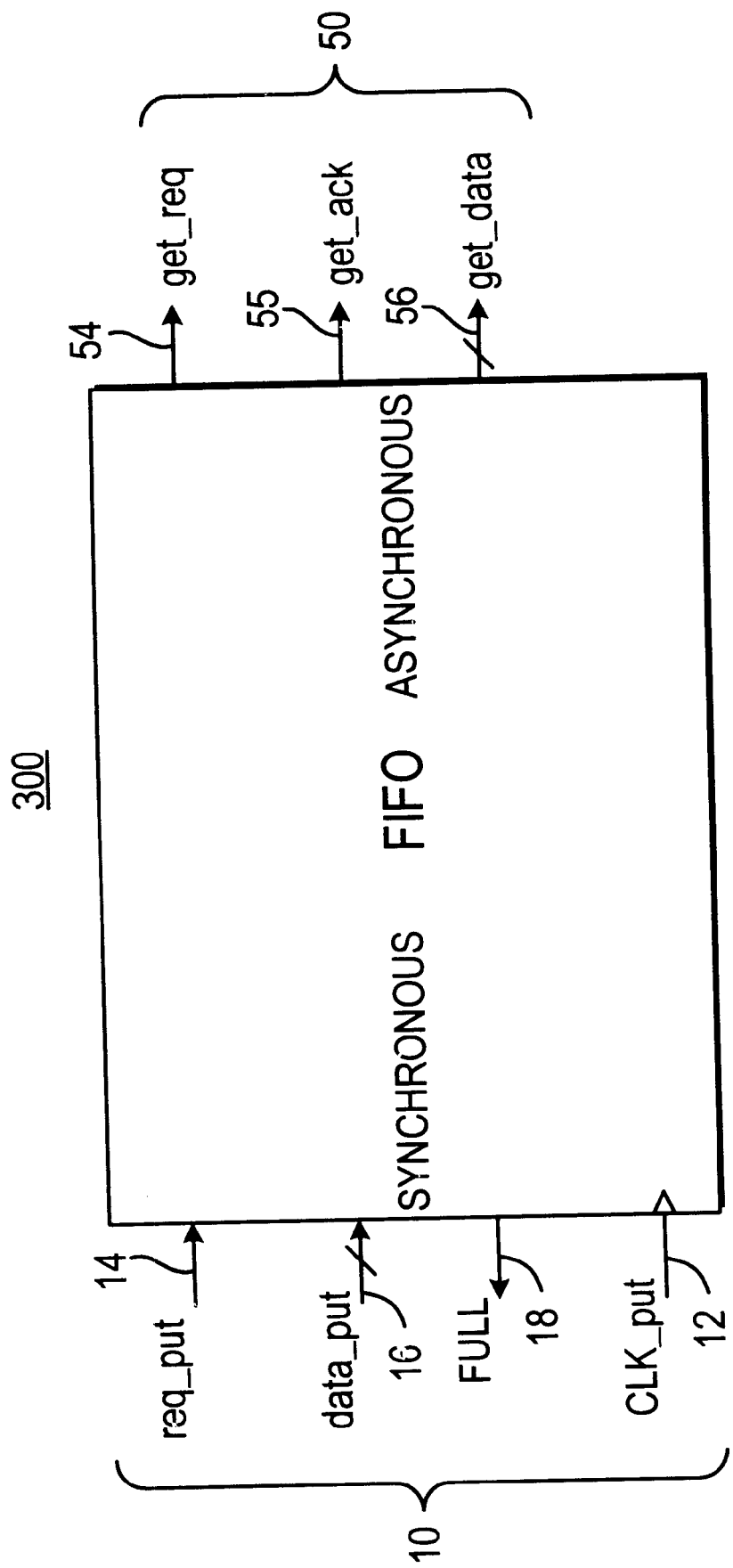
FIG. 9 is a schematic block diagram of an exemplary FIFO circuit in accordance with a third embodiment of the invention.

FIGS. 9 and 10 illustrate the FIFO circuit 300 in accordance with a third exemplary embodiment. The FIFO circuit 300 may be used when the sender subsystem is synchronous and the receiver subsystem is asynchronous. The synchronous put interface 10 is used in connection with the asynchronous get interface 50, as illustrated in FIG. 9. The sender subsystem operates on the sender clock signal 12 (CLK_put), while the receiver subsystem operates asynchronously.

As illustrated in FIG. 10, FIFO circuit 300 contains a circular array of identical cells 370a, 370b, 370c, and 370d, and communicates with the two external interfaces, the synchronous put interface 10 and the asynchronous get interface 50 on common data buses a sender data bus 16 (data_put) and receiver data bus 56 (get_data).

The synchronous put interface 10, as described above with respect to FIG. 6, includes a full detector 72 and a put controller 376. FIFO circuit 300 does not have an empty detector; instead, the get acknowledgement signal 55 (get_ack) is withheld when the FIFO circuit 300 is empty, and transmitted when it is safe to perform the get operation.

Figure 11:
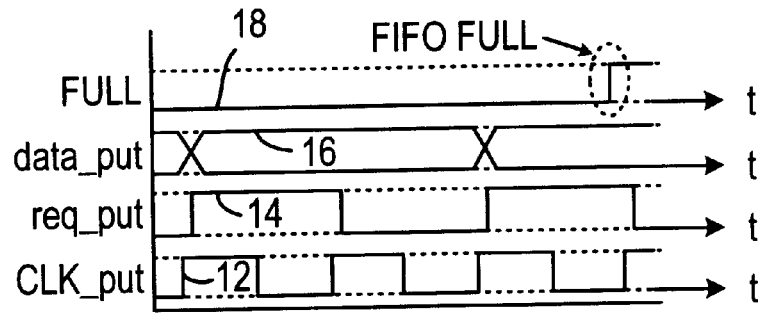
FIG. 11 is a time plot of exemplary signals applied in connection with a synchronous put protocol in accordance with the invention.

The synchronous put protocol is illustrated in FIGS. 11, and discussed in connection with FIG. 1. The synchronous put interface 10 starts a put operation when it receives a put request signal 14 (put_req) and a data item on the put data bus 16 (data_put), immediately after the positive edge of sender clock signal 12 (CLK_put). The data item is enqueued immediately after the positive edge of the next clock cycle (not shown). If the FIFO circuit becomes full, then the global full signal 18 (full) is asserted before the next clock cycle, as illustrated in FIG. 11, and the synchronous put interface 10 is prevented from any further operation.

Figure 12:
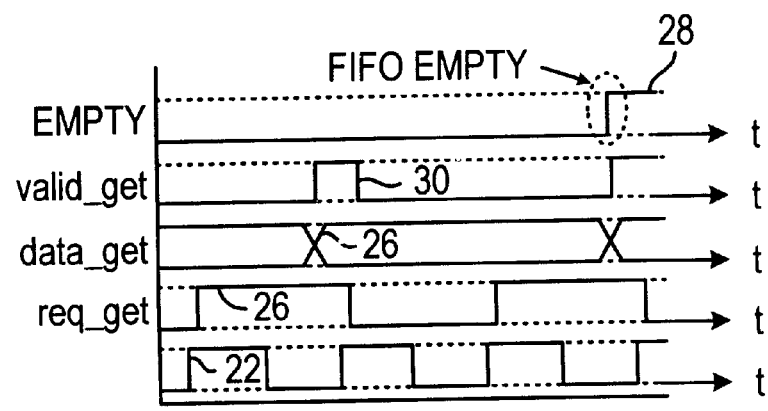
FIG. 12 is a time plot of exemplary signals applied in connection with a synchronous get protocol in accordance with the invention.

FIG. 12 illustrates the synchronous get protocol, which is discussed in connection with FIG. 2, above. A synchronous get operation is enabled by a get request signal 24 (req_get), which is asserted immediately after the positive edge of receiver clock signal 22 (CLK_get). By the end of the clock cycle, a data item is placed on get data bus 28 (data_get) together with its validity signal 30 (valid_get). If the FIFO circuit becomes empty during that clock cycle, then the global empty signal 28 (empty) is also asserted immediately after the positive edge of the next clock cycle, and the synchronous get interface 20 is stalled until the FIFO circuit becomes non-empty. Following a get request 24 (req_get), then validity signal 30 (valid_get) and global empty signal 28 (empty) can indicate three outcomes: (a) a data item may be dequeued, and more data items available (i.e., valid_get=1, empty=0); (b) a data item may be dequeued, and FIFO circuit has become empty (i.e., valid_get=1, empty=1); or (c) the FIFO circuit is empty, and no data item is dequeued (valid_$_{get=}$0, empty=1).

Figure 13:
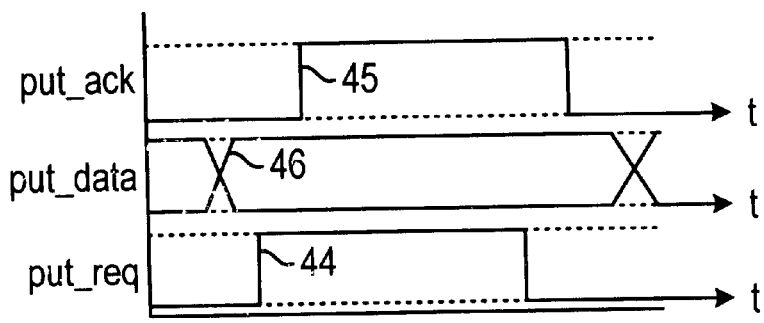
FIG. 13 is a time plot of exemplary signals applied in connection with an asynchronous put protocol in accordance with the invention.
Figure 14:
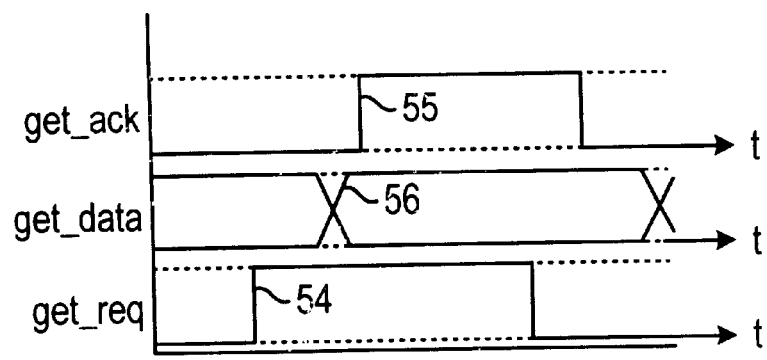
FIG. 14 is a time plot of exemplary signals applied in connection with an asynchronous get protocol in accordance with the invention.

The asynchronous put and get protocols are illustrated in FIGS. 13 and 14. Since the asynchronous interfaces do not have a clock, they use a 4-phase bundle-data style of communication, as is known in the art (Further details on bundle-data communication are described in S. Furber, "Asynchronous Design," *Proceedings of Submicron Electronics*, pp. 461–492, 1997; I. Sutherland, "Micropipelines," *Communications of the ACM*, 32(6), pp. 720–738, Jun. 1989, and H. van Gageldonk et al., "An Asynchronous Low-Power 80C51 Microcontroller," *Proceedings International Symposium on Advanced Research in Asynchronous Circuits and Systems*, pp. 96–107, 1998, which are incorporated by reference in their entirety herein.) Data items must have stable values on the data buses before a data operation is requested.

As illustrated in FIG. 13, the sender starts a put operation by placing a data item on the sender data bus 46 (put_data) and issuing a request to the FIFO circuit to enqueue it by asserting put request signal 44 (put_req). The completion of the enqueuing operation is indicated by asserting put acknowledgement signal 45 (put_ack). The two control wires are subsequently reset to the idle state, first put request 44 (put_req) and then put acknowledgement 45 (put_ack).

Similarly, an asynchronous get operation is illustrated in FIG. 14. The get operation is performed by asserting the get request signal 54 (get_req) and by dequeuing a data item onto the get data bus 56 (get_data). Upon completion of this operation, the get acknowledgement signal 55 (get_ack) is asserted. Subsequently, the get request signal 54 (get_req) is de-asserted and then the get acknowledgement signal 55 (get_ack) is also de-asserted.

In order to construct FIFO circuits 100, 200 and 300 which operate correctly with synchronous and asynchronous systems, each cell has a configuration that consists of four distinct, interchangeable component parts that are selected to interface with the sender or receiver environment: (1) a put component that performs the put operation and is configured to operate with the sender environment, i.e., synchronous or asynchronous, (2) a get component that performs the get operation and is configured to operate with the receiver environment, i.e., synchronous or asynchronous, (3) a data validity (DV) controller which provides an indication of whether the cell has a data item, and is configured to operate with both the sender and receiver environments, and (4) a register which is configured to operate with both the sender and receiver environments. Consequently, the put components in cells 170a–d and 370a–d will be substantially identical because they are configured to operate with a synchronous sender environment. The get components in cells 170a–d and 270a–d will be substantially identical because they are configured to operate with a synchronous receiver environment. The put components of cells 270a–d are configured to operate with an asynchronous sender environment, and the get components of cells 370a–d are configured to operate with an asynchronous receiver environment.

The purpose of the data validity controller is to indicate when the cell is full and when it is empty, and when it has valid data. The register in each cell is split into two parts, one belonging to the put component (the write port), and one belonging to the get component (read port). The put component, the get component, the data validity controller, and the register are attached together to obtain a complete cell.

Figure 15:
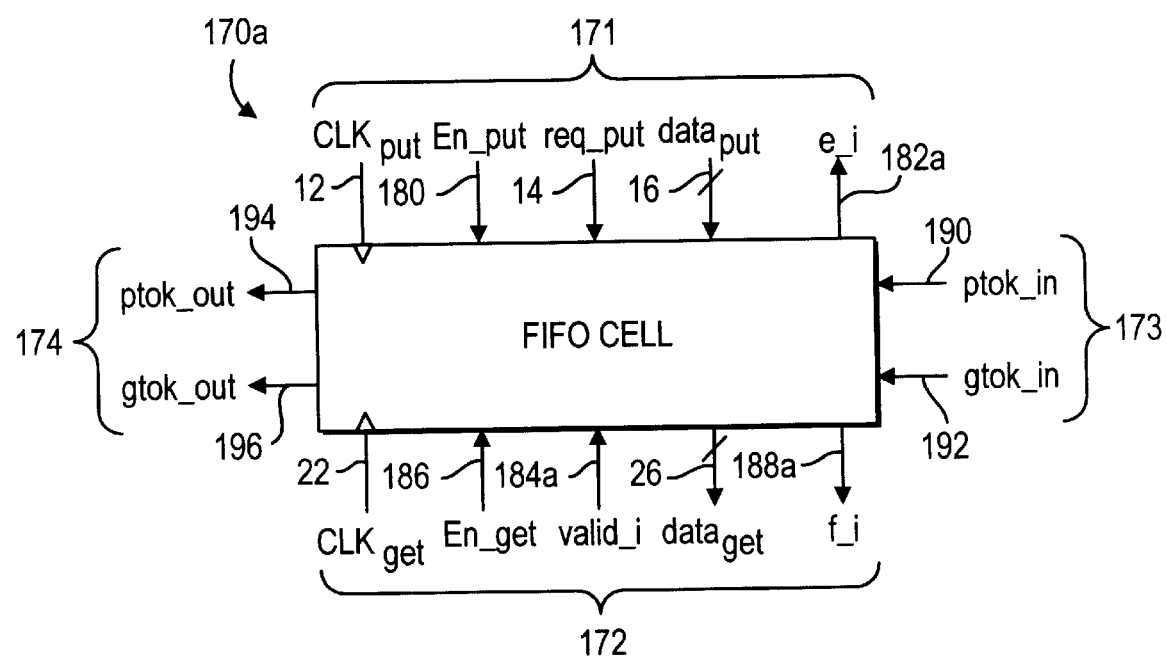
FIG. 15 is an enlarged schematic block diagram, illustrating a portion of the FIFO circuit of FIGS. 5 and 6, in accordance with the invention.
Figure 16:
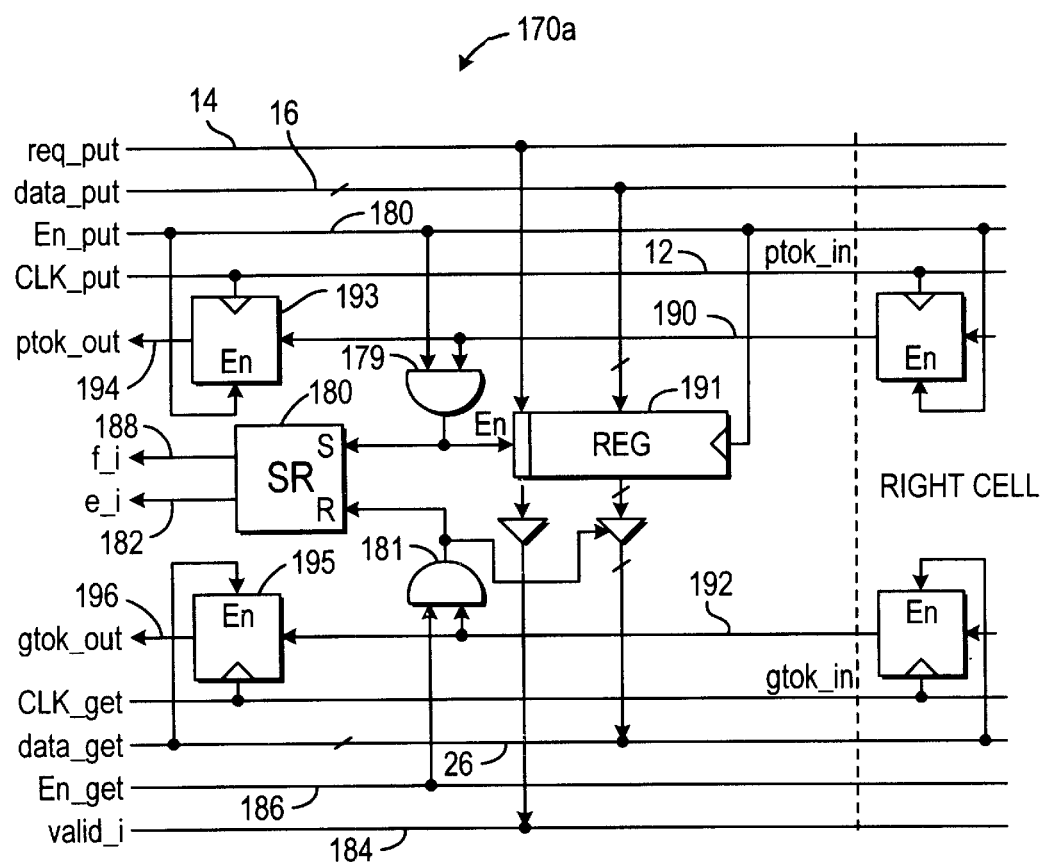
FIG. 16 is a more detailed schematic block diagram of the portion of the FIFO circuit illustrated in FIG. 15, in accordance with the invention.

The FIFO circuit 100, which may be used in connection with a synchronous sender and a synchronous receiver, was described above along with an array of identical cells, 170a, 170b, 170c, and 170d in connection with FIGS. 5 and 6. An exemplary individual cell, such as cell 170a, of FIFO circuit 100 is illustrated in FIGS. 15 and 16. (The following description for cell 170a also applies to cells 170b, 170c, and 170d.) Each cell 170a has four interfaces: (1) a synchronous put interface 171, (2) a synchronous get interface 172, (3) an interface 173 with a right cell in the array of cells, and (4) an interface 174 with a left cell in the array of cells. On the synchronous put interface 171, the cell 170a receives data on the common put data bus 16 (data_put). It is enabled to perform a put operation by the put enable signal 80 (en_put), which is the output of the put controller 76 (See FIG. 6). The put request signal 14 (req_put) indicates data validity (which is always asserted in this embodiment). The passing of put request signal 14 (req_put) to cell 170*a* has been omitted from FIG. 6, above, to avoid complicating the figure. The cell 170*a* communicates with the full detector 72, with empty bit 182 (e_i), which is asserted when the cell 170*a* is empty. The state of the exemplary cell 170*a* is indicated by the data validity (DV) controller, such as asynchronous SR latch 180. On the synchronous get interface 172 (FIG. 15), the cell 170*a* outputs data on the common get data bus 26 (data_get) together with its validity signal 184 (valid_i), which is always asserted in this embodiment. As illustrated in FIG. 6, the validity signal 184 (valid_i) is not used in FIFO circuit 100, but will be used in the several embodiment described below. The synchronous get interface 172 is enabled by get enable signal 186 (en_get), which is the output of get controller 78 (See FIG. 6). The cell 170*a* communicates with the empty detector 74 with the full bit 188*a* (f⁻i), which is asserted when the cell 170*a* is full. On the interface 173 with the right cell, each cell 170*a–d* receives tokens on put token input 190 (ptok_in) and receives the get token input 192 (gtok_in) from the right cell. On the interface 174 with the left cell, each cell 170 passes the tokens on put token output 194 (ptok_out) and the get token output 196 (gtok_out) to the left cell.

Cell 170*a* in accordance with the first embodiment is also shown in FIG. 16. The behavior of cell 170*a* may be illustrated by tracing a put operation and then a get operation through the cell 170*a*. Initially, the cell 170*a* starts in an empty state (i.e., e_i=1 and f_i=0) and without any tokens. The cell 170*a* waits to receive the put token on put token input 190 (ptokn_in=1) from the right cell on the positive edge of sender clock signal 12 (CLK_put), and waits for the sender to place a valid data item on the put data bus 16 (data_put). A valid data item is indicated to all cells by the put enable signal 180 (en_put=1), which is the output of the put controller 176 (See FIG. 6).

When there is valid data and the cell has obtained the put token (i.e., AND 181), the cell 170*a* performs three actions: (1) it enables the register 191 (REG) to latch the data item and also the put request signal 14 (req_put); (2) it indicates that the cell 170*a* has a valid data item (asynchronously sets f_i=1); and (3) it enables the upper left edge-triggered D-type flip-flop ETDFF 193 (en_put=1) to pass the put token to the left cell on the put token output 194 ptok_out. On the positive edge of the next clock cycle of the sender clock signal 12 (CLK_put), the data item and validity bit are finally latched and the put token is passed to the left cell.

Dequeuing data by cell 170*a* proceeds in a substantially identical manner, which the differences noted herein. The cell 170*a* waits to receive the get token on get token input 192 (gtok_in=1) from the right cell. When this occurs, cell 170 enables the broadcasting of the valid bit 183 (v_i), i.e., the latched put request signal 14 (req_put), onto the valid bus 184 (valid_i). When both the get token is received on get token input 192 (gtok_in=1) and the receiver requests a data item with the get enable signal 186 (en_get=1), as implemented by the AND gate 181, the cell 170*a* asynchronously enables the data item to be placed on the common get data bus 26 (data_get) and indicates that the cell 170 is empty (asynchronously sets e_i=1). The arrival of the asserted get enable 186 (en_get) enables the lower left edge-triggered D-type flip-flop ETDFF 195 to pass the get token on the get token output 196 (gtok_out). At the beginning of the next clock cycle, the get token is then passed to the left cell.

Figure 17:
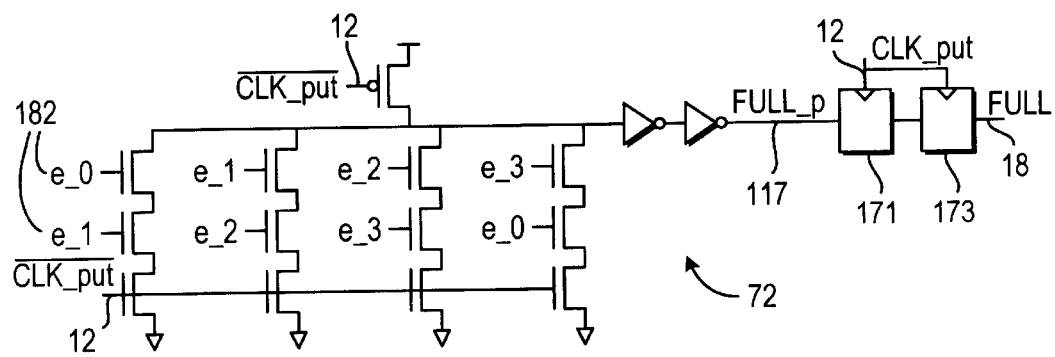
FIG. 17 is a schematic block diagram of a full detector of the FIFO circuit illustrated in FIGS. 5 and 6, in accordance with the invention.
Figure 18:
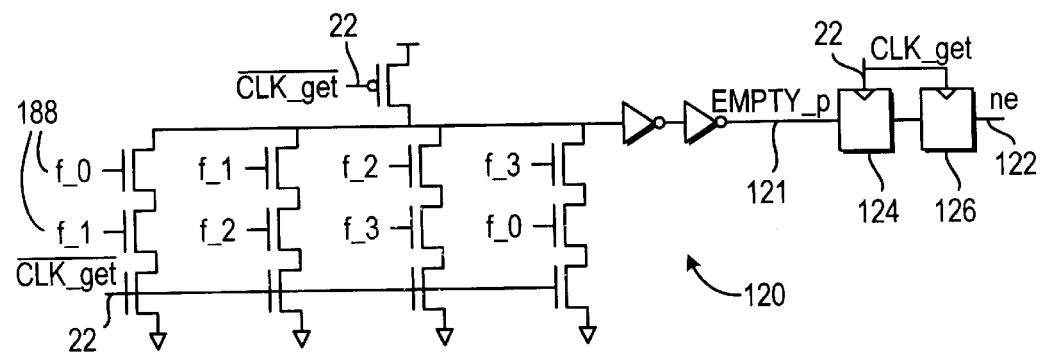
FIG. 18 is a schematic block diagram of a first empty detector of the FIFO circuit illustrated in FIGS. 5 and 6, in accordance with the invention.
Figure 19:
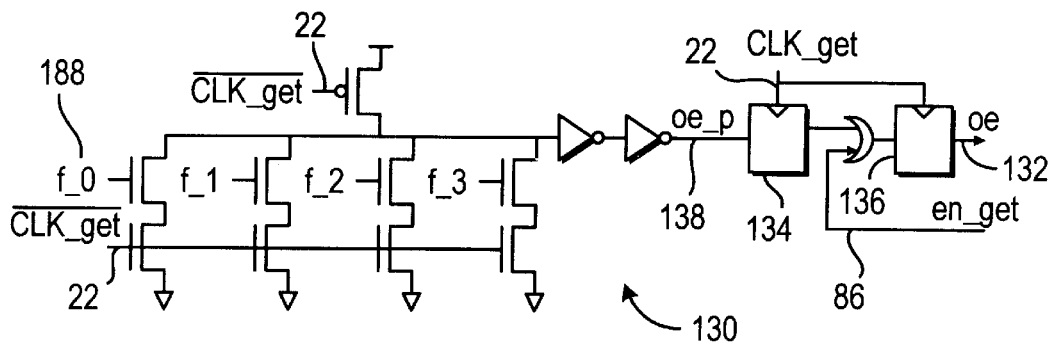
FIG. 19 is a schematic block diagram of a second empty detector of the FIFO circuit illustrated in FIGS. 5 and 6, in accordance with the invention.

Each of the FIFO circuits 100, 200, and 300 may have at least one synchronous interface. Therefore, the FIFO circuit operations must be synchronized. A mixed-clock FIFO circuit has highly concurrent operation: at any time, the FIFO circuit's state, i.e., full or empty, may be modified by either the put interface 10 and/or the get interface 20, each of which may be operating under a different clock or asynchronously. At the same time, each interface "reads" the state of the FIFO circuit under its own clock. The global full signal 18 (full) (FIGS. 6 and 10) is read by the put interface, and the global empty signal 28 (empty) (FIGS. 6 and 8) is read by the get interface. Therefore, to avoid inconsistent reads, synchronizers have been added to each of the two global control signals, full signal 18 (full) and empty signal 28 (empty). Each synchronizer conditions the corresponding global signal to the appropriate clock. In the exemplary embodiment, a pair of synchronizing latches is used; however, for increased robustness, it is noted that more than two latches may be used. As illustrated in FIGS. 17, 18 and 19, below, synchronizers are added to the output of the full detector 72 and the empty detector 74, and are controlled by the sender clock signal 12 (CLK put) and the receiver clock signal 22 (CLK_get), respectively.

The synchronizers described hereinadd additional clock cycles of delay to the reading of the current state of the FIFO circuit. Consequently, simple full and empty detectors which merely indicate the immediate state of the FIFO circuit may result in failure, i.e., overflow or underflow. For example, when the FIFO circuit using a pair of synchronizing latches becomes full, the sender interface is stalled two clock cycles later. In the next clock cycle, the sender might deposit a new data item, effectively overwriting a unread data item. Conversely, when the FIFO circuit becomes empty, the receiver interface is stalled two clock cycles later, so in the next clock cycle the receiver might read an empty cell.

A solution in accordance with the invention is to modify the definition and implementation of the global full signal 18 (full) and the global empty signal 28 (empty), to anticipate an "imminent" full or empty state, to stop the interfaces in time, but not prematurely or too late. According to the definition, the FIFO circuit is considered "full" when fewer than a predetermined number of cells are empty. (The definition of "empty" is considered in greater detail below.) In accordance with the first exemplary embodiment, the FIFO circuit is considered full when either no cells or one cell is empty. Thus, when there are fewer than two empty cells, the FIFO circuit is declared full, and the sender subsystem can safely deposit a final data item and issue a new unanswered request, before stalling two clock cycles later. The protocols described above with respect to FIGS. 11–12 are unchanged. The only effect may be that sometimes the two systems may see an n-place FIFO circuit as a n-1 place one.

The full detector 72, illustrated in FIGS. 17, implements the definition of "full" described above. The FIFO circuit 100 is declared full when fewer than a predetermined number of consecutive cells are empty. As illustrated in FIG. 17, the empty bits 182 (e_i) for consecutive cells are evaluated, i.e., e_0 and e_1; e_1 and e_2; e_2 and e_3; and e_3 and e_0; and the FIFO circuit 100 is declared full if none of these consecutive pairs of cells is found empty. A pair of latches 171 and 173 have been added to synchronize the global full signal 18 (full) with the sender clock signal 12 (CLK_put).

A similar definition of "empty" applies when fewer than a predetermined number of cells in the FIFO circuit 100 are full. In the exemplary embodiment, when there are fewer than two data items, the FIFO circuit may be declared empty. Under these circumstances, the receiver subsystem may then remove the last data item and issue a new unanswered request, before stalling two clock cycles later. However, the early detection of empty, as described above, may cause the FIFO circuit 100 to deadlock. A disadvantage of the "nearly empty" (ne) definition (zero or one data item(s) in the FIFO circuit), is that the FIFO circuit 100 may be declared empty but nevertheless contains one data item, but the requesting receiver is still stalled.

An alternative definition of empty, as is well known, is "true empty" (oe), which is an indication of whether there are any data items in the circuit. Since the true empty signal (oe) is typically delayed through the synchronization, a disadvantage of the true-empty signal is that it may result in underflow.

A solution in accordance with the invention is to use a bi-modal empty detector 74 (the components of which are illustrated in FIGS. 18–19 as described in greater detail below). The bi-modal detector determines both the "nearly empty" (ne) state as well as the "true empty" (oe) state. The two empty signals are then synchronized with the receiver and combined into a global empty signal 28 (empty). However, the nearly empty definition will normally take precedence over the true empty (oe).

The bi-modal empty detector declares the global empty signal 28 (empty) based, in part, on the occurrence of recent get requests from the receiver. If there have not been recent get requests, for at least one clock cycle, then the true empty signal (oe) dominates. This becomes important when there is one data item in the FIFO circuit 100. The nearly empty signal (ne) indicates that the FIFO circuit is empty, and the true empty signal (oe) indicates that the FIFO circuit is not empty. In this condition, the get interface 20 needs to receive the data item, so the true empty signal (oe) is used to indicate the FIFO state, i.e., "not empty," and is de-asserted. However, when the get interface has just removed a data item, the nearly empty signal (ne) must be used to indicate the state, i.e., "empty," in order to prevent the FIFO underflow, which the synchronization delays for the true empty signal (oe) might cause.

According to another scenario, the FIFO circuit may become empty for at least one cycle, i.e., the global empty signal 28 (empty) is asserted. During the next clock cycle the true empty signal (oe) dominates.

In accordance with the first exemplary embodiment, the bi-modal empty detector 74 is implemented with two detectors, a near-empty detector 120 (FIG. 18) and a true-empty detector 130 (FIG. 19). The two signals are combined to produce the global empty signal 28 (empty) as described below with respect to FIG. 19. The near-empty detector 120, illustrated in FIG. 18, is similar to the full detector 72, described above, and evaluates the full bits 188 (f_i) of consecutive pairs of cells, i.e., f_0 and f_1, f_1 and f_2, f_2 and f_3, and f_3 and f_0. The FIFO circuit 100 is declared empty on signal 121 (empty_p) if no two consecutive pairs of cells are found to have respective data items. A pair of latches 124 and 126 are used to synchronize the near-empty signal 122 (ne) to the get clock signal 22 (CLK_get).

A true-empty detector 130, illustrated in FIG. 19, determines the "true empty" (oe) state of the FIFO circuit. According to this definition, the FIFO circuit 100 is empty if there are zero data items, in which case the true empty signal 132 (oe) is asserted. Thus, the true empty detector 130 evaluates each full bit 88 (f⁻i) to determine whether there are any data items present. The true empty signal 132 (oe) is delayed through synchronization, which may result in underflow. To prevent this condition, the true empty signal 132 (oe) is synchronously set to a neutral "FIFO circuit empty" value after each get operation. This is implemented by OR'ing the output signal 138 after being clocked through the first latch 134 with the get enable signal 186 (en_get) before the second latch 136. As a result of setting the "true empty" signal after each get operation, the "true empty" signal (oe) does not necessarily indicate that there are no data items in the FIFO circuit. Specifically, if there are more than one data items present and the get enable signal 186 (en_get) is asserted, the true-empty detector 130 will output the true empty signal 132 (oe).

The potential deadlock problem is solved in accordance with the invention by combination of the near-empty signal 122 and the true-empty signal 132. In most of the cases, the near-empty detector 120 and the true-empty detector 130 produce the same result, i.e., the near-empty signal 122 (ne) and the true empty signal 132 (oe) are the same. When the FIFO circuit 100 contains a few data items, and the get enable signal 186 (en_get) is not asserted during the interval between when latch 134 is clocked and when latch 136 is clocked, both the true empty signal 132 (oe) and the near-empty signal 132 (ne) indicate the FIFO circuit 100 is not empty, i.e., both signals are de-asserted. Similarly, when the FIFO circuit 100 contains zero data items, both the true empty signal 132 (oe) and the near-empty signal 132 (ne) indicate the FIFO circuit is empty, i.e., both signals are asserted.

A different situation arises when the FIFO circuit 100 contains exactly one data item, i.e., the near-empty signal 122 indicates that the FIFO circuit "empty" (ne=1), and the true empty signal 132 indicates that the FIFO circuit "not empty" (oe=0) in the absence of assertion of the get enable signal 186 (en_get) during the aforementioned interval. This condition may arise after the get interface has enabled the removal of the next-to-last data item in the FIFO. The next step will depend upon whether there is another get request: (1) If in the current clock cycle there is another get request, this request is satisfied and the near-empty detector 120 will declare the FIFO empty (i.e., the near empty signal (ne) is asserted) and will stall the get interface in the next clock cycle. (2) If there is no get request, then the true empty detector 130 will dominate in the next clock cycle, and declare the FIFO not empty (i.e., the true empty signal (oe) is de-asserted), allowing a subsequent get request to be satisfied. Whenever the last data item is dequeued, the near empty signal (ne) again immediately dominates and stalls the get interface on time. At this point no further get requests are satisfied, so the near empty signal (ne) again is used to indicate the state of the FIFO 100.

Figure 20:
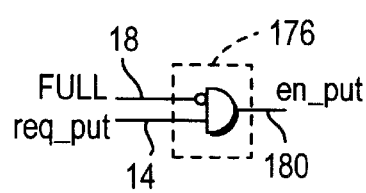
FIG. 20 is a schematic block diagram of another portion of the FIFO circuit illustrated in FIGS. 5 and 6, in accordance with the invention.

The put controller 176 is shown in FIG. 20. The put controller 176 enables and disables the put operation and the movement of the put token in the FIFO circuit 100. As illustrated in FIG. 20, These operations are only enabled when there is a valid data item on data_put, i.e., the put request signal 18 (req_put) has been asserted and the FIFO circuit is not full, i.e. the global full signal 18 (full) has not been asserted. In the scenario described above, wherein the FIFO circuit becomes empty for at least one cycle, the get enable signal 186 (en_get) is de-asserted, regardless of whether get request signals 24 (req_get) are made by the receiver. In such case the true empty signal 18 (oe) is not re-set in the next clock cycle and is able to dominate. In this case, once the FIFO is empty, if a single data item is enqueued by the put interface, the true empty signal (oe) will remain dominant, eventually oe will be de-asserted and the global empty signal 28 (empty) will in turn be de-asserted, and the get interface 20 will be able to remove the data item, thus avoiding deadlock.

Figure 21:
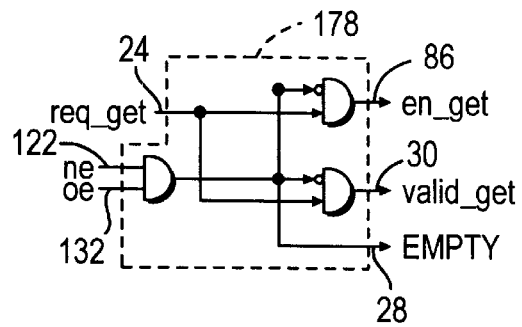
FIG. 21 is a schematic block diagram of a further portion of the FIFO circuit illustrated in FIGS. 5 and 6, in accordance with the invention.

The get controller 178, illustrated in FIG. 21 enables and disables the get operation and the movement of the get token in the FIFO circuit 100. The get enable signal 186 (en_get) is only asserted when there is a request from the receiver, i.e., the get request signal 24 (req_get) is asserted and at least one of the near-empty detector 120 and true empty detector 130 indicates that the FIFO circuit 100 is not empty.

Each of FIFO circuit 200 (FIGS. 7 and 8) in accordance with the second embodiment and FIFO circuit 300 (FIGS. 9 and 10) in accordance with the third embodiment has one asynchronous interface and one synchronous interface. As described above with respect to FIGS. 7–8, FIFO circuit 200 has an asynchronous put interface and a synchronous get interface, while the FIFO circuit 300 described above with respect to FIGS. 9–10 has a synchronous put interface and an asynchronous get interface. Therefore, each FIFO circuit 200 and 300 utilizes certain synchronous components from FIFO circuit 100 described above. More particularly, the synchronous put interface 10 is used as the put interface in FIFO circuit 300. Similarly, the synchronous get interface 20 in FIFO circuit 100 is also used in FIFO circuit 200 as the get interface.

As described above, each cell has four distinct parts: a put component, a get component, a data validity (DV) controller, and a register. Each of cells 270a–d and 370a–d uses a version of a data validity controller, i.e., data validity controller 280 and data validity controller 380, respectively. In cell 170a (FIG. 16), above, the data validity controller was simple (an SR latch 180). However, for the FIFO circuits 200 and 300 having both synchronous and asynchronous components, the behavior becomes more complex. These designs allow more concurrency between the write operations and the read operations to the same cell. Therefore, the data validity controller has to allow for that increased concurrency, as will be described below.

Figure 22:
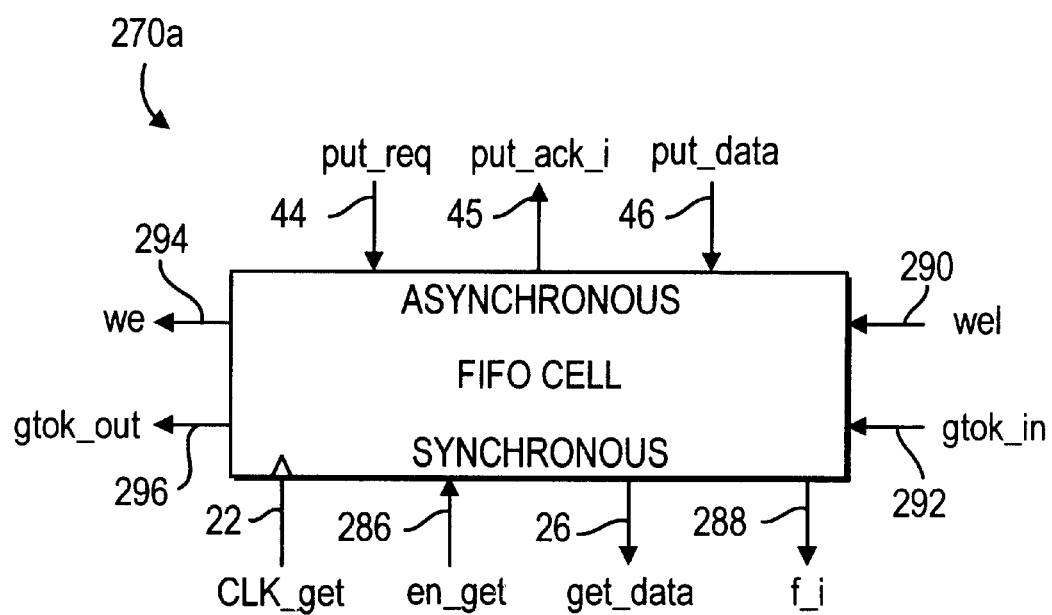
FIG. 22 is an enlarged schematic block diagram, illustrating a portion of the FIFO circuit of FIGS. 7 and 8, in accordance with the invention.

The interfaces of the FIFO circuit according to the second embodiment, i.e., asynch-synch FIFO circuit 200, were described above with respect to FIG. 7. They are obtained by using the asynchronous put interface 40 (FIG. 3) and the synchronous get interface 20 (FIG. 2). The FIFO circuit protocol on these interfaces was described with respect to FIGS. 12–13, and the architecture of the FIFO circuit 200 was shown in FIGS. 7–8. With specific reference to FIG. 8, FIFO circuit 200 uses a number of components which have been described above, i.e., interface components such as the get controller 278, empty detector 74 and synchronous cell components. The remaining components in cells 270a–d, i.e., the asynchronous put component, and the data validity controller are described herein with respect to FIGS. 22–23.

Figure 23:
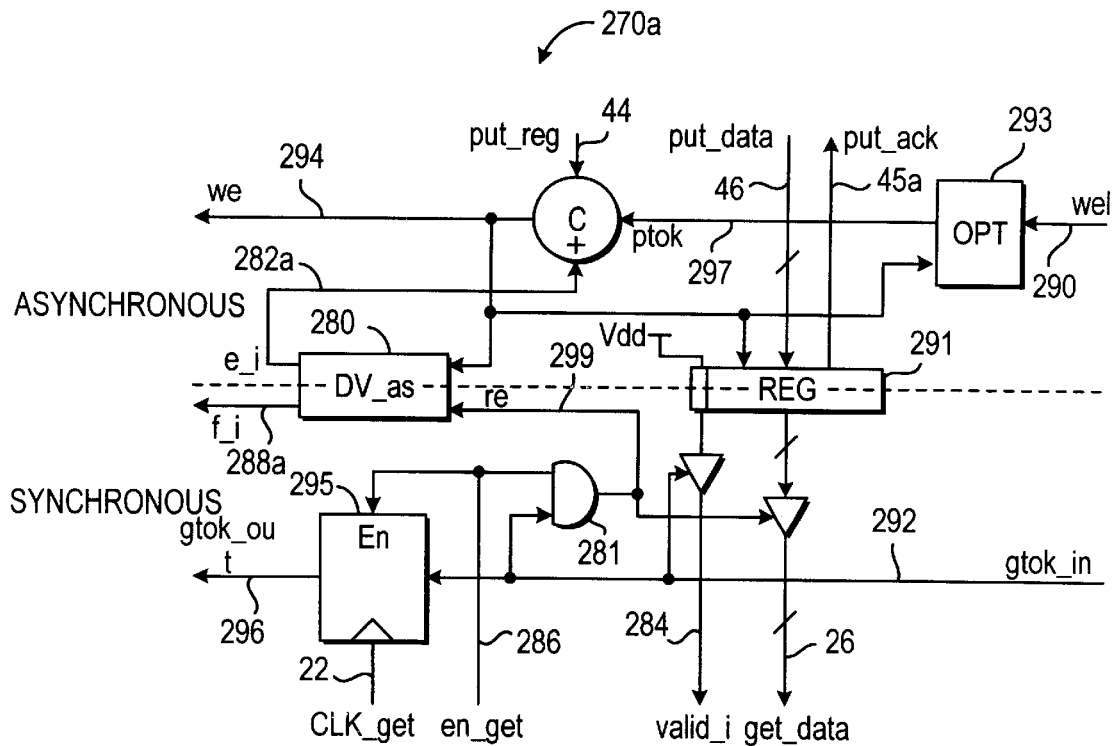
FIG. 23 is a more detailed schematic block diagram of the portion of the FIFO circuit illustrated in FIG. 22, in accordance with the invention.
Figure 24:
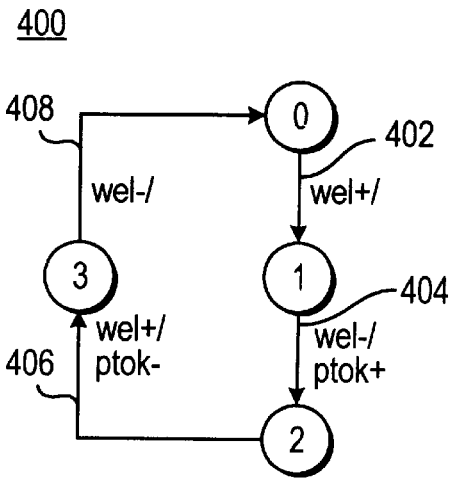
FIG. 24 is a burst-mode specification of a portion of the FIFO illustrated in FIG. 23, in accordance with the invention.
Figure 25A:
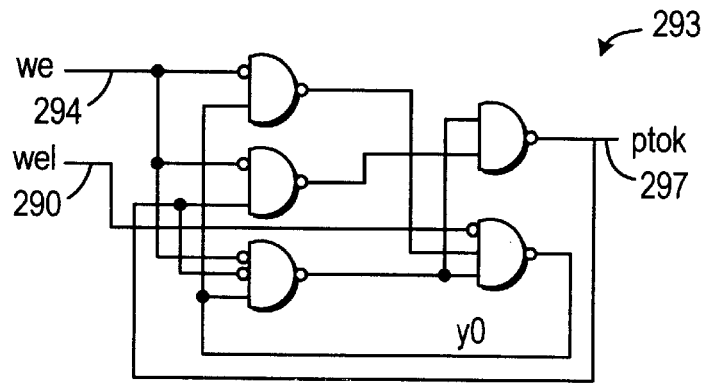
FIG. 25(a) is a more detailed schematic block diagram of a portion of the FIFO circuit illustrated in FIG. 23 in accordance with the invention.
Figure 25B:
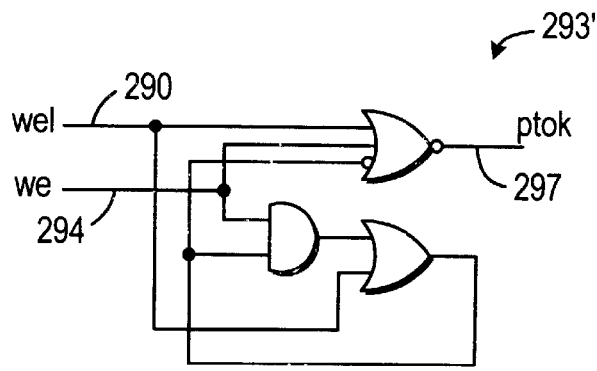
FIGS. 25(b) is a more detailed schematic block diagram of another embodiment of a portion of the FIFO circuit illustrated in FIG. 23 in accordance with the invention.

The synchronous part of cell 270a shown in FIG. 23 is identical to the corresponding components of cell 170a (FIG. 16) in FIFO circuit 100 (FIG. 6). The asynchronous part of cell 270a is decomposed into several blocks. The put component part comprises the ObtainPutToken block 293 (OPT) and the C-element 295. The ObtainPutToken block 293 (OPI) obtains the respective put token from the right interface on put token input 290 (we1). It is implemented as a Burst-Mode machine as illustrated in FIG. 24. (Burst-Mode machines are also described in greater detail in T. Chelcea et al., "Low-Latency Asynchronous FIFO's using Token Rings," *IEEE ASYNCH '00 Symp.*, pp. 210–220, which is incorporated by reference in their entirety herein.) As illustrated in the Burst Mode specification 400 of FIG. 24, the ObtainPutToken block 293 observes the right cell and waits for a put operation. A complete token passing is indicated by the right cell, which first sets the put token input 290 (we1) at step 402 and then resets the put token input 290 (we1) at step 404. After that operation takes place, the put token is in the current cell, i.e., put token signal 297 (ptok) is set (step 404). When the put token signal 297 (ptok) is set, another put operation can take place. Once the put operation starts, the put token signal 297 (ptok) is reset and the put token output 294 (we) is set at step 406. When the put operation finishes, the put token output 294 (we) is reset, the put token is sent to the next cell and the cycle resumes. A first exemplary embodiment of the ObtainPutToken block 293 (OPT) is illustrated in FIG. 25(a). A second exemplary embodiment of ObtainPutToken block 293'(OPT) is illustrated in FIG. 25(b).

Figure 26:
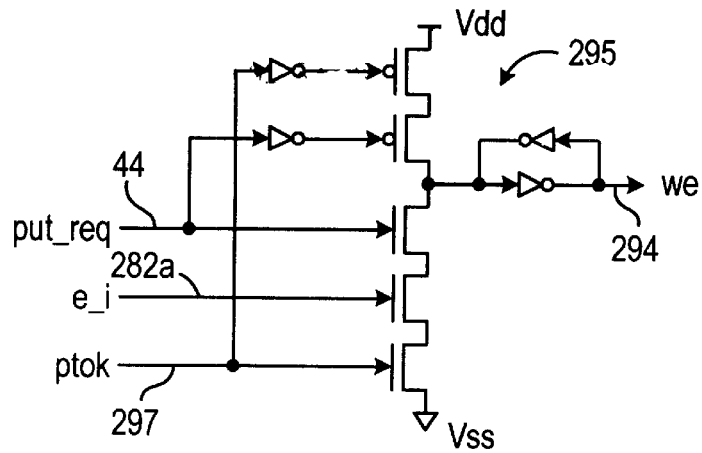
FIG. 26 is a more detailed schematic block diagram of a further portion of the FIFO circuit illustrated in FIG. 23 in accordance with the invention.

The put operation is controlled by a C-element 295, as illustrated in FIG. 26. As is known in the art, asymmetric C-element 295 has its output at 1 when all its inputs are at 1; the output becomes 0 when all its inputs become zero. In an asymmetric C-element, some of the inputs (marked with '+') participate only in the setting the output of the element to one; their values are irrelevant for the other output transition.

The behavior of cell 270a (FIG. 23) for an asynchronous put operation proceeds as follows: Initially, cell 270a starts in an empty state (e_i=1 and f_i=0) and neither the put token or get token are present. After a pair of transitions on put token input 290 (we1), the put token is in the cell (ptok=1). When the environment requests a put operation on put request signal 44 (put_req=1) and the cell is empty (e_i=1), the put token output 294 (we) is set. This event causes several operations in parallel: the state of the cell is changed to full (i.e., the full bit 288a (f_i) is asserted) by data validity controller 280 (DV_as); the register 291 (REG) is enabled to latch data, and cell 270a starts both sending the put token to the left cell and resetting OPT (ptok=0). When the put request signal 44 (put_req) is de-asserted, the put token output 294 (we) is also de-asserted. This event completes the sending of the put token to the left cell. Now cell 270a is prepared to start another put operation after the data in the register 291 (REG) is dequeued.

The synchronous get operation in cell 270a starts after a data item is present in the cell. Once the full bit 288a (f_i) is set, the empty detector 74 (FIG. 8) computes the state of FIFO circuit 200 as "not empty", and a get request 24 (req_get) is passed on the get enable signal 86 (en_get). When cell 270a has the get token, then contents of the register 291 (REG) are output on the get data bus 26 (data et); on the next positive edge of the receiver clock signal 22 (CLK_get), the get token is passed to the next cell. In the same time, the state of the cell is changed to "empty" by the data validity controller 280 (DV as). Note that when the cell has the get token (gtok=1), the cell's validity bit is broadcast on validity data bus 284 (valid_i) regardless of the signal on get request 86 (en$_{get}$). That ensures that the signal on the validity bus 284 (valid_i) is always driven to some value.

Figure 27:
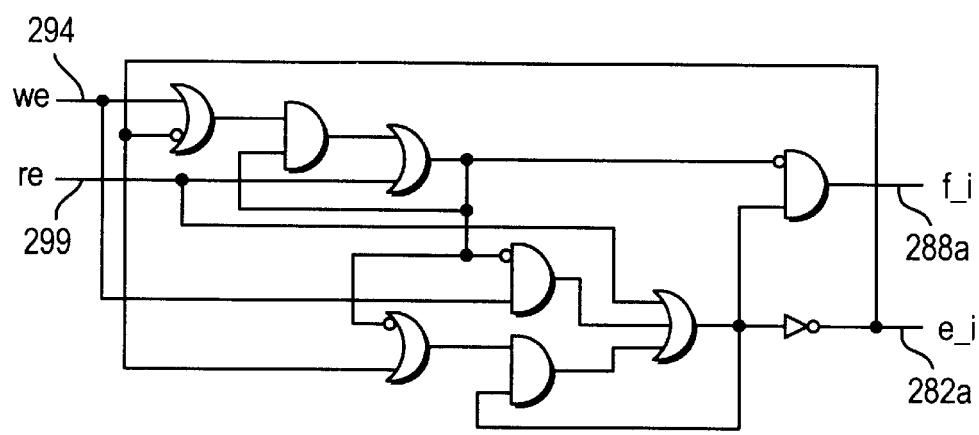
FIG. 27 is a more detailed schematic block diagram of a still further portion of the FIFO circuit illustrated in FIG. 23 in accordance with the invention.

As illustrated in FIG. 27, the data validity controller 280 (DV_as) indicates when the cell contains data items; it thus controls the put and get operations. It accepts as inputs the put token output 294 (we), which signals that a put operation is taking place, and the read enable signal 299 (re), which signals that a get operation is taking place. The outputs of the data validity controller 280 (DV_as) are the empty bit 282a (e_i), indicating cell 270a is empty, (used only internally in this embodiment), and the full bit 288a (f_i), indicating cell 270a is fill, which is used in the empty detector in this embodiment).

Figure 28:
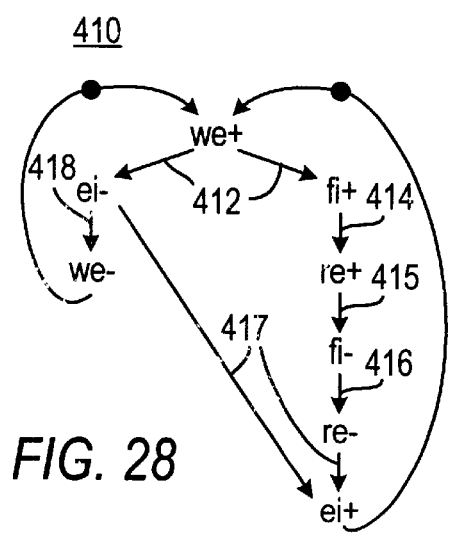
FIG. 28 is a Petri-net specification of a portion of the FIFO circuit illustrated in FIG. 23 in accordance with the invention.

The protocol for data validity controller 280 (DV_as) is shown as a Petri-Net 410 in FIG. 28. (A Petri-net is a well-known graphical representation commonly used to describe concurrent behaviors). It consists of transitions, indicated by labeled events, and places, which store tokens which are indicated by black dots. A transition fires when all of its incoming arcs have tokens, which are then deposited on all of its outgoing arcs. (Further details concerning Petri-nets are discussed in Tadao Murata, "Petri Nets: Properties, Analysis and Applications," *Proceedings of the IEEE*, 77(4), April 1989; L. Y. Rosenblum and A. V. Yakolev, "Signal Graphs: From Self-Timed to Timed Ones," *Proceedings of International Workshop on Timed Petri Nets, Torino, Italy*, pp. 199–207, July 1985; and Tam-Anh Chu, "On the Models for Designing VLSI Asynchronous Digital Circuits," *Integration, the VLSI Journal*, 4(2):99–113, June 1986, which are incorporated by reference in their entirety herein.) Once a put operation starts, data validity controller 280 (DV_as) both resets the empty bit 282a (e_i=0), and sets the full bit 288a (f_i=1),thus declaring the cell full enabling a get operation, at 412. After a get operation starts (re+) at 414, the cell is declared "not full" (f_i=0) asynchronously at 415, in the middle of the CLK_get clock cycle. When the get operation finishes (on the next positive edge of CLK_get) at 416, the data validity controller 280 (DV_as) sets cell 270a to "empty" (e_i=1) at 417. The put token output 294 (we) is reset at 418, and the behavior can resume. This asymmetric behavior delays the passing of the put token to prevent data corruption by a put operation while a get operation is still taking place.

The FIFO circuit according to the third exemplary embodiment, i.e., synch-asynch FIFO circuit 300 (FIGS. 9 and 10), will be described in greater detail herein. The interfaces of FIFO circuit 300 were described above with respect to FIG. 9. They are obtained by "attaching" a synchronous put interface 10 (See FIG. 1) and an asynchronous get interface 50 (See FIG. 4). The FIFO circuit protocol on these interfaces was described with respect to FIGS. 11 and 14, and the architecture of the FIFO circuit 300 was illustrated in FIGS. 9–10. With reference to FIG. 10, FIFO circuit 300 uses a number of components which have been described above, i.e., interface components such as the put controller 376, full detector 72 and synchronous cell components. The remaining components in cells 370a, e.g., the asynchronous get component, and the data validity controller (DV_sa) are described herein with respect to FIGS. 29–30.

Figure 29:
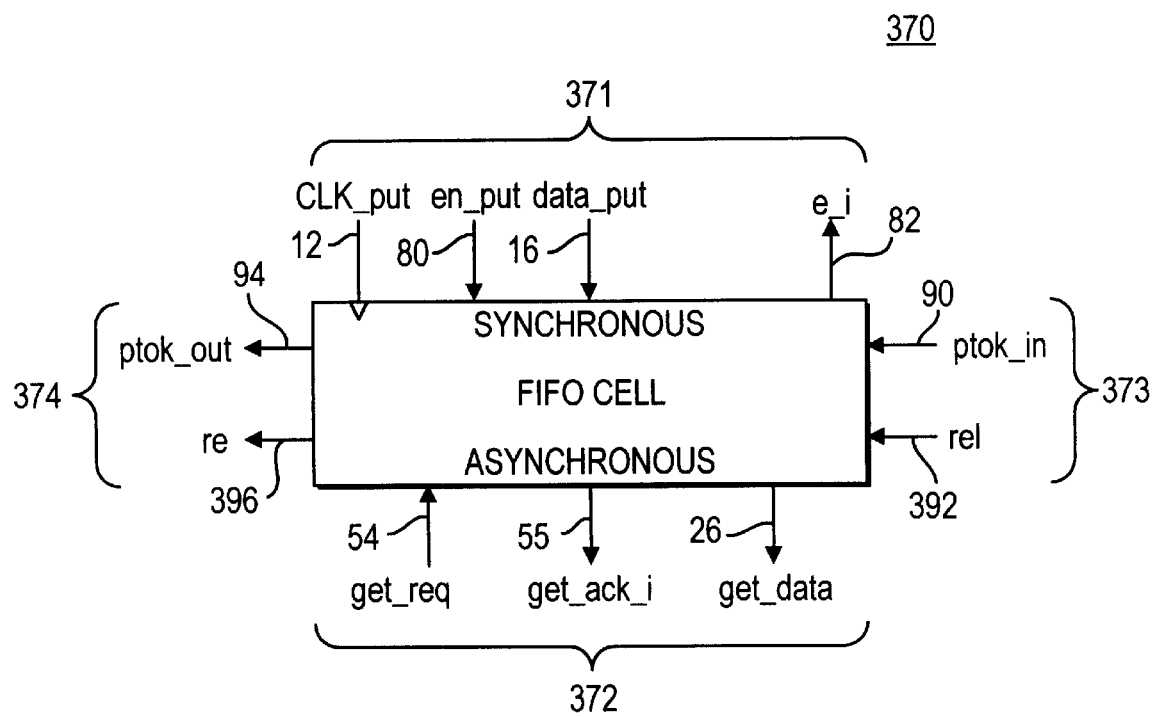
FIG. 29 is an enlarged schematic block diagram, illustrating a portion of the FIFO circuit of FIGS. 9 and 10, in accordance with the invention.

The interfaces of exemplary cell 370a are shown in FIG. 29. (Each of cells 370a, 370b, 370c, and 370d are identical.) Cell 370a communicates on four interfaces: (1) a synchronous put interface 371, (2) an asynchronous get interface 372, (3) an interface 373 with the right (i.e., previous) cell to obtain tokens, and (4) an interface 374 with the left (i.e., next) cell to pass the tokens. On the synchronous put interface, cell 370a receives data on the common put data bus 16 (data_put). It is enabled to perform a put operation by the put enable signal 80 (en_put), which is the output of the put controller 76 (See FIG. 10). The put request signal 14 (req_put) indicates data validity (which is always asserted in this embodiment). The cell 370a communicates with the full detector 72 (FIG. 10), with empty bit 82 (e_i) which is asserted high when the cell 370a is empty. The put operation is governed by the sender clock signal 12 (CLK_put). Each cell 370a–d communicates with the asynchronous get interface 372 to transmit data on the get data bus 56 (get_data), receives the global request for a get operation 54 (get_req), and each cell 370a indicates the end of the dequeuing operation on 55 (get_ack). Since the asynchronous get interface 50 only passes valid data (See FIG. 4), the valid bit is not used in the asynchronous get interface of cell 370a. Each cell receives the put token on put token input 90 (ptok_in) and the get token on get token input 392 (re1); it passes the tokens on put token output 94 (ptok out) and the get token on get token output 396 (re).

Figure 30:
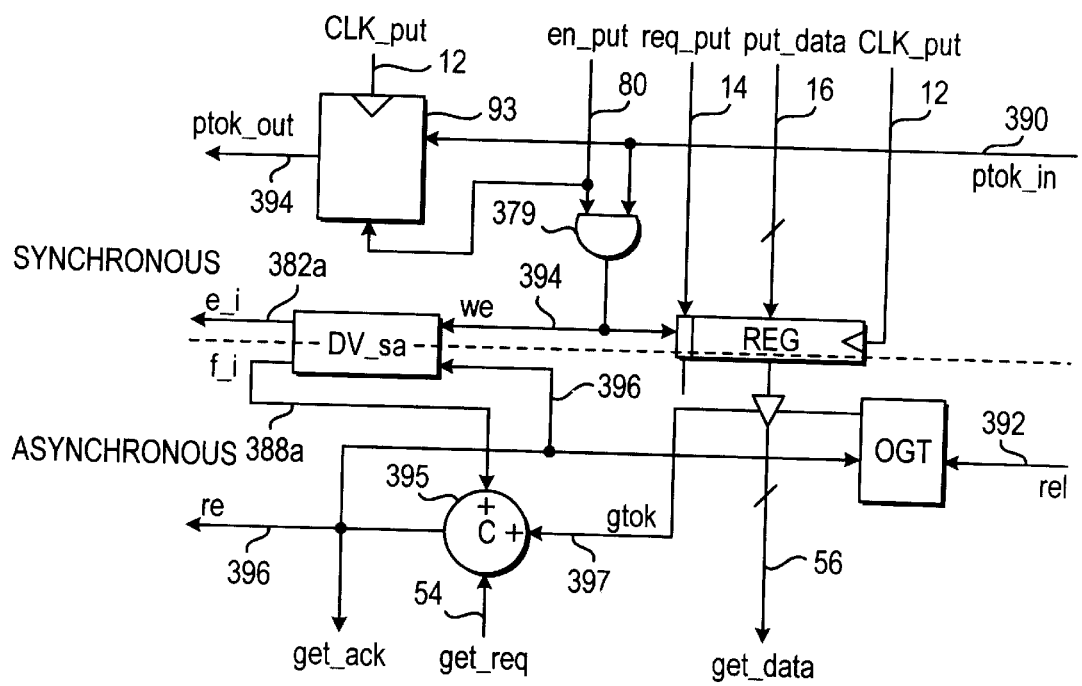
FIG. 30 is a more detailed schematic block diagram of the portion of the FIFO circuit illustrated in FIG. 29, in accordance with the invention.
Figure 31A:
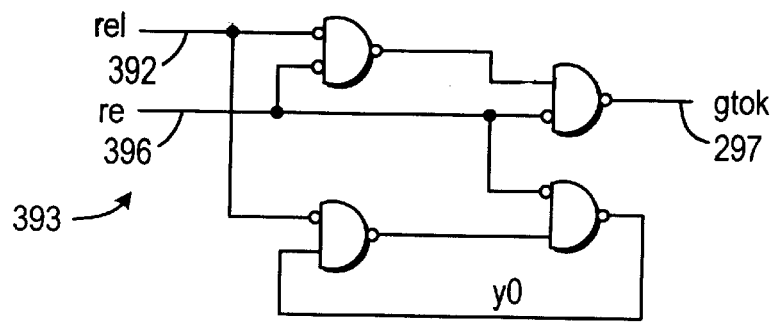
FIG. 31(a) is a more detailed schematic block diagram of a portion of the FIFO circuit illustrated in FIG. 30 in accordance with the invention.
Figure 31B:
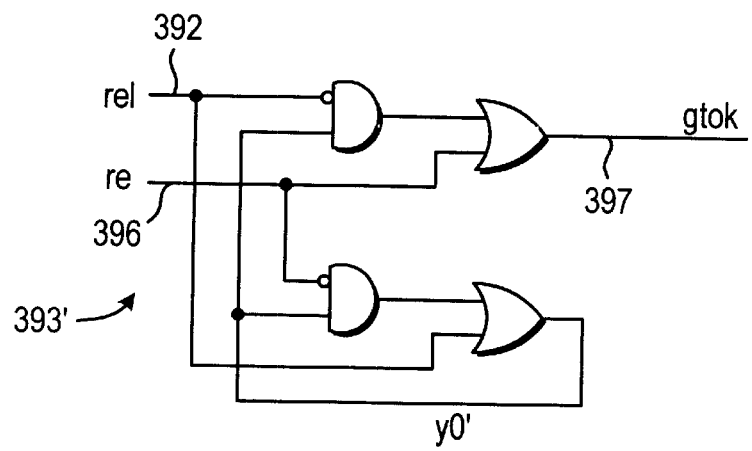
FIGS. 31(b) is a more detailed schematic block diagram of another embodiment of a portion of the FIFO circuit illustrated in FIG. 30 in accordance with the invention.
Figure 32:
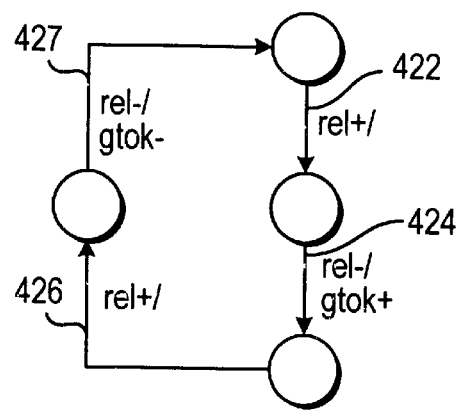
FIG. 32 is a burst-mode specification of a portion of the FIFO illustrated in FIG. 30, in accordance with the invention.

The synchronous part of cell 370a is identical to the corresponding components of cell 170 of FIFO circuit 100 (See FIG. 16). Referring to FIG. 30, the asynchronous part of cell 370a is decomposed into several blocks, e.g., ObtainGetToken block 393 (OGT) and asymmetric C-element 395. The ObtainGetToken block 393 (OGT) obtains the respective get token from the right interface on get token input 392 (re1). The ObtainGetToken block 393 (OGT) is implemented as a Burst-Mode asynchronous state machine as illustrated in FIG. 31(a). Another exemplary implementation of ObtainGetToken block 393'(OGT) is illustrated in FIG. 31(b). The Burst-Mode specification 420 is illustrated in FIG. 32. The ObtainGetToken block 393 (OGT) observes the right cell and waits for a get operation. The right cell indicates a complete token passing by first setting and then resetting the get token input 392 (re1) (FIG. 30) at step 422 and 424, respectively. As those operations are completed, the get token is in the current cell, i.e., get token signal 397 (gtok) is set (step 424) in FIG. 32. The get token output 396 (re) (FIG. 30) is set at step 426 (FIG. 32), as controlled by the asymmetric C-element 395 (FIG. 30). It starts the get operation when the cell is full, when it has the get token and when the receiver request a data item. Once dequeuing is completed, communication with the receiver is finished by resetting the request and then the acknowledgment. The get token output 366 (re) is reset, along with the current cell's get token signal 397 (gtok) at 427.

Cell 370a performs a put operation in the same manner as cell 170a. When the cell is enabled on put enable signal 80 (en_put) and has the put token ptok_in=1, the register 391 (REG) is enabled to enqueue data, as well as the put request 14 (req_put) which is used as the validity bit. In parallel, the data validity controller 380 (DV_sa) declares the cell 370 full. At the start of the clock cycle of sender clock 12 (CLK_put), data is latched into the register and the get token is passed to the next cell.

The get operation is performed as follows. Initially, the cell 370a starts without the get token (gtok=0). The ObtainGetToken block 393 (OGT) waits for an up and down transition on the get token input 392 (re1); once these occur, get token is in the cell (gtok=1), and the output of the register 391 (REG) is driven onto the get data bus 56 (get_data). The latched validity bit is not used by the asynchronous get interface. The cell 370a waits for the receiver subsystem (or environment) to request a data item such that the get request signal 54 is asserted (get_req=1). When this occurs, the cell 370a acknowledges it only if the cell contains a data item, i.e., full bit 388a is asserted (f_i=1). When the three conditions are met, (i.e., gtok=1, get_req=1, and f_i=1), the get token output 396 (re) is set; this event acknowledges the data operation to the environment, starts resetting of the ObtainGetToken block 393 (OGT), starts resetting the cell's state in the data validity controller 380 (DV_sa), and starts sending the get token to the next cell. The operation cycle on the get interface is completed by de-asserting the get request signal 54 (get_req) which causes the de-assertion of get token output 396 (re) and the completion of all operations started on the positive edge of get token output 396 (re).

Figure 34:
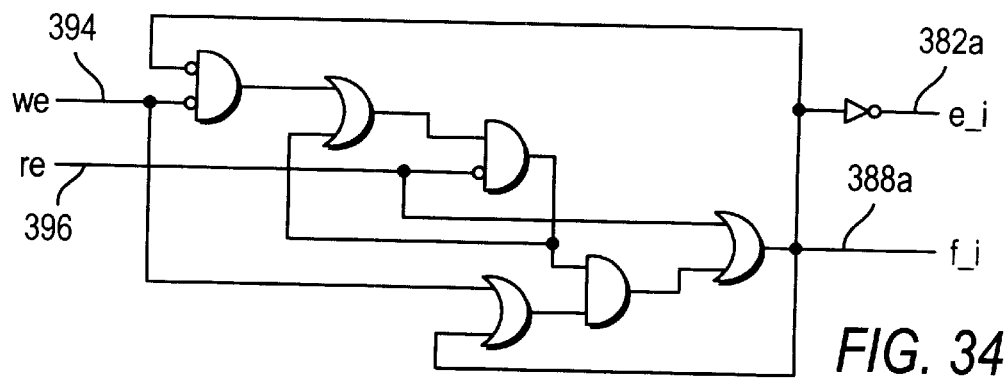
FIG. 34 is a more detailed schematic block diagram of a still further portion of the FIFO circuit illustrated in FIG. 30 in accordance with the invention.
Figure 35:
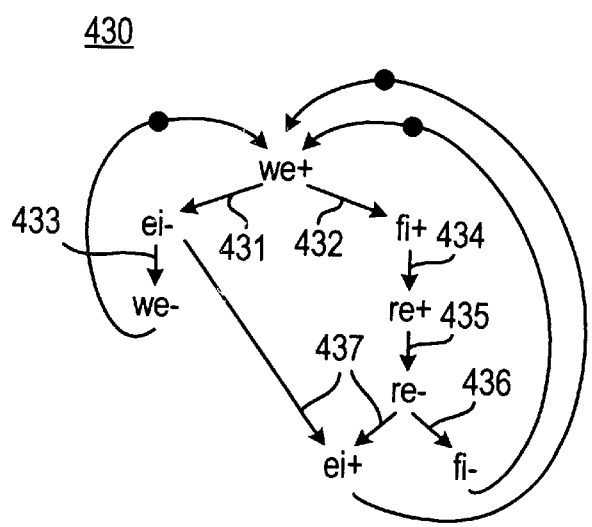
FIG. 35 is a Petri-net specification of a portion of the FIFO circuit illustrated in FIG. 30 in accordance with the invention.

The data validity controller 380 (DV_sa) indicates when the cell is full or empty, and is illustrated in FIG. 34. The protocol for data validity controller 380 (DV_sa) is shown as a Petri-Net 430 in FIG. 35. In a normal empty state, the empty bit 382*a* is asserted (e_i=1) and the full bit 388 is de-asserted (f_i=0). When a put operation starts, data validity controller 380 (DV_sa) concurrently resets empty bit 382 (e_i) at step 431 and sets full bit 388 (f_i) at step 432 (i.e., the state of the cell 370*a* becomes "full"), thus enabling a get operation. The end of the put operation, i.e., de-assertion of write enable signal 394 (we) (step 433) can be performed concurrently with a get operation. A get operation is signaled by a pair of transitions on get token output 396 (re) (steps 434 and 435) after the falling transition on re occurs, the state of the cell changes to "empty" (e_i=1 and f_i=0) at steps 436 and 437, and the normal operation can resume.

Figure 36:
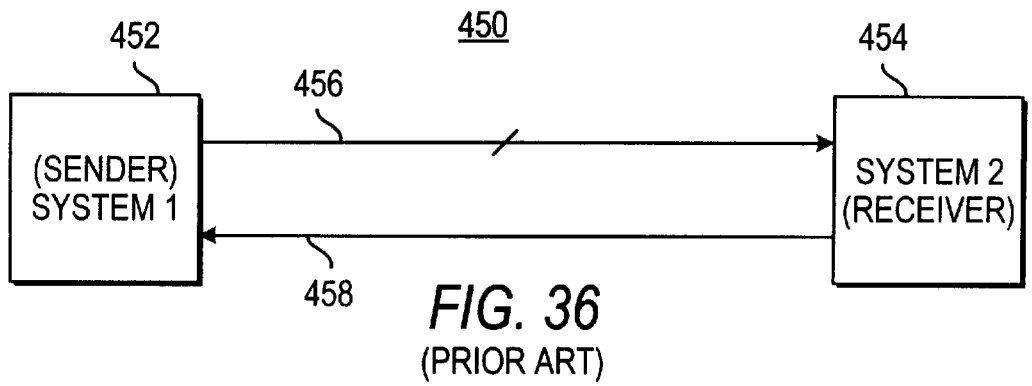
FIG. 36 is a schematic block diagram of a prior art system.
Figure 37:
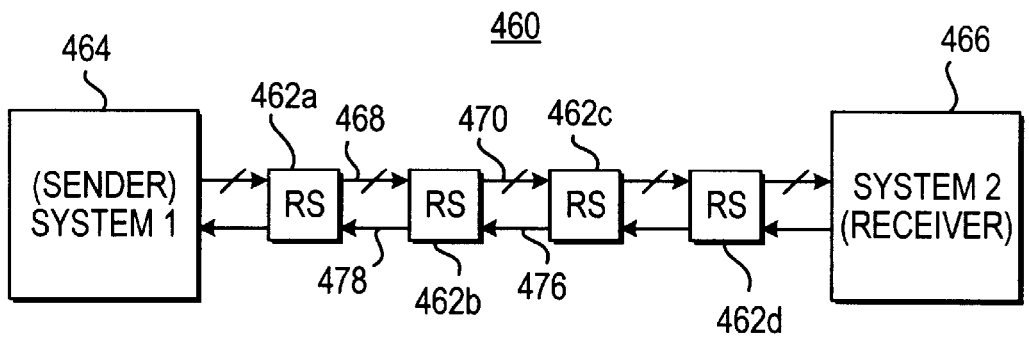
FIG. 37 is a schematic block diagram of a prior art system incorporating relay stations.

Several additional embodiments described herein are substantially similar to FIFO circuits 100, 200, and 300, described above, but have been modified to operate as a relay station between a sender and a receiver. As illustrated in FIG. 36, a system 450 may include two subsystems, such as sender subsystem 452 and receiver subsystem 454, which are connected by very long wires 456 and 458. With this configuration, a signal traveling between subsystem 452 and subsystem, 454 may take several clocks cycles to travel, and delay penalties may be introduced. As illustrated in FIG. 37, a modified system 460 introduces relay stations 462*a*, 462*b*, 462*c*, 462*d* to alleviate the connection delay penalties between subsystem 464 and subsystem 466, both of which must be operating under the same clock. The insertion of relay stations 462*a*, 462*b*, 462*c*, and 462*d* breaks the long wires into segments 468 and 470, each corresponding to less than one clock cycle delay. The chain of relay stations operate in a manner similar to FIFO circuits by sending packets from one system to another.

Figure 38:
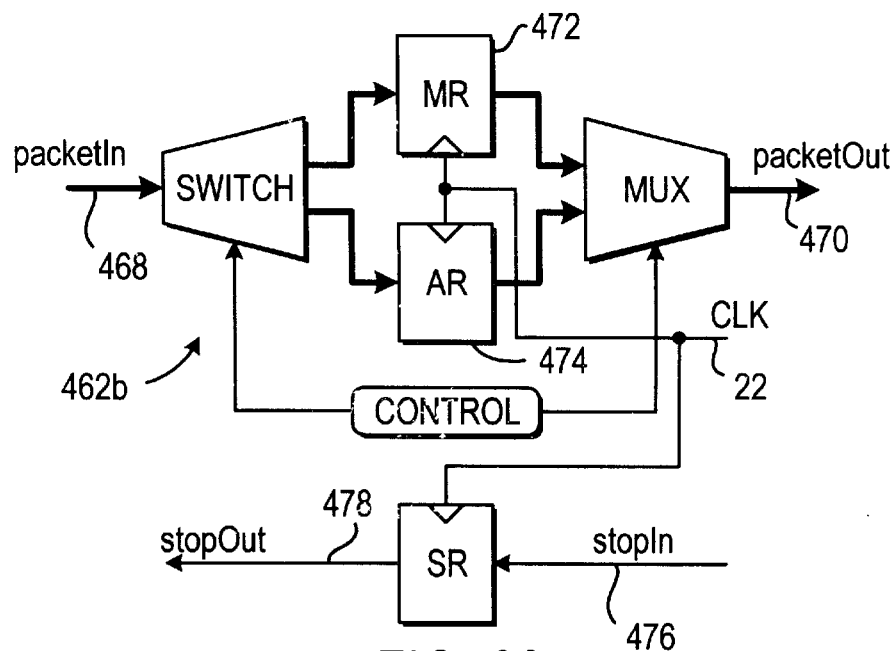
FIG. 38 is a schematic block diagram of a prior art relay station.

The implementation of a single-clock relay station, such as relay station 462*b*, as known in the art (and disclosed in Carloni, incorporated by reference above), is given in FIG. 38. Normally, the packets from the left relay station are passed to the right relay station. In FIG. 37, packets are typically passed from relay station 462*a* to relay station 462*b*. The right relay station, i.e., relay station 462*b*, also has the capability to put counter-pressure on the data flow by stopping the relay stations to the left, i.e., relay station 462*a*. As illustrated in FIG. 38, exemplary relay station 462*b* is positioned between relay station 462*a* and relay station 462*c* (See FIG. 37). Referring to FIG. 38, relay station 462*b* has two registers a main register 472 (MR) used in normal operation and an auxiliary register 474 (AR) used to store an extra packet when stopped. Unlike the mixed-clock cycle FIFO circuit 100, the relay station does not include full and empty signals, nor does it include put requests and get requests. Instead, in nominal operation, data is passed on every clock cycle. Since data passing is usually continuous, both valid and invalid data is transferred, where invalid data is passed whenever no valid data is enqueued. Hence, a valid bit is attached to both put and get data buses, forming a data packet on each interface.

With reference to FIGS. 37–38, relay station 462*b* (which is substantially identical to relay stations 462*a*, 462*c*, and 462*d*) operates as follows. In normal operation, at the beginning of every clock cycle, the data packet received on packet input signal 468 (packetin) from the left relay station 462*a* is copied to main register 472 (MR) and then forwarded on packet output signal 470 (packetOut) to the right relay station 462*c*. A packet consists of a data item on a data bus and a valid bit which indicates the validity of the data in the packet. If the receiver system 466 wants to stop receiving data, it asserts stopIn 476. On the next clock edge, the relay station 462*b* asserts stopOut 478, and latches the next packet to the auxiliary register 474 (AR). At this point, the cell will stall. When the relay station 462*b* is un-stalled, it will first send the packet from the main register 472 (MR) to the right relay station 462*c*, and subsequently the one from the auxiliary register 474 (AR).

Referring to FIG. 39, FIFO circuit 500 operates as a mixed-clock relay station. FIFO circuit 500 is substantially identical to FIFO circuit 100 (shown in FIGS. 5 and 6), with the differences noted herein. The interface of FIFO circuit 500 with the relay station is illustrated in FIG. 39. FIFO circuit 500 is placed in the chain of relay stations, such as that illustrated in FIG. 37, and interfaces between a left relay station chain, such as that including relay stations 462*a* and 462*b*, and a right relay station chain, such as that including relay stations 462*c* and 462*d*. Unlike system 460 illustrated in FIG. 37, which operates under a single clock, each relay station chain may be operated under a different clock, e.g., relay station chain 462*a*/462*b* operates under first clock domain 502, and relay station chain 462*c*/462*d* operates under second clock domain 504.

In contrast to FIFO circuit 100 described above, FIFO circuit 500 always passes valid data items from the left, put interface 506, to the right, get interface 508. In the protocol for FIFO circuit 500, there are no active requests on either interface. Instead, the get interface 508 and the put interface 506 are configured to actively stop, or interrupt, the continuous flow of data items. The get interface 508 dequeues data items from the FIFO circuit 500 on packet output signal 470 (PacketOut) on every clock cycle of receiver clock 22 (CLK_get). In order to stop the flow, relay station 462*c* asserts stopIn 476. Similarly, the FIFO circuit 500 always enqueues data items from the put interface 506 on packet input signal 468 (packetIn). Thus, unlike FIFO circuit 100, put request signal 514 (req_put) is used solely to indicate data validity, and is treated as part of packet input signal 468 (packetIn) rather than a control signal. When it becomes full, FIFO circuit 500 stops the put interface 506 by asserting stopOut 512, which is the global full signal 18 (full). Thus unlike single clock relay station system 460, the mixed clock FIFO circuit relay station 500 can be stalled on the put interface 506 and assert StopOut 478, even if no StopIn 476 has been asserted in the get interface 508.

Figure 40:
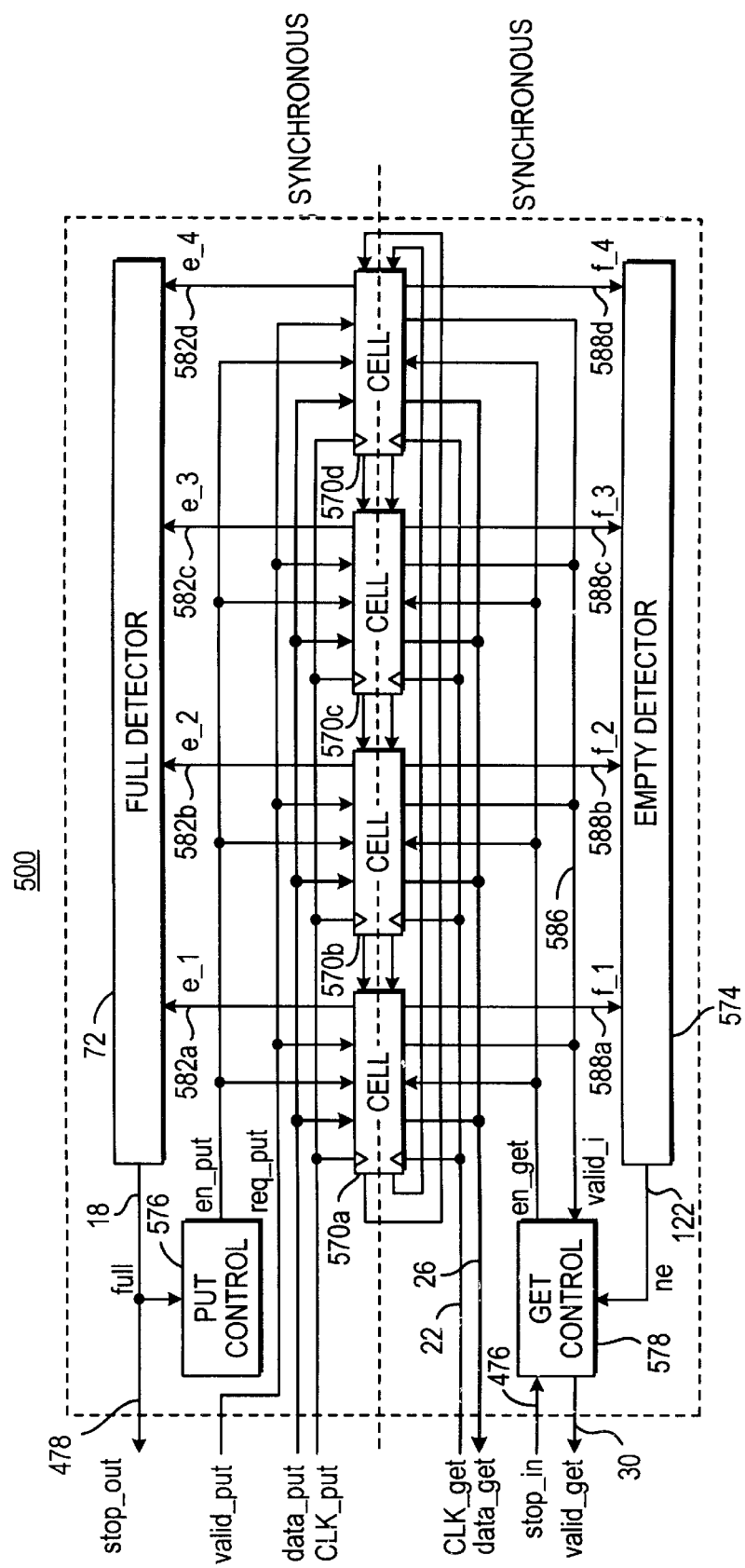
FIG. 40 is a more detailed schematic block diagram illustrating a FIFO circuit relay station illustrated in FIG. 39 in accordance with the invention.

FIFO circuit 500 is similar to FIFO circuit 100, with several modifications as noted herein. With respect to FIG. 40, the full detector 72 is implemented substantially as described above with respect to FIGS. 17–19 to determine the number of empty bits 582*a*, 582*b*, 58*c*, and 582*d* (e_i) in each of cells 570*a*, 570*b*, 570*c*, and 570*d*. The bi-modal empty detector 74 (see FIGS. 18–19) of FIFO circuit 100 is unnecessary, since the FIFO circuit relay station normally passes data on every clock cycle so deadlock cannot occur. Instead empty detector 574 is substantially identical to the near-empty detector 120 illustrated in FIG. 18, above. The put controller 176 and get controller 178 of FIFO circuit 100 which were described above with respect to FIGS. 20–21, are modified in FIFO circuit 500. In FIFO circuit 100, the put controller 176 enables the enqueuing of valid data items when it receives the put request signal 14 (req_put). Put controller 576 of FIFO circuit 500 simply allows valid data items to pass through. Put controller 576 continuously enqueues data items unless the FIFO circuit 500 becomes full. Thus, the put controller 576 is implemented in the exemplary embodiment as an inverter on the global full signal 18 (full) (See FIG. 41). In contrast to get controller 178 of FIFO circuit 100, in which dequeuing was done on demand, get controller 578 enables continuous dequeuing of data items. As illustrated in FIG. 42, dequeuing is interrupted only when FIFO circuit 500 becomes empty (the near empty signal 122 (ne) is asserted, as described above) or the get interface signals it can no longer accept data items by asserting stopIn 476. Since both valid and invalid data may be passed, get controller 678 also uses the valid bit 584 (valid_i) to compute the validity signal 30 (valid_get).

Referring to FIGS. 43, 44, 45, 47, 48 and 49, FIFO circuits 600 and 700 are two additional embodiments that operate as relay stations which are configured to operate with mixed asynch-synch and synch-asynch interfaces, respectively. FIFO circuits 600 and 700 simultaneously address two critical design challenges: the capability of interfacing between mixed asynch/synch environments and long inter-connect delays.

Figure 43:
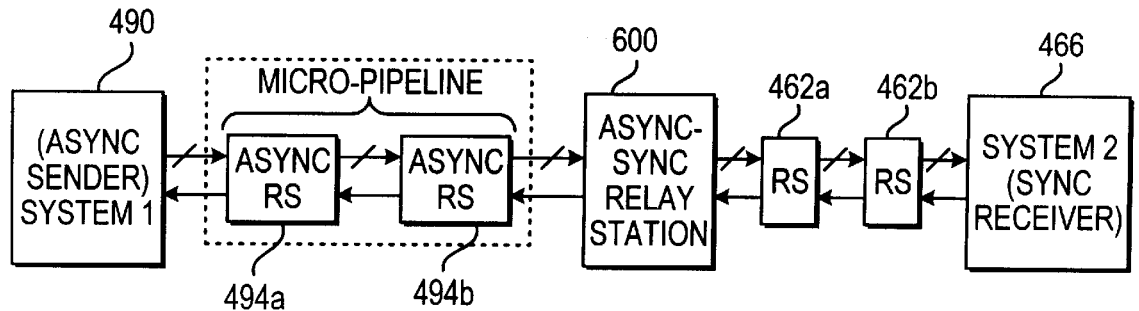
FIG. 43 is a schematic block diagram illustrating another FIFO circuit relay station system in accordance with the invention.

The basic architecture of communication between an asynchronous sender 490 and a synchronous receiver 466 with relay stations is illustrated in FIG. 43. The asynchronous domain sends data packets (possibly through a chain of asynchronous relay stations (ARS) 494*a* and 494*b*, discussed in greater detail herein) to FIFO circuit 600. The packets are then transferred to the synchronous domain, and sent through the chain of synchronous relay stations 462*a* and 462*b* to the receiver 466.

In principle, communication at the asynchronous interface can be made arbitrarily robust, so that no relay stations are needed at the asynchronous domains outputs. In practice, however, correctness and performance issues need to be addressed in FIFO designs. Two common asynchronous data encoding styles are known in the art: dual-rail and single-rail bundled data. (Single-rail bundled data is described in greater detail in S. Furber, "Asynchronous Design," *Proc. of Submicron Electronics*, pp. 461–492, 1997, which is incorporated by reference in its entirety herein.) The dual-rail style, which encodes both the value and the validity of each data bit on a pair of wires, is arbitrarily robust with respect to wire delays (but has significant overhead) and does not require a chain of ARS's. The single-rail bundled-data style has timing assumptions between the data itself and the control wires, so a chain of ARS's may be desirable to limit the wire lengths between stages to short hops. Finally, for the issue of performance, even if ARS's are not required, they may he desirable to increase the throughput. A chain of ARS's can be directly implemented by using an asynchronous FIFO circuit commonly known as a micro-pipeline (Further details about micropipelines are described in I Sutherland, "Micropipelines," *Communications of the ACM*, 32(6), pp. 720–738, 1989 and M. Singh et al., MOUSE-TRAP: Ultra High-Speed Transition-Signaling Asynchronous Pipelines," *ACM TAU*-00 Workshop, 2000, both of which are incorporated by reference in their entirety herein.)

Unlike the synchronous data packets, the asynchronous data packets do not need a validity bit. Rather, the presence of valid data packets is signaled on the control request wires and an ARS can wait indefinitely between receiving data packets. Therefore, a standard micropipeline implements the desired ARS behavior.

Figure 44:
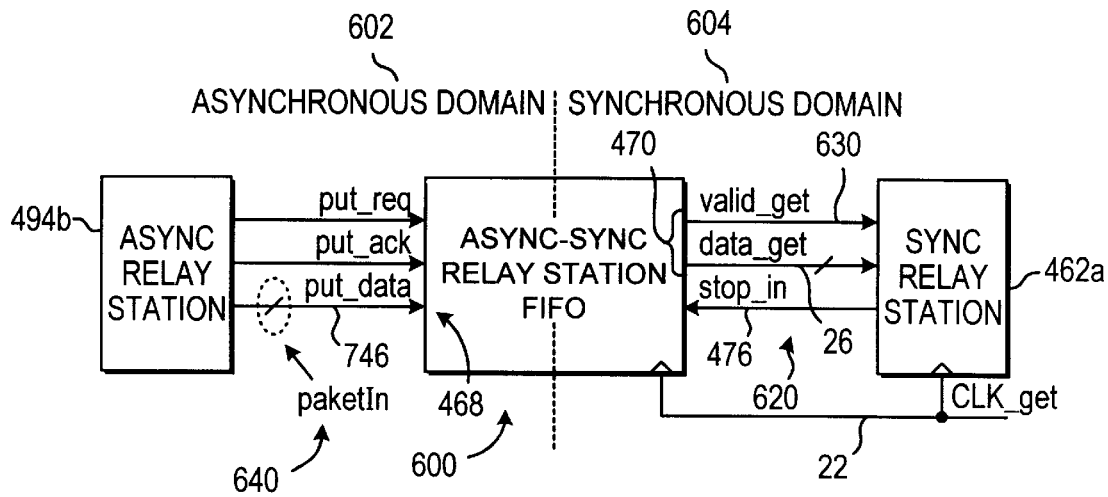
FIG. 44 is a more detailed schematic block diagram illustrating the FIFO circuit relay station system of FIG. 43 in accordance with the invention.
Figure 45:
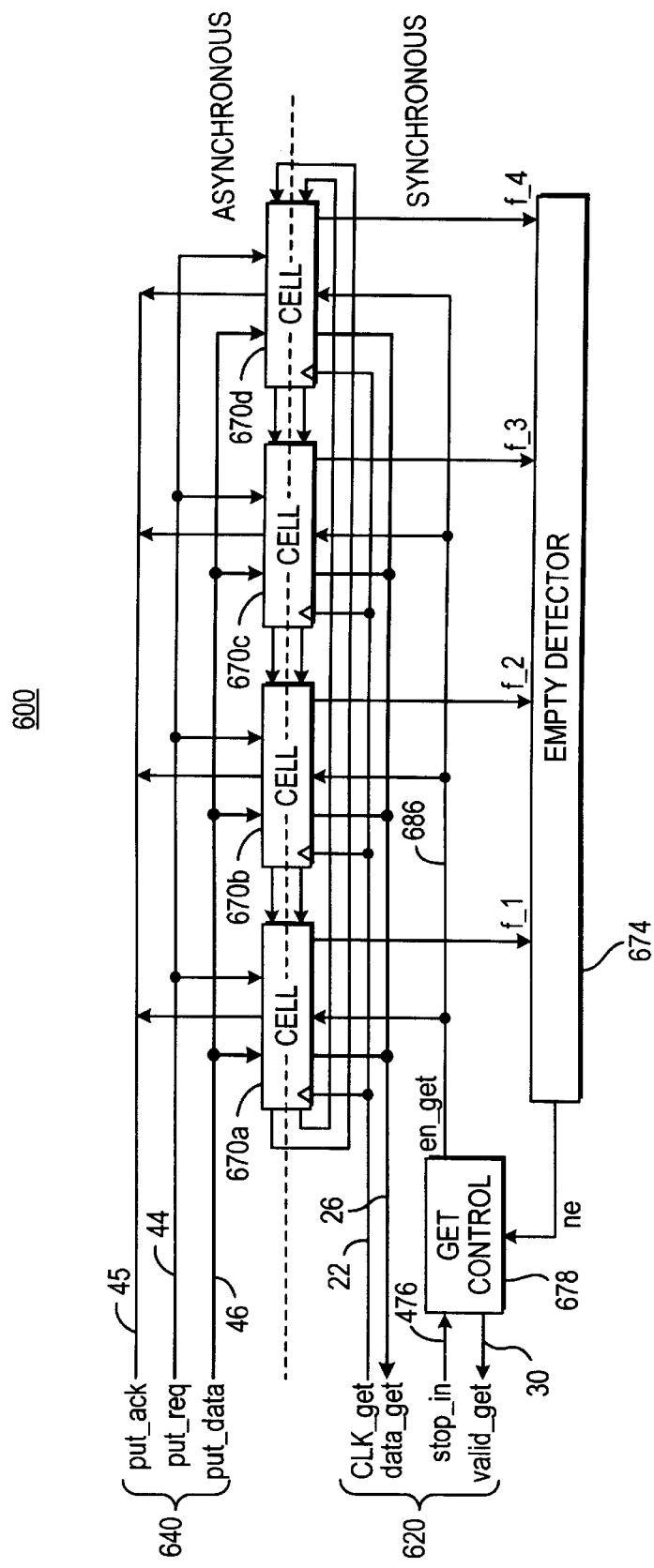
FIG. 45 is a more detailed schematic block diagram illustrating a FIFO circuit relay station illustrated in FIG. 44 in accordance with the invention.

FIFO circuit 600, which is illustrated in FIGS. 44 and 45, operates between an asynchronous domain 602 and a synchronous domain 604. The asynchronous interface 640 is identical and supports the same communication protocol with the asynchronous interface 40 in FIFO circuit 200 previously described. This interface matches exactly the micropipeline interfaces. Similarly, the synchronous interface 620 is identical and supports the same communication protocol with the respective synchronous get interface 508 in FIFO circuit 500. Referring to FIG. 45, at the architectural level, the FIFO circuit 600 is identical to FIFO circuit 200 shown in FIG. 8. Cells 670*a*, 670*b*, 670*c*, and 670*d* are substantially identical to cells 270*a*, 270*b*, 270*c*, and 270*d*. The get controller 678 is different from get controller 278 (which is substantially identical to get controller 178), as will be described below. Empty detector 674 is substantially identical to empty detector 574 in FIFO circuit 500, and corresponds to the near empty detector 120 illustrated in FIG. 18, above.

FIFO circuit 600 operates as follows. Whenever a data item is present at its asynch interface 640, FIFO circuit 600 enqueues it. On the synchronous interface 620, FIFO circuit 600 outputs a data item every clock cycle unless it is empty or it is stopped by the right relay station. Thus, unlike FIFO circuit 500, a data packet is invalid only if the FIFO circuit 600 is stalled. The get interface 620 is stalled when the FIFO circuit 600 is empty or stopped from the right. However, since the FIFO circuit 600 does not enqueue invalid data packets, the right interface receives only valid data packets unless the FIFO circuit 600 is stalled.

Figure 46:
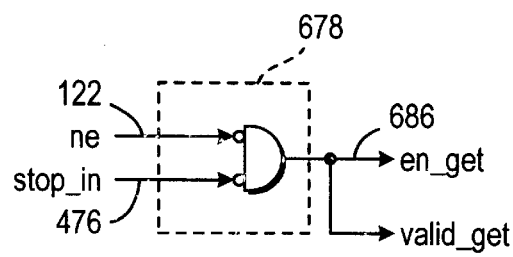
FIG. 46 is detailed schematic view of a portion of the FIFO circuit relay station illustrated in FIG. 45 in accordance with the invention.

The implementation of the get controller 678 is illustrated in FIG. 46. The get controller 678 enables a get operation (en_get=1) when it is not stopped from the right (stopIn=0) and when the relay station is not empty (ne=0). This operates in the same manner as get controller 178 of FIFO circuit 100. The packet sent to the right is invalid if either the relay station is stopped or it is empty. Therefore, all the packets received from the asynchronous interface are valid, and, thus, there is no need for an distinct validity bit, instead the get enable signal 686 (en_get) is used as the validity signal 30 (valid_get).

Figure 47:
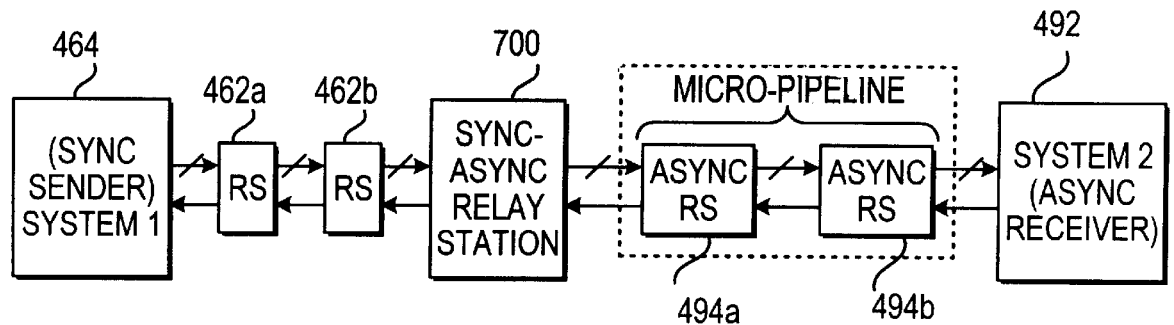
FIG. 47 is a schematic block diagram illustrating yet another FIFO circuit relay station system in accordance with the invention.

The basic architecture of communication between a synchronous sender 464 and an asynchronous receiver 492 with relay stations is illustrated in FIG. 47. The synchronous domain sends data packets through a chain of synchronous relay stations 462*a* and 462*b* to FIFO circuit 800. The packets are then transferred to the asynchronous receiver 292, preferably through the chain of ARS 494*a* and 494*b* in the asynchronous domain.

Figure 48:
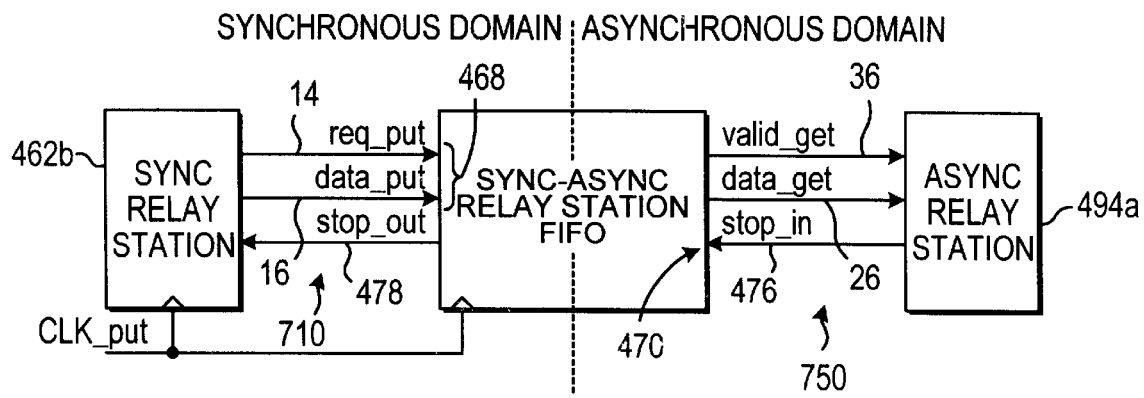
FIG. 48 is a more detailed schematic block diagram illustrating the FIFO circuit relay station system of FIG. 47 in accordance with the invention.
Figure 49:
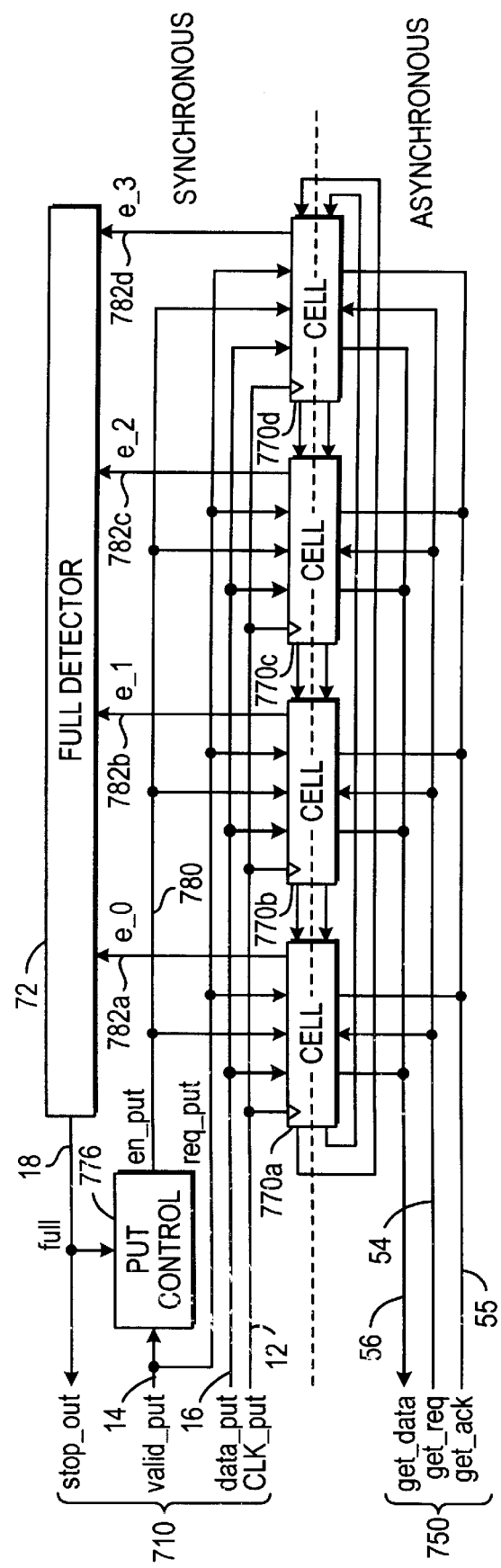
FIG. 49 is a more detailed schematic block diagram illustrating a FIFO circuit relay station illustrated in FIG. 48 in accordance with the invention.

The interfaces of FIFO circuit 700 are illustrated in FIG. 48. The asynchronous interface 750 is substantially identical to the asynchronous interface 50 of FIFO circuit 500 shown in FIG. 9, and supports the same communication protocol. Similarly, the synchronous interface 710 shown in FIG. 48 is substantially identical to synchronous interface 10 of FIFO circuit 300 and supports the same communication protocol. Cells 770*a*, 770*b*, 770*c*, and 770*d* of the FIFO circuit 700 shown in FIG. 49 are substantially identical to cells 370*a*, 370*b*, 370*c*, and 370*d* of the FIFO circuit shown in FIG. 10. The only significant difference between FIFO circuit 700 and FIFO circuit 300 is the put controller of each FIFO circuit.

Figure 50:
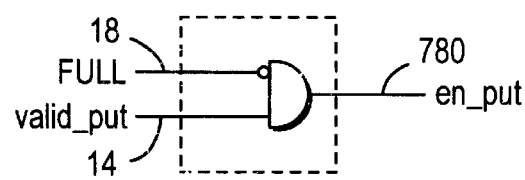
FIG. 50 is detailed schematic view of a portion of the FIFO circuit relay station illustrated in FIG. 49 in accordance with the invention.

During normal operation, FIFO circuit 700 transmits data packets from the synchronous interface to the asynchronous one. The asynchronous relay stations on the right enqueue a data packet whenever the FIFO circuit 700 supplies data. However, on the synchronous interface, the FIFO circuit 700 acts as a filter since all asynchronous data packets must be valid. The validity bit 14 (valid_put) of the incoming synchronous packets is used to filter them. More particularly, when the packet is valid, FIFO circuit 700 is configured to enqueue it; otherwise it is configured to discard it. FIFO circuit 700 enqueues only valid data packets and stalls the put interface when the FIFO circuit 700 is full. FIFO circuit 500, as described above, enqueues all data packets received, and stalls when there are no more full cells. In contrast, FIFO circuit 700 stalls under the following conditions: (1) when the FIFO is full and/or (2) when an invalid data packet is received. The exemplary implementation of the put controller 776 is given in FIG. 50. The put controller 776 enables a put operation (en_put=1) only when the relay station is not full (full=0) and the incoming data packet is valid (valid_put=1). The put controller 776 implementation is similar to put controller 176, but the role of the explicit put request signal (such as req_put) has been taken by an implicit valid bit 14 (valid_put) which accompanies every packet.

Figure 51:
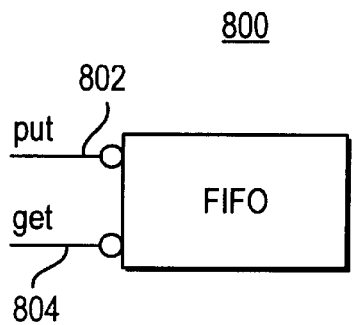
FIG. 51 is schematic block diagram of a further FIFO circuit in accordance with the invention.

FIFO circuits 800 (FIG. 51) and 900 (FIG. 56) in accordance with additional exemplary embodiments may be used when both the sender subsystem is asynchronous and the receiver subsystem is also asynchronous.

FIFO circuit 800 has two interfaces to the environment: a put interface 802 for enqueuing data and a get interface 804 for dequeuing data. The queue can perform concurrent enqueuing and dequeuing of the data. The put and get channels are typically passive (i.e. the environment initiates the enqueuing and dequeuing of the data). In the drawings that follow, the passive channels are indicated with hollow circles and the active channels with filled circles. However, it is noted that the embodiments described herein can be modified to have any combination of passive/active interfaces on the two channels with little effort. The port activity type does not change the base protocol.

Figure 52:
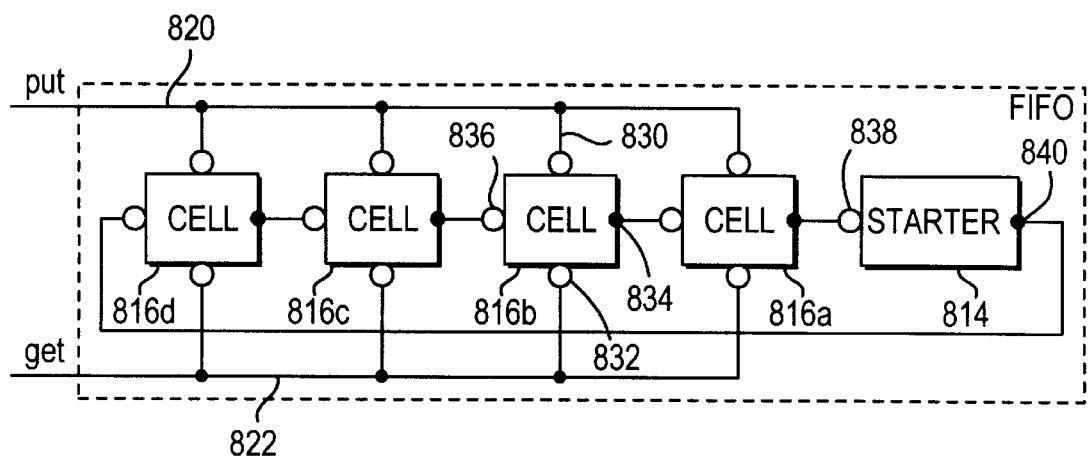
FIG. 52 is more detailed schematic block diagram of the FIFO circuit of FIG. 51 in accordance with the invention.

The FIFO circuit 800 is illustrated in greater detail in FIG. 52, Typically, an n-place FIFO circuit may comprise of a circular array of n identical cells and a special cell referred to as a "starter." Each cell can store one data item, and it communicates with the environment and with the two neighboring cells. The exemplary FIFO circuit 800 illustrated in FIG. 52 illustrates starter 814 and four cells 816a, 816b, 816c, and 816d, and may be referred to as a 4-place FIFO circuit.

Communication with the environment may be performed on common global buses. In FIFO circuit 800, there are two buses described herein. The put data bus 820 corresponds to the global put interface and allows the environment to enqueue a data item. A get data bus 822 corresponds to the global get interface and allows the environment to dequeue a data item.

Starter 814 is a special cell used at startup to inject the get token and the put token into the ring. Initially, the ring is empty and the starter 814 has both tokens. When requested by the environment, it will put the two tokens in circulation. The put token is put into circulation first, followed by the get token. After the step of initially injecting the put and get tokens, it will simply pass the tokens from one adjacent cell to the other, performing no other actions. It is noted that other embodiment of the FIFO circuit may be used wherein the starter is omitted from the circuit, such as FIFO circuit 900, described in greater detail below (in addition to FIFO circuits 100, 200, 300, 500, 600, and 700 described above).

Informally, the protocol of each cell can be described by the simple program in TABLE 1(a):

| forever { | FIFO = | |
|---|---|---|
| ObtainPutToken | *[[ right; | (1a) |
| EnqueueData | [put→put?x]; | (2a) |
| PassPutToken | [left→left]; | (3a) |
| ObtainGetToken | right; | (4a) |
| DequeueData | [get→get!x] | (5a) |
| PassGetToken} | [left→left] ]]; | (6a) |
| (a) | (b) | |

As shown in TABLE 1, above, the behavior of cells 816a, 816b, 816c, and 816d is the following. It first requests the put token from right. Once the cell obtains the put token, it enqueues data when the environment provides it, and it passes the put token to the cell to the left, i.e., cell 816a passes the put token to cell 816b. Subsequently, the cell requests the get token and, when received, the cell dequeues data when the environment requests it, and it passes the token to the cell to the left, e.g., cell 816a passes the get token to cell 816b. The cycle starts again by requesting the put token from right.

This behavior guarantees correct sequencing of the get tokens and put tokens, and avoids deadlock in the FIFO circuit 800. Correct sequencing occurs since both put and get tokens have first been used by the right cell and then passed to the left neighbor. Consequently, the right cell will enqueue data before the left one and it will dequeue data before the left one. Because each cell passes tokens to the left once they have been used for a data operation, the tokens will freely flow around the ring, avoiding deadlock.

Figure 53:
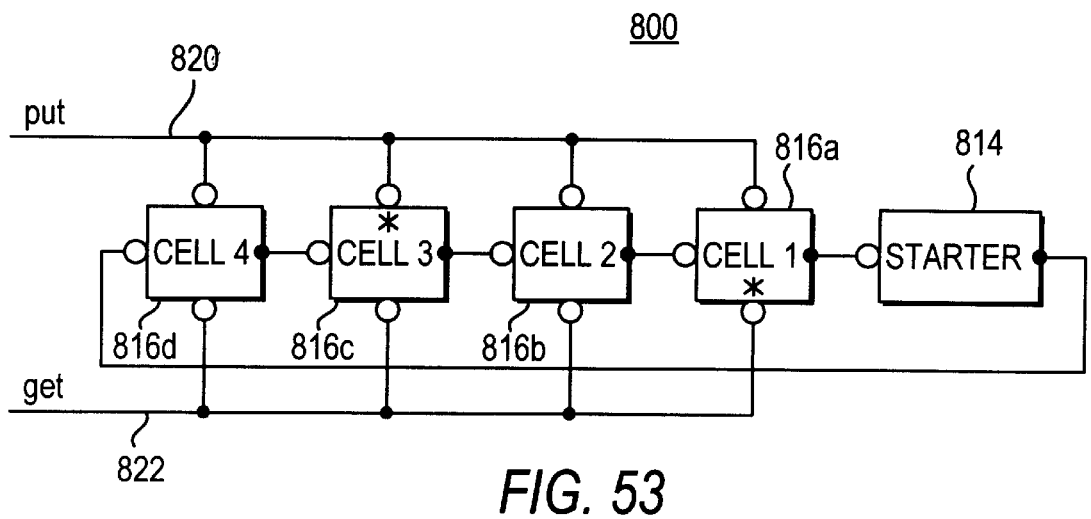
FIGS. 53–55 are schematic block diagrams similar to FIG. 52 illustrating various stages of operation of the FIFO circuit in accordance with the invention.
Figure 54:
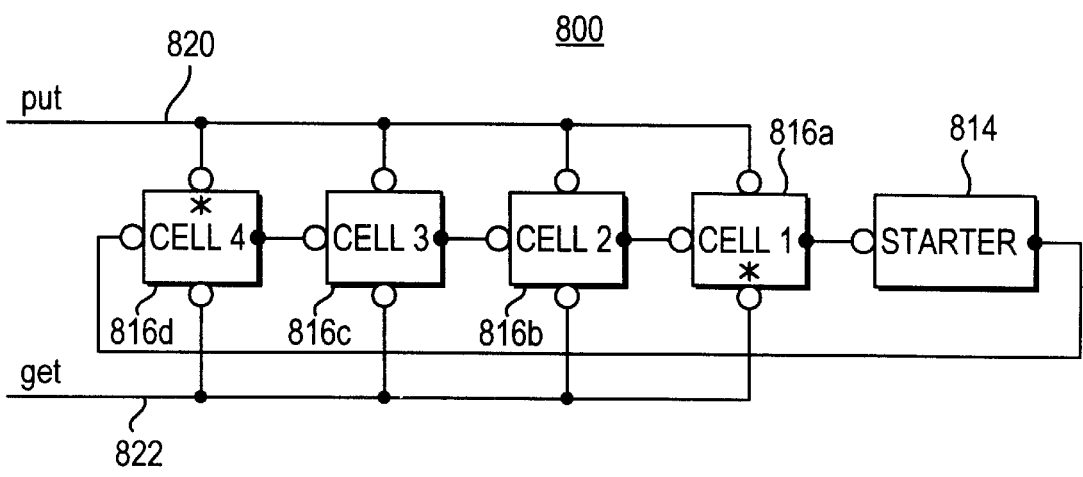
Figure 55:
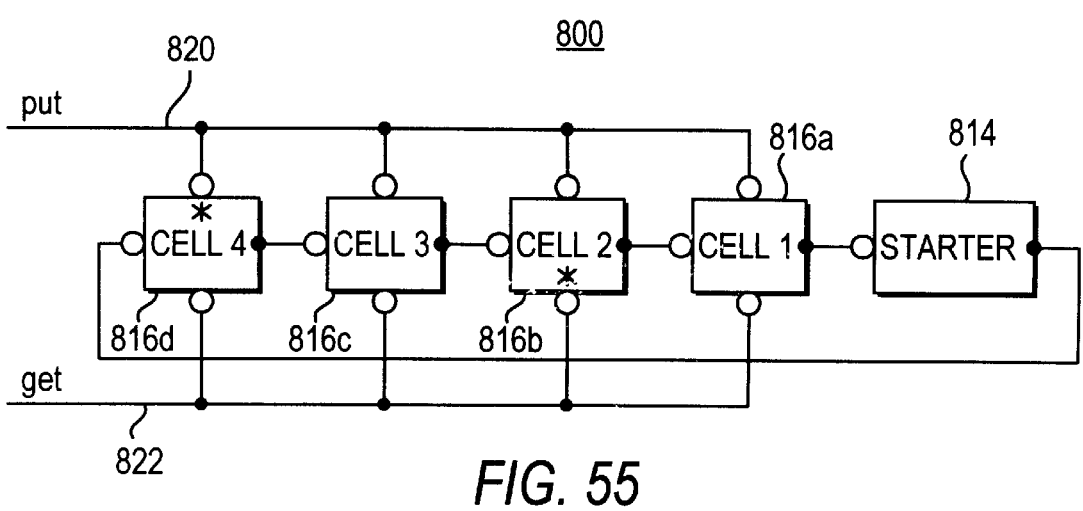

The dynamic behavior of FIFO circuit 800 is illustrated in FIGS. 53–55. FIG. 53 illustrates the initial state of the queue. The put and get tokens are indicated with a star next to the interfaces to the put and get buses, respectively. More particularly, the put token is located in cell 816c adjacent the put data bus 820, and the get token is located in cell 816a adjacent the get data bus 822. FIFO circuit 800 is illustrated in FIG. 54 after a put operation. In this case, the put token is passed to the left, i.e., from cell 816c to 816d, and the get token remains in cell 816a. FIFO circuit 800 is illustrated in FIG. 55 after a get operation. The get token is passed to the left, i.e., from cell 816a to 816b, and the put token remains in cell 816d.

There are two special cases in the FIFO's behavior. (1) When the FIFO circuit 800 is empty, the environment can still safely make a get request. The put token and get token are in adjacent cells, e.g., left and right, respectively. The put cell is currently not receiving new data. The get cell tries to pass the get token to left, but it is blocked. It will remain blocked until the put cell has completely enqueued data and passed the put token. (2) When the FIFO circuit 800 is full, the environment can still safely make a put request. Get and put are in adjacent cells, e.g., left and right, respectively, which is the reverse of the empty condition (1), above. The get cell is currently not dequeuing stored data. The put cell tries to pass the put token to the left, but it is blocked by the presence of the get token in the left cell. It will remain blocked until the get cell has completely dequeued data and passed the get token.

The detailed handshake behavior of each cell is described above with respect to TABLE 1(b). As illustrated in FIG. 52, the interface of each cell consists of four channels. Two channels are used to communicate with the environment: (1) put channel 820, which is passive, and used to receive data items from the environment, such as a sender subsystem, and (2) get channel 822, also passive, and used to output data items to the environment, such as a receiver subsystem. The other two channels are used to communicate with the adjacent cells: (3) right channel 834, which is active, and used to receive the tokens, and (4) left channel 836, which is passive, and used to pass the tokens.

The flow of the two tokens is multiplexed onto single channels. The right channel is used first to receive the put token and then the get token. Similarly, the tokens are passed on the left channel in the same order. The strict sequence and separation of enqueuing and dequeuing of data guarantees the safe multiplexing of token passing.

The behavior of each cell can is described in a syntax, as shown in TABLE 1(b), which is a "CSP-like" syntax. (The CSP syntax is described in A. Martin, "Programming in VLSI: From Communicating Processes to Delay-Insensitive Circuits," *Developments in Concurrency and Communication, UT Year of Programming Series*, pp. 1–64, 1990, which is incorporated by reference in its entirety herein.) The CSP program is interpreted as follows. The cell first completes a full handshake on the right channel (1a). The cell then checks the put channel for data, using the probe construct, as described in Martin, above, which is a boolean function on a channel that is true when there is a pending communication. The start of the communication may have occurred at any point before the probe is checked. When a pending communication is detected, the cell completes a full handshake on put and then checks the left channel for a pending request (2a). When a request is detected, the cell completes the full handshake on the left channel (3a). This behavior repeats again, with the communication with the environment on the get channel, i.e., handshake to the right cell to obtain get token (4a); check left cell for get request, and perform get operation (5a); and complete handshake to the left cell (6a).

The CSP specification leaves some choices for the handshake type and data encoding. In the exemplary embodiment, four-phase handshaking is used for the channels, bundled data for data channels and a broad protocol for data validity, as is known in the art (Further details on handshaking are given in A. Peeters, "Single-Rail Handshake Circuits," Ph.D. Thesis, Eindhoven Technical University, 1996, which is incorporated by reference in its entirety herein.) The handshake expansion of the above program is represented herein:

$FIFO \equiv *[\text{right\_req} \uparrow;[\text{right\_ack}]; \text{right\_req} \downarrow; [\neg \text{right\_ack}];$ (1b)

[put_req]; put_ack↑; [¬ put_req]; put_ack↓; (2b)

[left_req]; left_ack↑; [¬ left_req]; left_ack↓; (3b)

right_req↑;[¬ right_ack]; right_req↓; [¬ right_ack]; (4b)

[get_req]; get_ack↑; [¬ get_req]; get_ack↓; (5b)

[left_reg]; left_ack↑; [¬ left_req]; left_ack↓ (6b)

In the exemplary embodiment, starter 814 may have a different behavior and its own specification. As illustrated in FIG. 52, the interface of starter 814 comprises two channels, both used to communicated with the adjacent cells: (1) left channel 838, which is passive, and used to pass the tokens, and (2) the right channel 840, which is active, used to request the tokens. The behavior of starter 814 may be described by a CSP program:

$STARTER \equiv [\overline{\text{left}} \to \text{left}];$ (7)

$[\overline{\text{left}} \to \text{left}];$ $*[\overline{\text{left}} \to \text{right}; \text{left}]$ The starter's behavior is as follows. For the first two requests on its left channel, starter 814 simply completes the handshake on those channels, corresponding to placing of the two tokens into circulation. Starter 814 then enters an infinite loop in which, for each request on its left channel, it performs a handshake on the right channel and then completes the handshake on the left. This operation corresponds to passing a token from the right cell to the left cell.

The observable events on the starter's interface are given by the following handshake expansion:

[left_req]; left_ack↑; [¬ left_req]; left_ack↓; (8)

[left_req]; left_ack↑; [¬ left_req]; left_ack↓;

*[[left_req];

right_req↑;[right_ack]; right_req↓; [¬ right_ack];

left_ack↑ [¬ left_ack]; left_ack↓]

Figure 56:
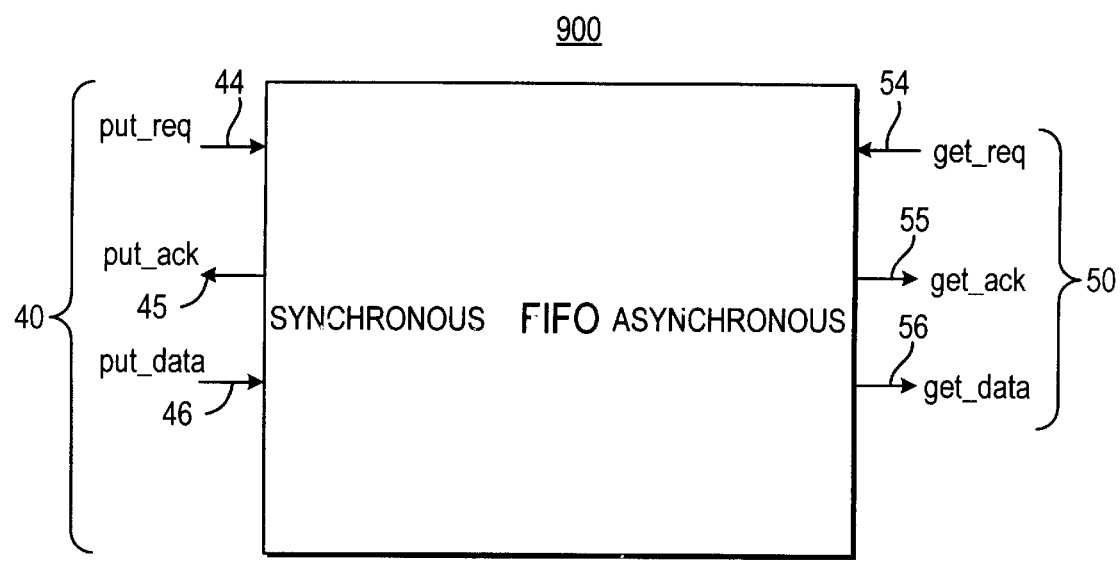
FIG. 56 is a schematic block diagram of still another FIFO circuit in accordance with the invention.

Another embodiment of the invention is FIFO circuit 900 shown in FIG. 56. As described above, FIFO circuit 800 had one channel on its left and right interfaces, i.e., right channel 834 and left channel 836. FIFO circuit 900 improves the performance of FIFO circuit 800, both in terms of latency and throughput. Increased performance is obtained by allowing more concurrency both at the program level (parallelizing operations) and the architectural level (overlapping return-to-zero phases with active phases). As illustrated in FIG. 56, FIFO circuit 900 utilizes the modular asynchronous put interface 40, as illustrated in FIG. 3 along with the modular asynchronous get interface 50, as illustrated in FIG. 4

Figure 57:
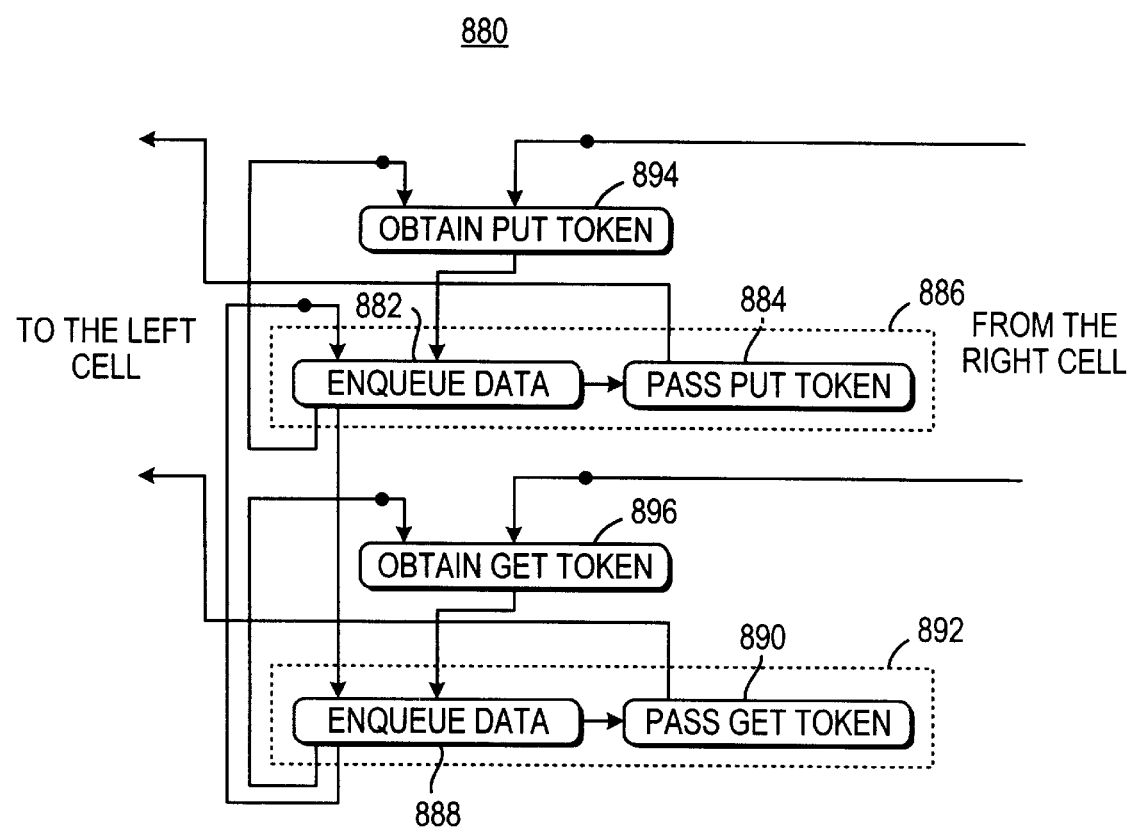
FIG. 57 is a Petri-net specification of the FIFO circuit of FIG. 56 in accordance with the invention.

The high-level optimized protocol of FIFO circuit 900 is given by a Petri Net 880 illustrated in FIG. 57. There are two types of parallelization. The first one allows a data operation 882 and the subsequent passing of a token 884 to be overlapped, the token passing operation 884 starting after the data operation 882 starts (the dotted box 886 in FIG. 57 indicate that token passing 884 starts only after the data operation 882 begins, but then both operations are concurrent). Similarly, dotted box 892 indicates that token passing 890 starts only after dequeuing data 888 begins, but is otherwise concurrent. The second parallelization allows the concurrency between dequeuing of data 888 and obtaining the put token 890, and the concurrency between enqueuing data 882 and obtaining the get token 896.

This concurrency has two effects: (1) Higher throughput: there are two critical actions performed for a data operation. First, obtain token; second, do data processing. The resulting token passing is performed in parallel with data processing. (2) Lower latency: there is at most one critical action between enqueuing and dequeuing data. If ObtainGetToken 896 is fast and is complete by the end of enqueuing data 882, the cell can begin dequeuing data immediately. Otherwise it waits until the get token is obtained.

The above-described protocol changes the interface of cell as described above with respect to FIG. 52. As illustrated in FIG. 56, FIFO circuit 900 has a put interface and a get interface communicating with the environment. In contrast with FIFO circuit 800, there are two channels each on the left and right interfaces. Since obtaining the put and get tokens can be performed in parallel, the actions cannot be multiplexed on single right or left channels. FIFO circuit 900 therefore has two channels on both the left and the right interfaces.

Figure 58:
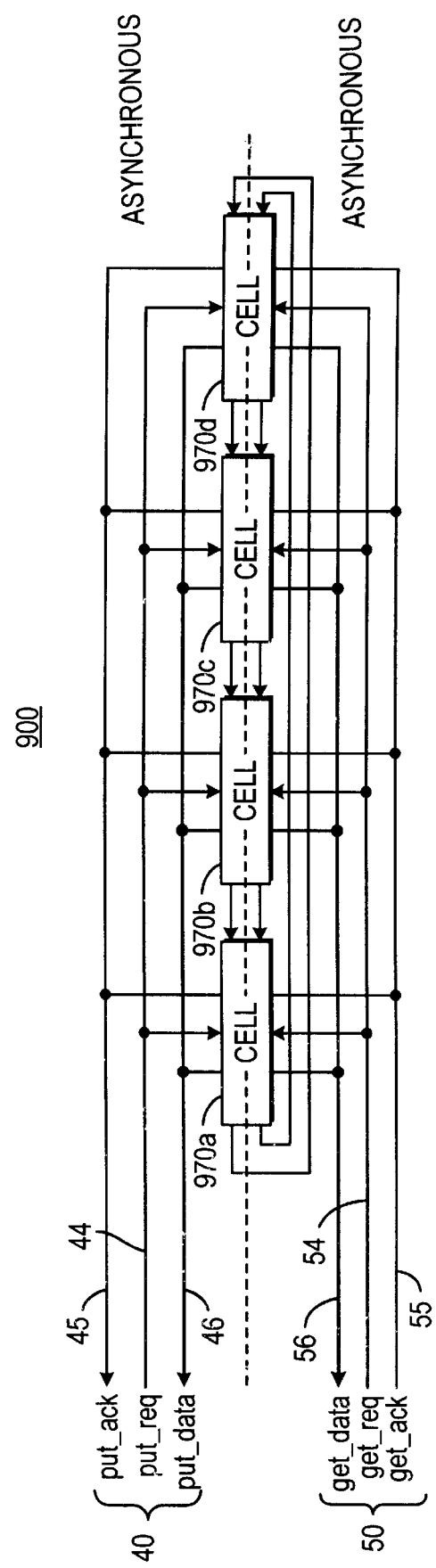
FIG. 58 is a more detailed schematic block diagram of the FIFO circuit of FIG. 56 in accordance with the invention.

As illustrated in FIG. 58, FIFO circuit 900 comprises a plurality of cells 970a, 970b, 970c, and 970d. As described above with respect to cells 170a–d, 270a–d and 370a–d, each cell 970a–d has a configuration that consists of four distinct, interchangeable component parts that are selected to interface with environment: (1) a put component, (2) a get component, (3) a data validity (DV) controller which provides an indication of whether the cell has a data item, and (4) a register which is configured to operate with both the sender and receiver environments. Consequently, the put components in cells 970a–d will be substantially identical to the put component of cells 270a–d, which operates with an asynchronous sender environment. The get components in cells 970a–d and 270a–d will be substantially identical to the get component of cella 370a–d, which operate with an asynchronous receiver environment. As with cells 170—d, 270a–d, and 370a–d, the put component, the get component, the data validity controller, and the registers of cells 970a–d are attached together to obtain a complete cell.

Figure 59:
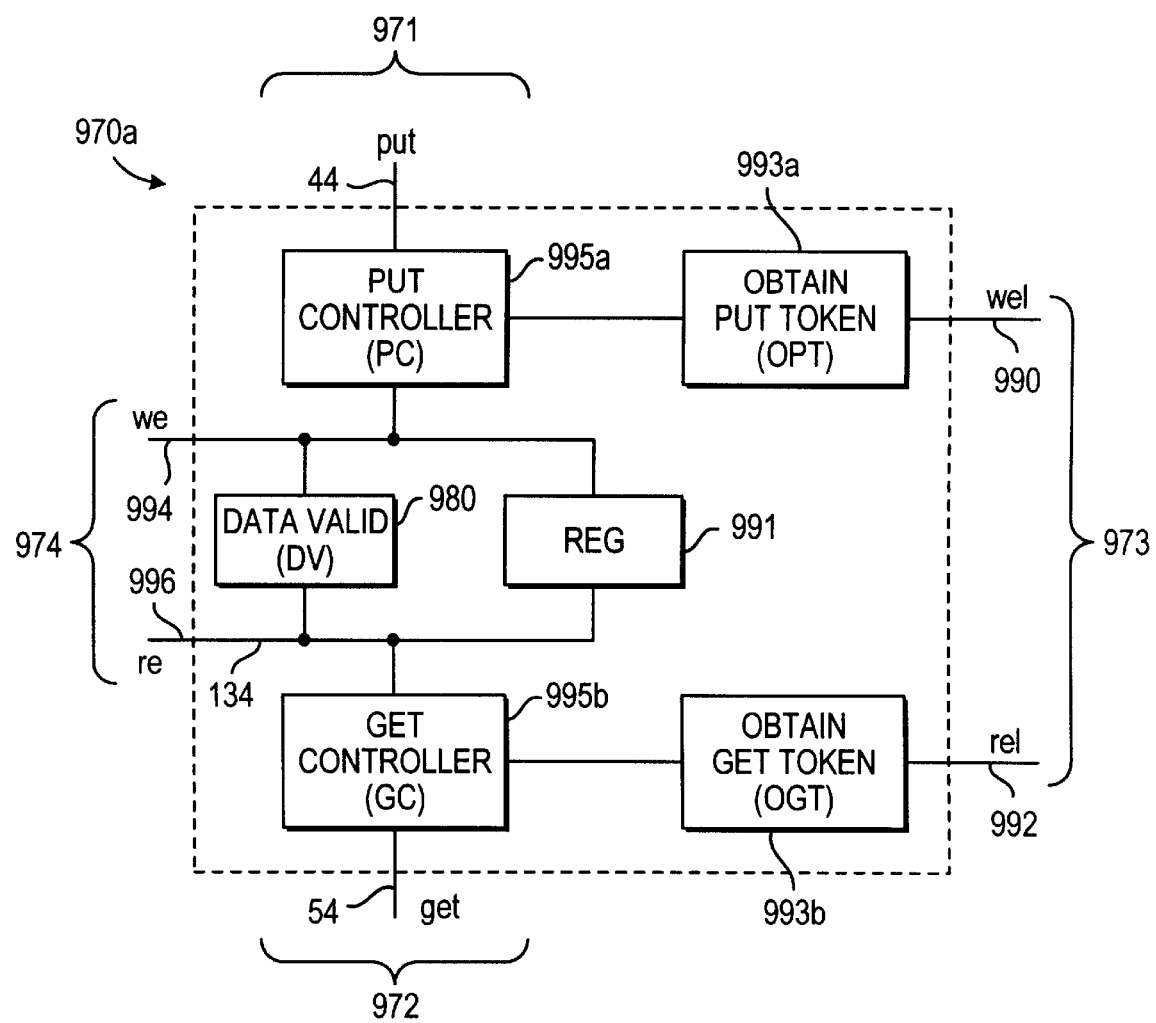
FIG. 59 is a schematic block diagram of a portion of the FIFO circuit of FIGS. 56 and 58 in accordance with the invention.

A block diagram of the architecture of cell 970a of FIFO circuit 900 is given in FIG. 59. Cell 970a has four interfaces: (1) an asynchronous put interface 971, (2) an asynchronous get interface 972, (3) an interface 973 with a right cell in the array of cells, and (4) an interface 974 with a left cell in the array of cells. Cell 970a is decomposed into several blocks. The put component part comprises ObtainPutToken block 993a (OPT) and PutController 995a (PC). The get component part comprises and ObtainGetToken block 993b (OGT) and GetController 995b (GC). ObtainPutToken block 993a (OPT) and ObtainGetToken block 993b (OGT) obtain the respective tokens from the right interface 973. PutController 995a (PC) and GetController 995b (GC) perform handshaking on the respective put and get channels and also pass the respective token to the left cell on left interface 974. (It is noted that PutController 995a and GetController 995b are substantially similar to asymmetric C-elements 295 and 395, respectively.) Data validity controller 980 (DV_aa) indicates when the register 991 (REG) has valid data, i.e., after enqueuing, and when it does not have valid data, i.e., after dequeuing.

PutController 995a (PC) is enabled when three conditions have all occurred: (1) the cell 970a has the put token (ptolk=1), (2) there is a request from the environment on the put channel to enqueue data (put_req=1), and (3) data in the cell is not valid, i.e., data that was previously in the cell has been dequeued (valid=0). Once PutController 995a (PC) is enabled, it latches data in the register 991 (REG) by asserting put token output 994 (we), communicates to Data validity controller 980 (DV_aa) that data is valid, and starts sending the put token to the left cell and a put acknowledgement to the environment, as described in greater detail below. At the end of the handshake on put, PutController 995a (PC) makes the latches opaque, finishes sending the put token to the left, and tells ObtainPutToken block 993a (OPT) to obtain the put token for the next put operation.

GetController 995b (GC) is similarly enabled by three conditions: (1) the presence of the get token (gtok=1), (2) a request from the environment on the get channel (get_req=1), and (3) data validity, i.e., a data item was enqueued (valid=1). When GetController 995a (GC) is enabled, it outputs data from the register 991 (REG) onto the get data bus 56 (get_data) by asserting the get token output 996 (re) and starts sending the get token to the left. The register 991 (REG) will acknowledge to the environment when data is output, as described in greater detail below. At the end of the get handshake, GetController 995b (GC) tells Data validity controller 980 (DV_aa) that data is invalid, finishes sending the get token to the left, makes the latches opaque and tells ObtainGetToken block 993b (OGT) to obtain the next get token from the right.

In FIFO circuit 900, newly-enqueued data is marked valid as soon as the active phase of enqueuing is over, which means that the active phase of dequeuing can be overlapped with the return to zero of enqueuing. Moreover, newly-dequeued data is marked invalid only at the end of the dequeueing return to zero. This prevents the cell from overwriting its data while the contents of the register 991 (REG) are being output.

The new cell specification was formally verified to implement a FIFO. Using a trace theory verifier, AVER, it was shown that the composition of three cells is "conformation-equivalent" to a FIFO a capacity three, i.e., a collection of three cells can be used in lieu of a 3-place FIFO and will have the same observable behavior. (Further details of this verification methods are described in D. Dill et al., "Specification and Automatic Verification of Self-Timed Queues," *Formal Methods in System Design* 1:29–60(1992)., which is incorporated by reference in its entirety herein.) The verification can easily be repeated for any number of cells.

Figure 60:
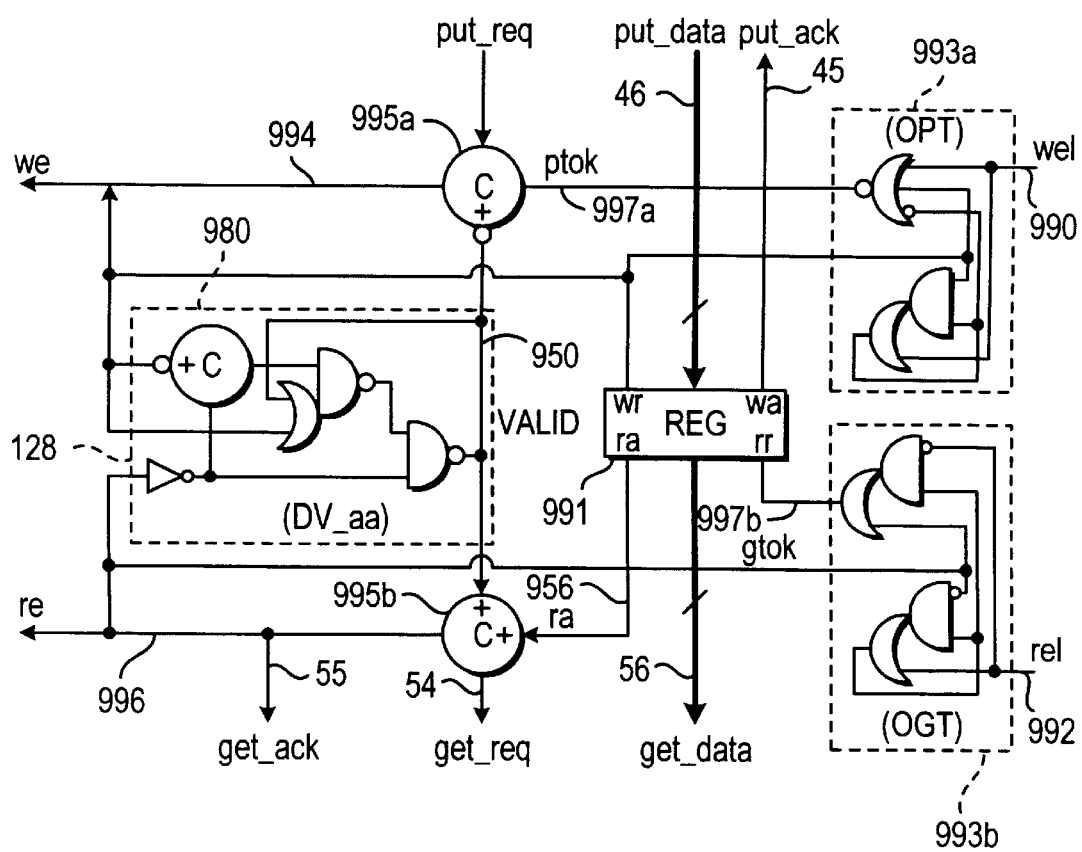
FIG. 60 is a more detailed schematic view of the portion of the FIFO circuit illustrated in FIG. 69 in accordance with the invention.

Cell 970a is illustrated in greater detail in FIG. 60. ObtainPutToken block 993a (OPT) and ObtainGetToken block 993b (OGT) may be burst-mode machines as synthesized using MINMALIST. (This technique is further described in R. M. Fuhrer et al, "MINIMALIST: An environment for Synthesis, Verification and Testability of Burst-Mode Asynchronous Machines," *CUCS*-020-99, *Columbia University, Computer Science Department*, 1999, which is incorporated by reference in its entirety herein.) Data validity controller 980 (DV_aa) was synthesized using "Petrify". (Petrify is described in greater detail in J. Cortadella et al., "Petrify: a tool for manipulating concurrent specifications and synthesis of asynchronous controllers," *IEICE Transactions on Information and Systems*, Vol. E80-D, Number 3, pp. 315–325, March 1997, which is incorporated by reference in its entirety herein.). The left and right interfaces may consist of single wires and not of channels.

Figure 61:
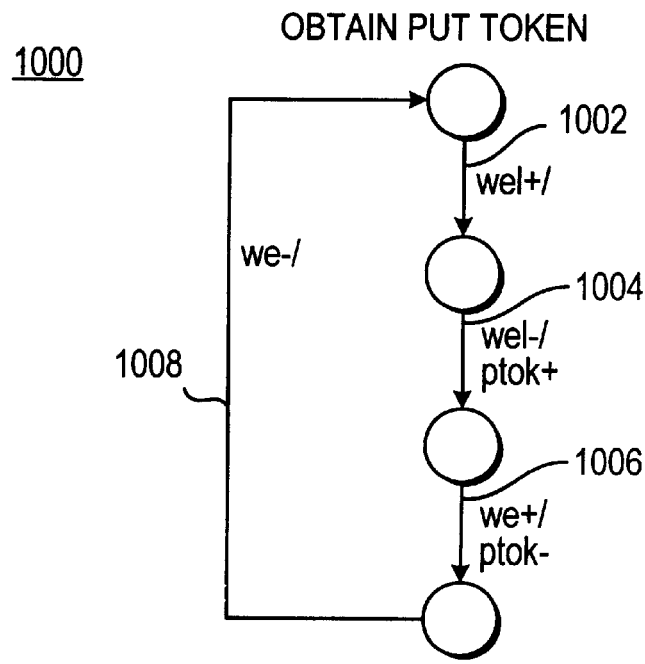
FIG. 61 is a burst-mode specification of a portion of the FIFO circuit of FIG. 60 in accordance with the invention.

The burst mode specification 1000 for ObtainPutToken block 993a (OPT) is illustrated in FIG. 61. Referring to FIGS. 60 and 61, the ObtainPutToken block 993a (OPI) is controlled by the write enable signals, i.e., the put token input 990 (we1) from the right cell and the put token output 994 (we) from the current cell. More particularly, it observes the right cell and waits for a put operation. The right cell sets the put token input 990 (we1) at step 1002 and resets the put token input 990 (we1) at step 1004, which indicates a complete token passing. After that operation takes place, the put token is in the current cell, i.e., put token signal 997a (ptok) is set (step 1004), which allows another put operation can take place. Once the put operation starts, both the put token signal 997a (ptok) is reset and the put token output 994 (we) is set at step 1006. When the put operation finishes, the put token output 994 (we) is reset, the token is sent to the next cell and the cycle resumes.

Figure 63:
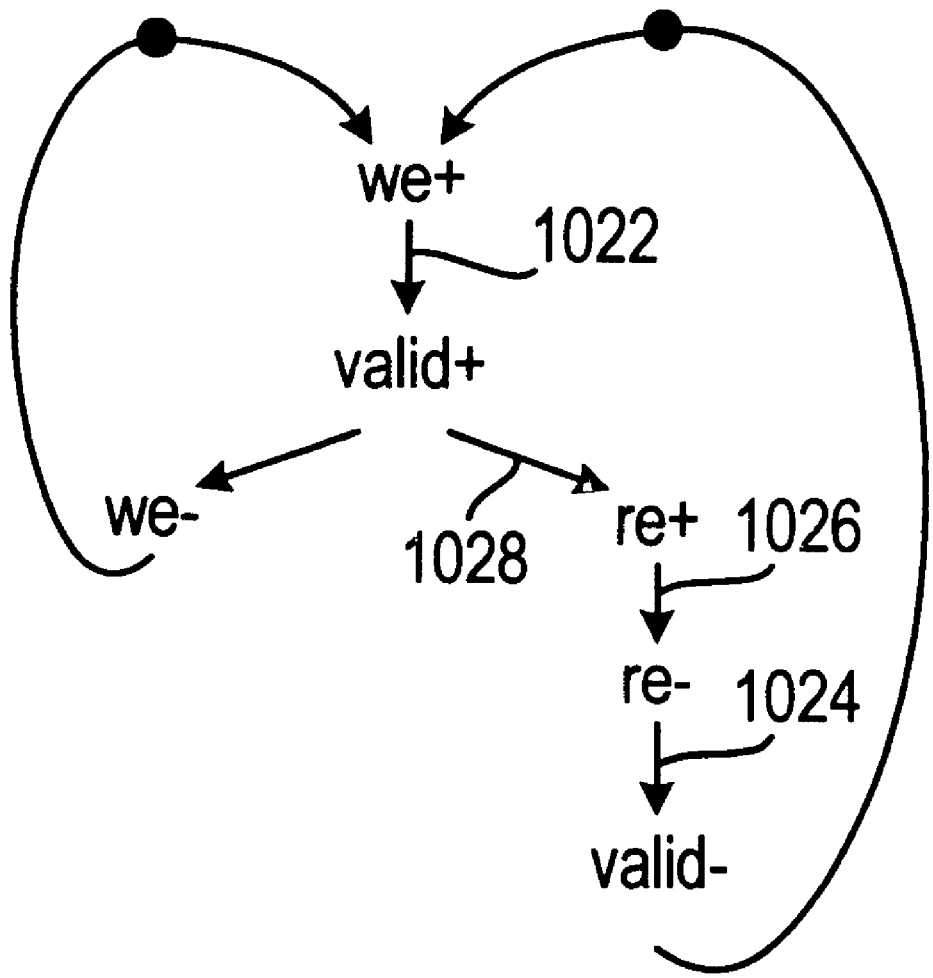
FIG. 63 is a Petri-net specification of the FIFO circuit of FIG. 60 in accordance with the invention.

The data validity controller 980 (DV aa) has two inputs—the put token output 994 (we) and get token output 996 (re), and an output—valid signal 950 (valid)—which indicates when data is valid. (In FIFO circuit 900, valid signal 950 (valid) replaces the separate full bit and empty bit in FIFO circuits 100, 200, and 300.) The Petri-net specification 1020 for data validity controller 980 (DV_aa) is illustrated in FIG. 63. The valid signal 950 (valid) is asserted (step 1022) when the put token output 994 (we) is asserted. The valid signal 950 (valid) is de-asserted (step 1024) when the get token output 996 (re) is de-asserted (step 1026), after having been previously asserted (1028).

With continued reference to FIG. 60, both PutController 995a (PC) and GetController 995b (GC) are implemented with asymmetric C-elements. The put token output 994 (we) of PutController 995a (PC) becomes 1 when every input is 1, i.e., put token signal 997a (ptok), valid signal 950 (valid), and put request signal 44 (put_req). Put token output 980 (we) is reset when put request signal 44 (put_req) and put token signal 997a (ptok) are 0. (Asymmetric C-element 995a is substantially identical to asymmetric C-element 295 illustrated in FIG. 26, above, with the valid signal 950 (valid) substituted for the empty bit 282a (e_i).) Similarly, the get token output 996 (re) and the get acknowledgement signal 55 (get_ack) produced by GetController 995b (GC) will be 1 when all inputs are 1, i.e., the register 991 (REG) has been read and acknowledged by read acknowledge signal 956 (ra), valid signal 950 (valid), and get request signal 954 (get_req). Get token output 996 (re) will reset whenever the get request signal 54 (get_req)is de-asserted.

Figure 62:
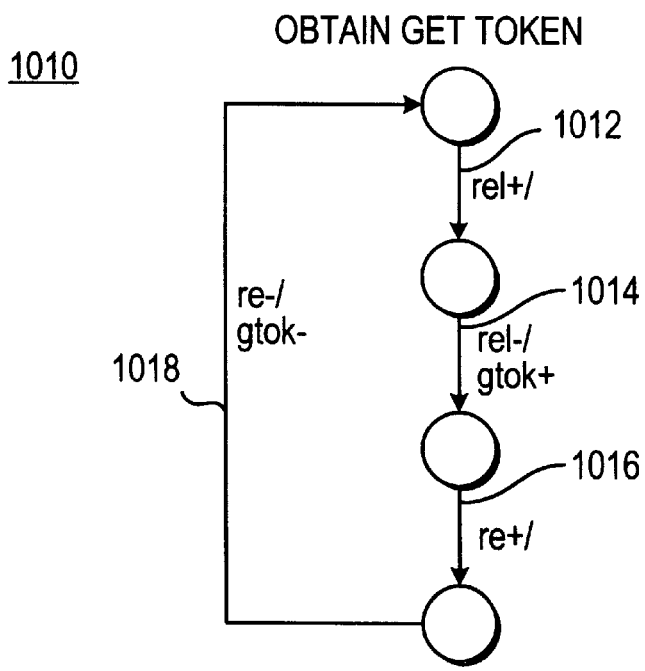
FIG. 62 is a burst-mode specification of another portion of the FIFO circuit of FIG. 60 in accordance with the invention.

The burst-mode specification 1010 for ObtainGetToken block 993b (OGT) is illustrated in FIG. 62. The ObtainGetToken block 993b (OGT observes the right cell and waits for a get operation. The right cell sets the put token input 992 (re1) at step 1012 and subsequently resets the put token input 992 (re1) at step 1014, which indicates a complete token passing. After that operation takes place, the get token is in the current cell, i.e., get token signal 997b (gtok) is set (step 1014). The get token output 996 (re) is set at step 1016, as controlled by the GetController 995b (GC). It starts the get operation when the cell is full, when it has the get token and when the receiver request a data item. Once dequeuing is completed, communication with receiver is finished by resetting the request and the acknowledgment. At step 1018, the get token output 996 (re) is reset, along with the get token signal 997b (gtok).

Figure 33:
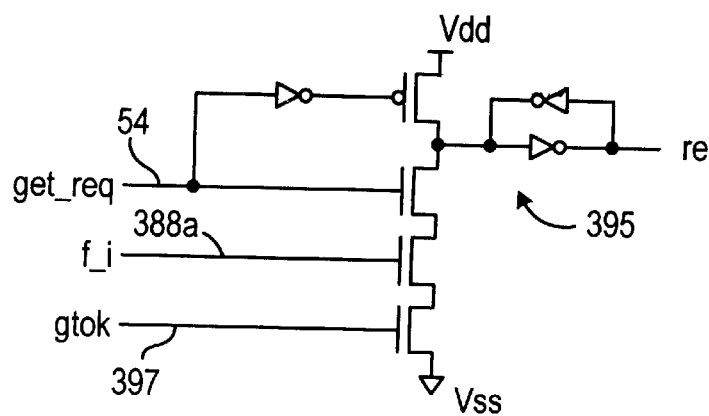
FIG. 33 is a more detailed schematic block diagram of a further portion of the FIFO circuit illustrated in FIG. 30 in accordance with the invention.

There is one more optimization at the implementation level, referred to as "early read enable." It is desirable to drive the output get data bus 56 as soon as possible due to the increased load on it. For this, writing to the get data bus 56 is enabled, i.e. enabling a read of register 130 (REG) as soon as a cell has the get token, even if no get request 154 (get_req) has been issued. The acknowledgement 956 (ra) from the register 991 (REG) is then used to enable GetController 995b (GC), which is implemented with an asymmetric C-element (otherwise deadlock might occur). Asymmetric C-element 995b is substantially identical to asymmetric C-element 395 illustrated in FIG. 33, above, with the valid signal 950 (valid) substituted for the full bit 388a (f_i).) The advantage of this optimization is that the latency of driving the get data bus 56 (get_data) may be incurred before the get request 54 (get_req) has arrived, thus speeding up the get_req operation.

For this design, there is no explicit Starter. The implementation designates one cell as a starter cell, such as cell 970a, which initially contains both tokens. Reset logic is added to initialize put token signal 997a (ptok), get token signal 997b (gtok) and the internal state variables for ObtainPutToken block 993a (OPT) and ObtainGetToken block 993b (OGT) to one.

The above implementation of the FIFO cell 970a is not speed-independent. There are two types of timing constraints that have to be met to make the implementation work correctly. The first category of timing constraints contains the fundamental mode timing constraints for the ObtainPutToken block 993a (OPT) and the ObtainGetToken block 993b (OGT) burst-mode machines: the next input must arrive only after the circuit is stable. These timing constraints are very easily met. Increasing the number of cells does not affect the timing constraints since they are localized in the controllers that communicate only with the adjacent cells.

The circuit also presents a pulse-width timing constraint on we. The pulse width of we high must be greater than the time for machine (DV) to process the we high input. The timing constraint, expressed in terms of critical paths, is:

$$^a\text{we}\uparrow \rightarrow \text{valid}\uparrow \text{feedback} <^a\text{we}\uparrow \rightarrow \text{put\_ack}\uparrow \rightarrow \text{put\_req}\downarrow \rightarrow \text{we}\downarrow \quad (9)$$

The constraint is easily met since the longer delay involves a path through the environment, as well as a reasonably long internal cell path (several gates). In fact, as the number of FIFO cells increases, it is easier to meet this constraint because the path through the environment becomes longer.

Example

In order to evaluate the performance of the various FIFO circuit designs, Each of the exemplary FIFO circuit 100, 200, 300, 500, 600, and 700 were simulated. Each FIFO circuit was simulated using both commercial and academic tools. The designs were built using both library and custom circuits, and were simulated using Cadence HSPICE. The Burst-Mode controllers were synthesized using Minimalist (Minimalist is described in greater detail in R. Fuhrer et al., "MINIMALIST: An Environment for Synthesis, Verification and Testability of Burst-Mode Asynchronous Machines," *CUCS*-020-99, 1999, which is incorporated by reference in its entirety herein.) and the Petri-Net controllers were synthesized using Petrify (Petrify is described in greater detail in J. Cortadella et al., "Petrify: A Tool for Manipulating Concurrent Specifications and Synthesis of Asynchronous Controllers," *IEICE Transactions on Information and Systems,* Vol. E80-D, Number 3, pp. 315–325, March 1997, which is incorporated by reference in its entirety herein). The FIFO circuit designs were simulated in 0.6 $\mu$ HP CMOS technology, at 3.3V and 300K.

The following are among the special considerations in modeling the control and data global buses: The control buses put_req/en_put, and get_req/en_get were inserted with appropriate buffering. The asynchronous acknowledgement signals put_ack and get_ack are constructed as a tree of OR gates that merge individual acknowledgements into a single global one. In modeling get_data and data_get, each bit in the bus is driven by tri-state buffers. Both the load contributed by the environment and by the long wires within the FIFO circuit were modeled. The model made the assumption that the environment contributes to the load with two inverters (roughly corresponding to a latch), and that each wire contributes with a capacitance of two inverters per cell (roughly 2 n inverters per wire).

Two metrics have been simulated for each design: latency and throughput. Latency is the delay from the input of data on the put interface, to its presence at the output on the get interface in an empty FIFO circuit. Throughput is defined as the reverse of the cycle time for a put or get operation. The throughput and latency have been computed for different FIFO circuit capacities and data item widths. The FIFO circuit's capacity has been set to four, eight, or 16 cells. For each of these FIFO circuit's, the data item width has been set to either eight or 16 bits.

The results for maximum throughput are given in TABLES 1 and 2. For synchronous interfaces, the throughput is expressed as the maximum clock frequency with which that interface can be clocked. Since the asynchronous interfaces do not have a clock, the throughput is given in MegaOps/s (the number of data operations the interface can perform in a second).

TABLE 1

|  | 4-place | | 8-place | | 16-place | |
| --- | --- | --- | --- | --- | --- | --- |
| Embodiment | put | get | put | get | put | get |
| Circuit 100 | 565 | 549 | 544 | 523 | 505 | 484 |
| Circuit 200 | 421 | 549 | 379 | 523 | 357 | 484 |
| Circuit 300 | 565 | 454 | 544 | 392 | 505 | 360 |
| Circuit 500 | 580 | 539 | 550 | 517 | 509 | 475 |
| Circuit 600 | 421 | 539 | 379 | 517 | 357 | 475 |
| Circuit 700 | 580 | 454 | 550 | 392 | 509 | 360 |

TABLE 2

|  | 4-place | | 8-place | | 16-place | |
| --- | --- | --- | --- | --- | --- | --- |
| Embodiment | put | get | put | get | put | get |
| Circuit 100 | 505 | 492 | 488 | 471 | 460 | 439 |
| Circuit 200 | 386 | 492 | 351 | 471 | 332 | 439 |
| Circuit 300 | 505 | 417 | 488 | 362 | 460 | 335 |
| Circuit 500 | 521 | 478 | 498 | 459 | 467 | 430 |
| Circuit 600 | 386 | 478 | 351 | 459 | 332 | 430 |
| Circuit 700 | 521 | 417 | 498 | 392 | 467 | 360 |

The throughput results are consistent with the FIFO circuit designs. The synchronous get interfaces are slower than the synchronous put interface because of the complexity of the empty detector 74. Also, relay-stations synchronous put interfaces are somewhat faster than their FIFO circuit's counterparts due to the simplification of put detector in the former ones. On the synchronous side, the get interface tends to be faster than the put one mainly because the output of the register is enabled early on the data bus.

Latencies (ns) through empty FIFO circuit's are shown only for designs with 8 bit data items (TABLE 3). The experimental setup for latency is as follows: in empty FIFO

TABLE 3

|  | 4-place | | 8-place | | 16-place | |
| --- | --- | --- | --- | --- | --- | --- |
| Embodiment | Min | Max | Min | Max | Min | Max |
| Circuit 100 | 5.43 | 6.34 | 5.79 | 6.64 | 6.14 | 7.17 |
| Circuit 200 | 5.53 | 6.45 | 6.13 | 7.17 | 6.47 | 7.51 |
| Circuit 300 | 1.95 | | 2.18 | | 2.44 | |
| Circuit 500 | 5.48 | 6.41 | 6.05 | 7.02 | 6.23 | 7.28 |
| Circuit 600 | 5.61 | 6.35 | 6.18 | 7.13 | 6.57 | 7.62 |
| Circuit 700 | 1.86 | | 2.23 | | 2.43 | | circuit, the get interface requests a data item. At an arbitrary time later, the put interface places a data item the latency is computed as the elapsed time between the moment when the put data bus has valid data to the moment when the get interface retrieves the data item and can use it.

Latency for a FIFO circuit with a synchronous receiver is not uniquely defined. Latency varies with the moment when data items are safely enqueued in a cell. If the data item is enqueued by the put interface immediately after the positive edge of CLK_get, latency is increased (column Max in the table). If the data item is enqueued right before the empty detector starts computation, then latency is decreased (column Min). However, an asynchronous receiver is able to grab the data item immediately after its enqueuing; therefore, latency is uniquely defined. More interestingly, since the asynchronous receiver does not need synchronization, the latency for communication to an asynchronous domain can be performed much faster.

The throughput and latency results are quite good for a bus-based design. As expected, both the throughput and latency decrease when the FIFO circuit capacity or the data items width increase. The throughput tends to be higher for the synchronous interfaces than for the asynchronous ones. The latency through an empty FIFO circuit is smaller when the receiver is asynchronous.

Four sets of simulation experiments were performed for FIFO circuit 900. Two sets were conducted on FIFO's of capacity 4 and two sets on FIFO's of capacity 16. All FIFO's had data of width 8. Since the delays through the environment are important for the cycle time, both a "slow" and a "fast" path through the environment were evaluated. The "slow" path has 3 inverters, roughly corresponding to latching of data and placing a new data item on the data input buses. For the "fast" path through the environment there was only one inverter. The models for the control and data global buses described above were applied herein.

The results for latency are presented in TABLE 4. The experiments are labeled: E4F (4-place FIFO with fast environment), E4S (4-place FIFO with slow environment), E16F (16-place FIFO with fast environment), and E16E (16-place FIFO with slow environment). The best latency (1.73 ns) was obtained for the 4-place FIFO, under the optimized protocol described above. However, for the 16-place FIFO a good latency was still obtained (~2.3 ns).

TABLE 4

| Circuit 900 | Latency (ns) |
| --- | --- |
| E4S | 1.73 |
| E4F | 1.73 |
| E16S | 2.30 |
| E16F | 2.29 |

The results are consistent with our earlier analysis of latency at program level. The better results for the optimization are mostly due to allowing overlap between the active phases of put and get operations in the same cell. Also, as is expected, the latency decreases when the capacity of the FIFO is increased. This is due to the introduction of broadcasting and the increased depth of the acknowledgment tree.

The throughput (in MegaOps/sec) for each design is presented in TABLE 5. The best throughput is obtained with the 4-place FIFO with a fast environment (454 MegaOps/sec). For a 16-place FIFO, the results are still good (~350 MegaOps/sec.)

TABLE 5

| Circuit 900 | | Throughput (MegaOps/sec) |
| --- | --- | --- |
| E4S | put | 4404 |
|  | get | 4427 |
| E4F | put | 4423 |
|  | get | 4454 |

TABLE 5-continued

| Circuit 900 | | Throughput (MegaOps/sec) |
|---|---|---|
| E16S | put | 3335 |
| | get | 3348 |
| E16F | put | 3359 |
| | get | 3367 |

As expected, it is observed that the throughput decreases as the FIFO capacity increases. Also, a slow environment is seen to slow down the FIFO's. However, for the base case, using handshake circuits and Petri Net implementations, the internal paths are longer than those through the environment for all experiments, so for the above experiments the throughput decrease due to slow environment is not observable.

In general, the table indicates that the throughput of put is generally larger than that of get: when data is output, the loads attached to the output data wires increase the cycle time. However, there are two exceptions. For the Base Protocol, using the Petri net implementation, the load for put_req is larger than that for get_req, so the cycle time for put is longer. Also, in the optimized protocol, early data output is allowed even before a get request has been received, so by the time a request arrives, data is already output. Therefore, the get cycle time is reduced.

The area for each implementation (expressed in number of transistors) is given in TABLE 6 for the 4-place FIFO. In addition to the FIFO area, the area of the cell's control part is indicated, since the same register is used for every implementation. The register uses 292 transistors, including delay matching and buffering.

TABLE 6

| Circuit 900 | Area |
|---|---|
| Cell cntrl | 89 |
| FIFO | 1545 |

It will be understood that the foregoing is only illustrative of the principles of the invention, and that various modifications can be made by those skilled in the art without departing from the scope and spirit of the invention.

We claim:

1. A FIFO circuit which interfaces the transmission of data items between a sender subsystem operating under a first time domain and a receiver subsystem operating under a second time domain, wherein the first time domain and the second time domain are different and at least one of the time domains operates according to a clock signal, the FIFO circuit comprising:

a put interface configured to operate according to the first time domain comprising a put data bus to transmit a data item from the sender subsystem and a put data request input to receive a put request from the sender subsystem to enqueue the data item from the put data bus;

a get interface configured to operate according to the second time domain comprising a get data bus to transmit the data item to the receiver subsystem and a get data request input to receive a get request from the sender subsystem to dequeue the data item to the get data bus; and an array of cells, each cell comprising:
a register configured to receive the data item from the put data bus and to transmit the data item to the get data bus;
a state indicator providing an indication of the state of the cell;
a put component configured to operate according to the first time domain to receive a put token from a first adjacent cell, to latch the data item received from the put data bus to the register based on the put request, the put token, and the state of the cell, and to pass the put token to a second adjacent cell; and
a get component configured to operate according to the second time domain to receive the get token from the first adjacent cell, to dequeue the data item from the register to the get data bus based on the get request, the get token, and the state of the cell, and pass the get token to the second adjacent cell.

2. The FIFO circuit of claim 1, wherein the put interface is synchronous and controlled by a first clock signal, and the put interface further comprises:

a full detector which produces a global full signal synchronized with the first clock signal which is asserted when fewer than a predetermined number of consecutive cells in the array of cells are in an empty state; and a put controller configured to deliver the put request to the put component of each cell in the array of cells when the global full signal is not asserted.

3. The FIFO circuit of claim 2, wherein the put component of each cell in the array of cells further comprises:

a synchronous latch enabled by the put request to pass the put token to the second adjacent cell;

a circuit configured to signal the state indicator to provide an indication de-asserting an empty state of the cell in response to the put request and the put token.

4. The FIFO circuit of claim 2, wherein the register is enabled by the put request to receive the data item.

5. The FIFO circuit of claim 2, wherein the get interface is synchronous and controlled by a second clock signal, and the get interface further comprises:

a first empty detector which produces a first global empty signal synchronized with the second clock signal which is asserted when fewer than a predetermined number of consecutive cells in the array of cells are in a full state;

a second empty detector which produces a second global empty signal and which comprises: a circuit which produces a first intermediate signal that is asserted when none of the cells in the array of cells are in the full state; a first and second latch which synchronize the first intermediate signal with the second clock signal; and a combination element which combines a second intermediate signal with the first intermediate signal between first latch and the second latch, wherein the second global empty signal is the first intermediate signal when the second intermediate signal is de-asserted and the second global empty signal is the second intermediate signal when the second intermediate signal is asserted; and a get controller configured to deliver the get request to the get component of each cell in the array of cells when one the first global empty signal and the second global empty signal is de-asserted.

6. The FIFO circuit of claim 5, wherein the get component of each cell in the array of cells further comprises:

a synchronous latch enabled by the get request to pass the get token to the second adjacent cell; and a circuit configured to signal the state indicator to provide an indication de-asserting a full state of the cell in response to the get request and the get token.

7. The FIFO circuit of claim 5, wherein the register is enabled by the get request and the get token to transmit the data item to the get data bus.

8. The FIFO circuit of claim 2, wherein the get interface is asynchronous, and the get component of each cell in the array of cells comprises a get token passing circuit configured to receive the get token in the respective cell in the array of cells in response to a signal from the first adjacent cell indicative of dequeueing the data item from the register of the first adjacent cell to the get data bus.

9. The FIFO circuit of claim 8, wherein the register is enabled by the get token to dequeue the data item to the get data bus.

10. The FIFO circuit of claim 9, wherein the get interface further comprises a get acknowledgement signal and the get component further comprises a get control circuit enabled by the get token, the get request, and the full state of the cell to signal the state indicator to reset the state of the cell, to assert the get acknowledgement signal.

11. The FIFO circuit of claim 10, wherein the get control circuit is disabled by de-assertion of the get request to pass the get token to the second adjacent cell.

12. The FIFO circuit of claim 1, wherein the put interface is asynchronous, and the put component of each cell in the array of cells comprises a put token passing circuit configured to receive the put token into the respective cell in the array of cells in response to a signal from the first adjacent cell indicative of latching the data item from the put data bus to the register of the first adjacent cell.

13. The FIFO circuit of claim 12, wherein the put interface further provides a put acknowledgement signal and the put component further comprises a put control circuit enabled by the put token, the put request, and the empty state of the cell to enable the register to receive the data item from the put data bus, to signal the state indicator to provide an indication of the resetting of the state of the cell, and to assert the put acknowledgement signal.

14. The FIFO circuit of claim 12, wherein the put control circuit is disabled by de-assertion of the put request to pass the put token to the second adjacent cell.

15. The FIFO circuit of claim 12, wherein the second time domain is synchronous and controlled by a second clock signal, and the get interface further comprises:
a first empty detector which produces a first global empty signal synchronized with the second clock signal which is asserted when fewer than a predetermined number of consecutive cells in the array of cells are in the full state;
a second empty detector which produces a second global empty signal and which comprises: a circuit which produces a first intermediate signal that is asserted when none of the cells in the array of cells are in the full state; a first and second latch which synchronize the first intermediate signal with the second clock signal; and a combination element which combines a second intermediate signal with the first intermediate signal between first latch and the second latch, wherein the second global empty signal is the first intermediate signal when the second intermediate signal is de-asserted and the second global empty signal is the second intermediate signal when the second intermediate signal is asserted; and
a get controller configured to deliver the get request to the get component of each cell in the array of cells when one the first global empty signal and the second global empty signal is de-asserted.

16. The FIFO circuit of claim 15, wherein the get component of each cell in the array of cells further comprises:
a synchronous latch enabled by the get request to pass the get token to the second adjacent cell; and
a circuit configured to signal the state indicator to provide an indication of the empty state of the cell in response to the get request and the get token.

17. The FIFO circuit of claim 16, wherein the register is enabled by the get request and the get token to transmit the data item to the get data bus.

18. A FIFO circuit which interfaces the transmission of data items between an asynchronous sender subsystem and an asynchronous receiver subsystem, the FIFO circuit comprising:
a put interface comprising a put data bus to transmit a data item from the sender subsystem and a put data request input to receive a put request from the sender subsystem to enqueue the data item from the put data bus;
a get interface comprising a get data bus to transmit the data item to the receiver subsystem; and
an array of cells, each cell comprising:
a register configured to receive the data item from the put data bus and to transmit the data item to the get data bus;
a state indicator providing an indication of the state of the cell;
a put component configured to receive the put token from a first adjacent cell, to latch the data item received from the put data bus to the register based on the put request, the put token, and the state of the cell, and to pass the put token to a second adjacent cell; and
a get component configured to receive the get token from the first adjacent cell, to dequeue the data item from the register to the get data bus upon receipt of the get token and to pass the get token to the second adjacent cell.

19. The FIFO circuit of claim 18, wherein get component of each cell in the array of cells comprises a get token passing circuit configured to receive the get token into the respective cell in the array of cells in response to a signal from the first adjacent cell indicative of dequeueing the data item from the register of the first adjacent cell to the get data bus.

20. The FIFO circuit of claim 19, wherein the register is enabled by the get token to dequeue the data item to the get data bus.

21. The FIFO circuit of claim 19, wherein the get interface further comprises a get request signal and a get acknowledgement signal and the get component further comprises a get control circuit enabled by the get token, the get request, and a full state indication to reset the state of the cell, and to assert the get acknowledgement signal.

22. A circuit which interfaces the transmission of a data item from a sender subsystem controlled by a first clock signal to a receiver subsystem controlled by a second clock signal wherein the transmission of the data item is subject to a delay between the sender subsystem and the receiver subsystem, the circuit comprising:
a first chain of relay stations attached to the sender subsystem to transmit the data item on a put data bus and having a first protocol of operation;
a second chain of relay stations attached to the receiver subsystem to receive the data item on a get data bus and having a second protocol of operation; and a mixed clock relay station which receives the first clock signal and the second clock signal and transmits the data item from the first chain of relay stations to the second chain of relay stations in accordance with the protocol of operation of the first chain of relay stations and the protocol of operation of the second chain of relay stations, wherein the mixed clock relay station comprises:

an array of cells;

a full detector which produces a full signal synchronized with the first clock signal which is asserted when fewer than a predetermined number of consecutive cells in the array of cells are in the empty state;

a put controller configured to enable the enqueuing of a data item on each clock cycle of the first clock signal if a full signal is not asserted;

an empty detector which produces an empty control signal synchronized with the second clock signal which is asserted when fewer than a predetermined number of consecutive cells are in the full state; and a get controller configured to receive a stop signal from a relay station of the second chain of relay stations connected to the mixed clock station, and configured to enable the dequeuing of a data item on each clock cycle of the second clock signal if the empty signal is not asserted and the stop signal is not asserted.

23. The circuit of claim 22, wherein each cell in the array of cells comprises:

a register configured to receive the data item from the put data bus and to transmit the data item to the get data bus;

a state controller providing an indication of the state of the cell;

a put component configured to operate according to the first protocol of operation to receive a put token from a first adjacent cell, to latch the data item received from the put data bus to the register based on the put request, the put token, and the state of the cell, and to pass the put token to a second adjacent cell; and a get component configured to operate according to the second protocol of operation to receive a get token from the first adjacent cell, to dequeue the data item from the register to the get data bus based on the get request, the get token, and the state of the cell, and pass the get token to the second adjacent cell.

24. The circuit of claim 23, wherein a relay station of the first chain of relay stations chain provides a put request and the put component of each cell in the array of cells further comprises:

a synchronous latch enabled by the put request to pass the put token to the second adjacent cell; and a circuit configured to signal the state indicator to provide an indication of the de-assertion of an empty state of the cell in response to the put request and the put token.

25. The circuit of claim 24, wherein the register is enabled by the put request and the put token to receive the data item.

26. The circuit of claim 25, wherein a relay station of the second chain of relay stations chain provides a get request and the get component of each cell in the array of cells further comprises:

a synchronous latch enabled by the get request to pass the get token to the second adjacent cell; and a circuit configured to signal the state indicator to provide an indication of the de-assertion of the full state of the cell in response to the get request and the get token.

27. The FIFO circuit of claim 26, wherein the register is enabled by the get request and the get token to transmit the data item to the get data bus.

28. A circuit which interfaces the transmission of a data item from an asynchronous sender subsystem to a synchronous receiver subsystem controlled by a clock signal wherein the transmission of the data item is subject to a delay between the sender subsystem and the receiver subsystem, the circuit comprising:

a first chain of relay stations attached to the sender subsystem to transmit the data item on a put data bus and having an asynchronous protocol of operation;

a second chain of relay stations attached to the receiver subsystem to receive a data item on a get data bus and having a synchronous protocol of operation; and a relay station which receives the clock signal and transmits the data item from the first chain of relay stations to the second chain of relay stations in accordance with the asynchronous protocol of operation of the first chain of relay stations and the synchronous protocol of operation of the second chain of relay stations, wherein the relay station comprises:

an array of cells;

an empty detector which produces an empty control signal synchronized with the second clock signal which is asserted when fewer than a predetermined number of consecutive cells are in the full state; and a get controller configured to receive a stop signal from a relay station of the second chain of relay stations connected to the mixed clock station, and configured to enable the dequeuing of a data item on each clock cycle of the second clock signal if the empty signal is not asserted and the stop signal is not asserted.

29. The circuit of claim 28, wherein each cell in the array of cells comprises:

a register configured to receive the data item from the put data bus and to transmit the data item to the get data bus;

a state controller providing an indication of the state of the cell;

a put component configured to operate according to the first protocol of operation to receive a put token from a first adjacent cell, to latch the data item received from the put data bus to the register based on the put request, the put token, and the state of the cell, and to pass the put token to a second adjacent cell; and a get component configured to operate according to the second protocol of operation to receive a get token from the first adjacent cell, to dequeue the data item from the register to the get data bus based on the get request, the get token, and the state of the cell, and pass the get token to the second adjacent cell.

30. The circuit of claim 29, wherein the put component of each cell in the array of cells comprises a put token passing circuit configured to receive the put token into the respective cell in the array of cells in response to a signal from the first adjacent cell indicative of latching the data item from the put data bus to the register of the first adjacent cell.

31. The circuit of claim 30, wherein a relay station of the first chain of relay stations chain provides a put request and the put interface further provides a put acknowledgement signal and the put component further comprises a put control circuit enabled by the put token, the put request, and the empty state of the cell to enable the register to receive the data item from the put data bus, to signal the state indicator to provide an indication of the resetting of the state of the cell, and to assert the put acknowledgement signal.

32. The circuit of claim 30, wherein the put control circuit is disabled by de-assertion of the put request to pass the put token the second adjacent cell.

33. The circuit of claim 32, wherein a relay station of the second chain of relay stations chain provides a get request and the get component of each cell in the array of cells further comprises:

a synchronous latch enabled by the get request to pass the get token to the second adjacent cell; and a circuit configured to signal the state indicator to provide an indication of the empty state of the cell in response to the get request and the get token.

34. The circuit of claim 33, wherein the register is enabled by the get request and the get token to transmit the data item to the get data bus.

35. A circuit which interfaces the transmission of a data item from a synchronous sender subsystem controlled by a clock signal to an asynchronous receiver subsystem wherein the transmission of the data item is subject to a delay between the sender subsystem and the receiver subsystem, the circuit comprising:

a first chain of relay stations attached to the sender subsystem to transmit the data item on a put data bus and having a synchronous protocol of operation and providing a validity signal;

a second chain of relay stations attached to the receiver subsystem to receive the data item on a get data bus and having an asynchronous protocol of operation; and a relay station which receives the clock signal and transmits the data item from the first chain of relay stations to the second chain of relay stations in accordance with the synchronous protocol of operation of the first chain of relay stations and the asynchronous protocol of operation of the second chain of relay stations, wherein the relay station comprises:

an array of cells;

a full detector which produces a full signal synchronized with the first clock signal which is asserted when fewer than a predetermined number of consecutive cells in the array of cells are in an empty state;

a put controller configured to enable the enqueuing of a data item on each clock cycle of the first clock signal if a full signal is not asserted and the validity signal is asserted.

36. The circuit of claim 35, wherein each cell in the array of cells comprises:

a register configured to receive the data item from the put data bus and to transmit the data item to the get data bus;

a state controller providing an indication of the state of the cell;

a put component configured to operate according to the first protocol of operation to receive the put token from a first adjacent cell, to latch the data item received from the put data bus to the register based on the put request, the put token, and the state of the cell, and to pass the put token to a second adjacent cell; and a get component configured to operate according to the second protocol of operation to receive the get token from the first adjacent cell, to dequeue the data item from the register to the get data bus based on the get request, the get token, and the state of the cell, and to pass the get token to the second adjacent cell.

37. The circuit of claim 36, wherein a relay station of the first chain of relay stations chain provides a put request and the put component of each cell in the array of cells further comprises:

a synchronous latch enabled by the put request to pass the put token to the second adjacent cell; and a circuit configured to signal the state indicator to provide an indication of the the empty state of the cell in response to the put request and the put token.

38. The circuit of claim 37, wherein the register is enabled by the put request to receive the data item.

39. The FIFO circuit of claim 38, the get component of each cell in the array of cells comprises a get token passing circuit configured to receive the get token in the respective cell in the array of cells in response to a signal from the first adjacent cell indicative of dequeueing the data item from the register of the first adjacent cell to the get data bus.

40. The FIFO circuit of claim 39, wherein the register is enabled by the get token to dequeue the data item to the get data bus.

41. The FIFO circuit of claim 40, wherein a relay station of the second chain of relay stations chain provides a get request and the get interface further comprises a get acknowledgement signal and the get component further comprises a get control circuit enabled by the get token, the get request, and the full state of the cell to signal the state indicator to provide an indication of the resetting of the state of the cell, to assert the get acknowledgement signal.

42. The FIFO circuit of claim 41, wherein the get control circuit is disabled by de-assertion of the get request to pass the get token to the second adjacent cell.

* * * * *